United States Patent
Inaba et al.

(10) Patent No.: US 6,549,898 B1
(45) Date of Patent: Apr. 15, 2003

(54) METHOD OF AND AN APPARATUS FOR RETRIEVING AND DELIVERING DOCUMENTS AND A RECORDING MEDIA ON WHICH A PROGRAM FOR RETRIEVING AND DELIVERING DOCUMENTS ARE STORED

(75) Inventors: Yasuhiko Inaba, Yokohama (JP); Tadataka Matsubayashi, Yokohama (JP); Katsumi Tada, Kawasaki (JP); Takuya Okamoto, Machida (JP); Natsuko Sugaya, Miyamae (JP); Yousuke Ushiroji, Osaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/518,689

(22) Filed: Mar. 3, 2000

(30) Foreign Application Priority Data

Feb. 3, 2000 (JP) ........................ 2000-032625

(51) Int. Cl.[7] .............................................. G06F 17/30
(52) U.S. Cl. ...................... 707/5; 707/104.1; 707/500.1
(58) Field of Search ............................... 707/1, 2, 3, 4, 707/5, 6, 10; 709/217, 218, 227

(56) References Cited

U.S. PATENT DOCUMENTS

| | | | | |
|---|---|---|---|---|
| 5,680,612 A | * | 10/1997 | Asada et al. ................ 395/613 |
| 5,745,745 A | * | 4/1998 | Tada et al. ................... 395/601 |
| 5,991,755 A | * | 11/1999 | Noguchi et al. ............... 707/3 |
| 6,041,323 A | * | 3/2000 | Kubotq .......................... 707/5 |
| 6,173,253 B1 | * | 1/2001 | Abe et al. ...................... 704/10 |

FOREIGN PATENT DOCUMENTS

| | | |
|---|---|---|
| JP | 8-33522 | 12/1996 |
| JP | 10-27182 | 1/1998 |
| JP | 11-338883 | 12/1999 |

OTHER PUBLICATIONS

D. Harman, "Ranking Algorithms", Information Retrieval, 1992, pp. 363–391.

Nikkei Byte, Aug. 1987, pp. 175–189.

* cited by examiner

*Primary Examiner*—Hosain T. Alam
*Assistant Examiner*—Jacques Veillard
(74) *Attorney, Agent, or Firm*—Mattingly, Stanger & Malur, P.C.

(57) ABSTRACT

Retrieval conditions inputted from a plurality of users are registered. According to the retrieval conditions, a retrieval is conducted for a text inputted. As a result of the retrieval, similarity of the text is calculated for each retrieval condition. The text is delivered to users of which the retrieval condition satisfies the similarity.

22 Claims, 42 Drawing Sheets

CONFIGURATION OF FIRST EMBODIMENT OF PRESENT INVENTION

CONFIGURATION OF FIRST EMBODIMENT OF PRESENT INVENTION (PROCESSING PROCEDURE OF TEXT RETRIEVAL AND DELIVERY CONTROL PROGRAM 112)

(SPECIFIC PROCESSING FLOW OF TEXT RETRIEVAL PROGRAM 131)

(LAYOUT OF RETRIEVAL CONDITION REGISTRATION CONTROL PROGRAM 111a IN THIRD EMBODIMENT OF PRESENT INVENTION)

(CONFIGURATION OF FOURTH EMBODIMENT OF PRESENT INVENTION)

(SPECIFIC PROCESSING FLOW OF DELIVERY THRESHOLD SETTING SUPPORT INFORMATION PROGRAM 2001)

(OUTPUT EXAMPLE OF DELIVERY THRESHOLD SETTING SUPPORT INFORMATION PROGRAM 2001)

(OUTPUT EXAMPLE OF DELIVERY THRESHOLD SETTING SUPPORT INFORMATION PROGRAM 2001)

(OUTPUT EXAMPLE OF DELIVERY THRESHOLD
SETTING TRIAL PROGRAM 2002)

FIG. 32 (SPECIFIC PROCESSING FLOW OF TEXT RETRIEVAL AND DELIVERY PROGRAM 112a)

(CONFIGURATION OF FIFTH EMBODIMENT OF PRESENT INVENTION)

(SPECIFIC PROCESSING FLOW OF TEXT ADDITIONAL DELIVERY PROGRAM 2901)

(CONFIGURATION OF SIXTH EMBODIMENT OF PRESENT INVENTION)

(PROCESSING PROCEDURE OF SYSTEM CONTROL PROGRAM 110c)

(SPECIFIC PROCESSING FLOW OF DELIVERY THRESHOLD AUTOMATIC SETTING PROGRAM 3401)

METHOD OF AND AN APPARATUS FOR RETRIEVING AND DELIVERING DOCUMENTS AND A RECORDING MEDIA ON WHICH A PROGRAM FOR RETRIEVING AND DELIVERING DOCUMENTS ARE STORED

BACKGROUND OF THE INVENTION

The present invention relates to a document retrieving and delivering technique in which an electronic document is retrieved according to a retrieval condition registered by a user in advance and documents satisfying the condition are delivered to the user.

Recently, a large amount of electronic documents (to be referred to as texts herebelow) have been delivered at every moment to users through an electronic mail or e-mail, electronic news, and the like. Information sources which transmit information through the World Wide Web (WWW) are rapidly increasing and hence an immense amount of texts have been collected from such information sources using an information collecting robot or the like. There consequently arises a need for a document retrieving and delivering system in which texts containing information requested by a user are retrieved therefrom and are delivered to the user.

JP-A-10-27182 (to be referred to as prior art 1) describes such a document or text retrieving and delivering system. In this system, retrieval condition expressions of a plurality of users are combined with each other to process condition expressions of a plurality of users through one text scanning operation.

However, in prior art 1, the user is required to generate retrieval condition expressions, which leads to two problems as follows.

First, when a rarely used word is specified in a retrieval condition or when generally used words are complicatedly combined with each other in a retrieval condition specified, there appears texts which cannot be retrieved (retrieval leakage).

Second, in contrast with the first problem, when a simple retrieval condition expression containing only generally used words is specified, there are possibly retrieved many documents or texts (to be referred to as retrieval noise) not suitable for an object of the retrieval. This leads to a problem that documents desired by the user cannot be easily attained.

In short, to obtain retrieval results in which texts not retrieved as above are minimized and in which the noise is reduced, it is difficult for the user to appropriately generate a retrieval condition expression.

Japanese Patent Application Serial No. 10-148721 (to be referred to as prior art 2) describes a technique to improve two problems above in a document retrieval system in which documents containing information desired are retrieved from documents (to be referred to as registered documents herebelow) registered to a text database.

In this technique, a keyword (called "feature character string" in prior art 2) is extracted from a text (to be referred to as a seed text) exemplified as a retrieval condition to calculate similarity of the seed document with respect to registered documents.

In prior art 2, the user needs only to exemplify a seed document containing information desired. Namely, the user is relieved from the troublesome job to select appropriate retrieval terms for a retrieval condition expression. The user then instructs execution of retrieval to view retrieval results sorted according to the similarity. Therefore, even when the retrieval results include some retrieval noise, the user can easily attain necessary information.

Next, description will be given of an outline and problems of the prior arts above.

Referring to FIG. 2, an outline of prior art 1 will be described.

In this example, three users, i.e., users 1 to 3 have registered retrieval condition expressions to a document retrieving and delivering system, i.e., document containing "new" and "car", document containing USA, and document containing used and car, respectively. Under this condition, a scanning operation is conducted using a text collected "price of this new car is . . . " to determine whether or not the three conditions are satisfied.

The retrieval condition expressions registered by the users are analyzed to extract retrieval terms "new", "car", "USA", and "used".

The number of retrieval terms extracted is stored for each user in a retrieval term count table. For example, from retrieval condition expression of user 1, i.e., document containing "new" and "car" registered by user 1, two retrieval terms "new" and "car" are extracted and hence "2" is stored in an associated field of the table. In a similar fashion, "1" and "2" are stored in associated fields of the table for users 2 and 3, respectively.

Next, the system creates a finite automaton to collate all retrieval terms extracted.

In the finite automaton in FIG. 2, a circle indicates a state of the automaton and an arrow denotes a state transition. A character next to the arrow represents input characters which cause the transition of the arrow. A numeral in the circle designates a state number of the automaton state. This example does not include an arrow to an initial state to be used when a character not indicated in the automaton is inputted (to be called a failure herebelow).

The system then forms a user list including elements each including a user identifier of a user having specified a retrieval term. The list is linked with retrieval term detection states of the automaton respectively associated with. In this example, when "car" is collated, the system refers to an associated user list item according to the last state "3". This indicates that users 1 and 3 have specified "car".

Description will next be given of the scanning of a text "price of this new car is" in the automaton shown in FIG. 2. In this example, it is detected that the text includes partial character strings in which "car" or "new" appears. In this automaton, a retrieval term having a small circle at an end thereof means that a partial character string matching the term exists in the text. Since partial character strings matching with "car" or "new" appear in the text in FIG. 2, end states 3 and 6 are assigned with a small circle.

In the texts, the number of retrieval terms matching partial character strings in the text are counted for each user and is stored in a retrieval term appearance count table. For example, since the matching state is detected for "new" and "car" or user 1, "2" is set to the count value. Only car is matching for user 3, "1" is counted. For user 2, the matching state does not occur for any partial character strings, and hence the counting is not achieved and "0" is kept unchanged for the count value.

The retrieval term count table in which the retrieval term counts extracted from the retrieval condition expressions are stored is compared with the retrieval term appearance count table in which the numbers of retrieval terms appearing in partial character strings in the text are stored. When these tables match each other, it is assumed that the retrieval condition expressions of the user are satisfied and hence the text is delivered to the user. In FIG. 2, the retrieval term count is "2" for user 1 in both tables and hence the text is delivered to user 1. The retrieval term counts are respectively different from each other for users 2 and 3 and hence the text is not delivered to users 2 and 3.

Prior art 1 has been briefly described.

In accordance with prior art 1, it is possible to implement a document retrieving and delivering system in which a text matching retrieval condition expressions given can be delivered to the user through one scanning operation.

However, the user must generate retrieval condition expressions in prior art 1. There consequently arises a problem, namely, it is not easy for the user to appropriately generate retrieval condition expressions.

Prior art 2 has been proposed to improve the problem above in a document retrieval system.

Referring now to FIG. 20, an outline of prior art 2 will be described.

Prior art 2 is a technique to extract keywords from a sentence of a language, e.g., Japanese not using a separation code between words.

FIG. 20 shows an example to extract keywords (to be described in accordance with a name "tokuchomojiretsu (feature character string)" in prior art 2 herebelow) from a seed document " . . . Keitaidenwa no shiyohji no mana ga mondai ni naru (manners of use of a cellular phone causes a problem) . . . ".

In step 1910, a single character type seed character string extraction program is started to subdivide a seed document 1920 at boundaries of character types such as kanji (Chinese characters) and katakana (angular Japanese phonetic letters) to extract character strings (to be called single character type character strings herebelow) 1921 each including characters of one character type.

In step 1911, a check is made to determine a character type for each of the extracted strings. For a character string of Chinese or angular Japanese characters which possibly configure a complex word, a division probability comparison feature character string extraction program is executed to subdivide any complex word to extract feature character strings. For character strings of the other character types having a low probability of configuration of a complex word, the character strings of a single character type are directly extracted as feature character strings (step 1912).

In step 1913, the feature character strings thus extracted are stored in a work area.

Description has been given of an example to extract feature character strings from a seed document in prior art 2.

In prior art 2, according to the number of appearances of feature character strings in a seed document as extracted above and the number of appearances thereof in each document in a text database, the similarity is calculated for each document to display the documents in the descending order of similarity. A method of calculating similarity has been described in prior art 2 and hence description thereof will be here avoided.

An outline of prior art 2 has been described.

In accordance with prior art 2, feature character strings (keywords) are extracted from a seed document and then similarity of each registered document to the seed document is calculated using the keywords. The user specifies a document containing information desired by the user such that the user then refers to results of retrieval in the descending order of similarity to obtain texts containing necessary information from the text database.

Consequently, when prior art 2 is applied to prior art 1, it is possible to assign, to a registered document including at least one of the keywords extracted from the seed document, similarity with respect to the seed document. This improves the first problem of prior art 1.

However, for each text delivered at every moment, prior art 1 makes a check to determine the matching of the retrieval condition to instantaneously deliver any text matching the condition to the user. Therefore, although similarity can be calculated for each text with respect to the retrieval condition in prior art 2, the similarity cannot be compared with similarity thereof with respect to another text.

Namely, even when prior art 2 is simply applied to a document retrieving and delivering system of prior art 1, the results of retrieval cannot be sorted in the descending order of similarity to be delivered to the user. The second problem of prior art 1 cannot be improved.

Additionally, although statistic information in the text database can be used to extract keywords and/or to calculate similarity, texts delivered is not saved in the document retrieving and delivering system of prior art 1. This leads to a problem that the statistic information cannot be easily obtained.

SUMMARY OF THE INVENTION

It is therefore an object of the present invention to provide a system in which according to retrieval conditions inputted by a plurality of users, a check is made to determine whether or not the conditions are satisfied with respect to a text inputted such that the text inputted is delivered to users corresponding to the retrieval conditions satisfied to thereby deliver texts desired by the users.

To improve the problems above in accordance with the document retrieving and delivering method of the present invention, through the steps described below, similarity of each text acquired is calculated for a document (to be referred to as a seed document herebelow) containing information requested by the user to thereby deliver an appropriate text to the user.

Namely, the document retrieving and delivering method of the present invention includes a retrieval condition registering steps of registering retrieval conditions inputted from a plurality of users and a retrieval and delivery step for retrieving texts satisfying the retrieval condition from text data of document information and for delivering the texts retrieved to associated users.

The retrieval and delivery step includes calculating, from the texts, a ratio the text which matches the retrieval conditions (to be called similarity herebelow) and whether or not the retrieval conditions are satisfied is determined according to the similarity to deliver the text to the users corresponding to the retrieval conditions satisfied.

By the operation, similarity of the text acquired can be determined with respect to a document including information desired by the user to thereby appropriately deliver the text to the user.

The retrieval condition inputted from the user may be provided in the form of a document desired by the user. In such a situation, retrieval conditions are generated according to the document in the present invention.

BRIEF DESCRIPTION OF THE DRAWINGS

The objects and features of the present invention will become more apparent from the consideration of the following detailed description taken in conjunction with the accompanying drawings in which.

DESCRIPTION OF THE EMBODIMENTS

Figure 1:
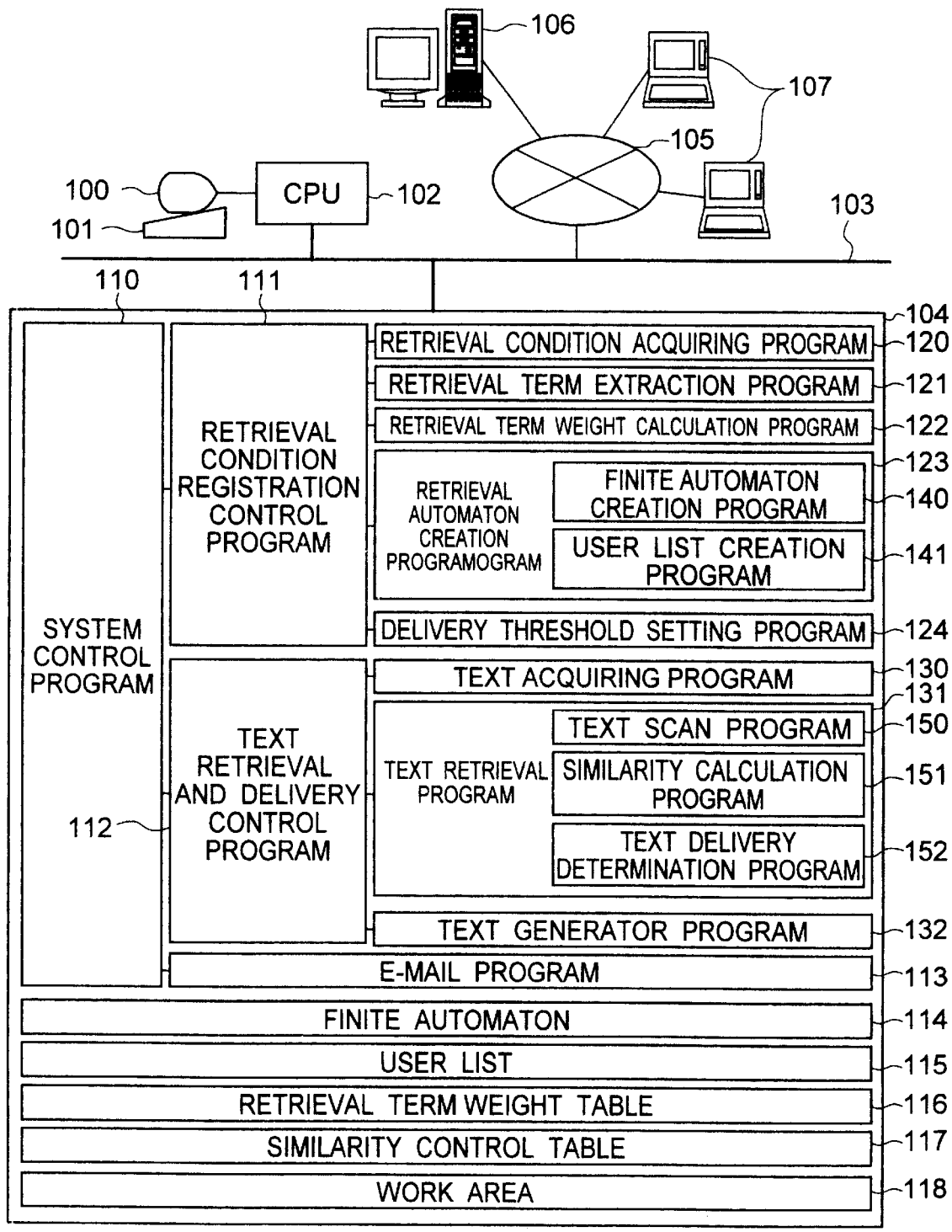
FIG. 1 is a diagram schematically showing a configuration of a first embodiment in accordance with the present invention.
Figure 2:
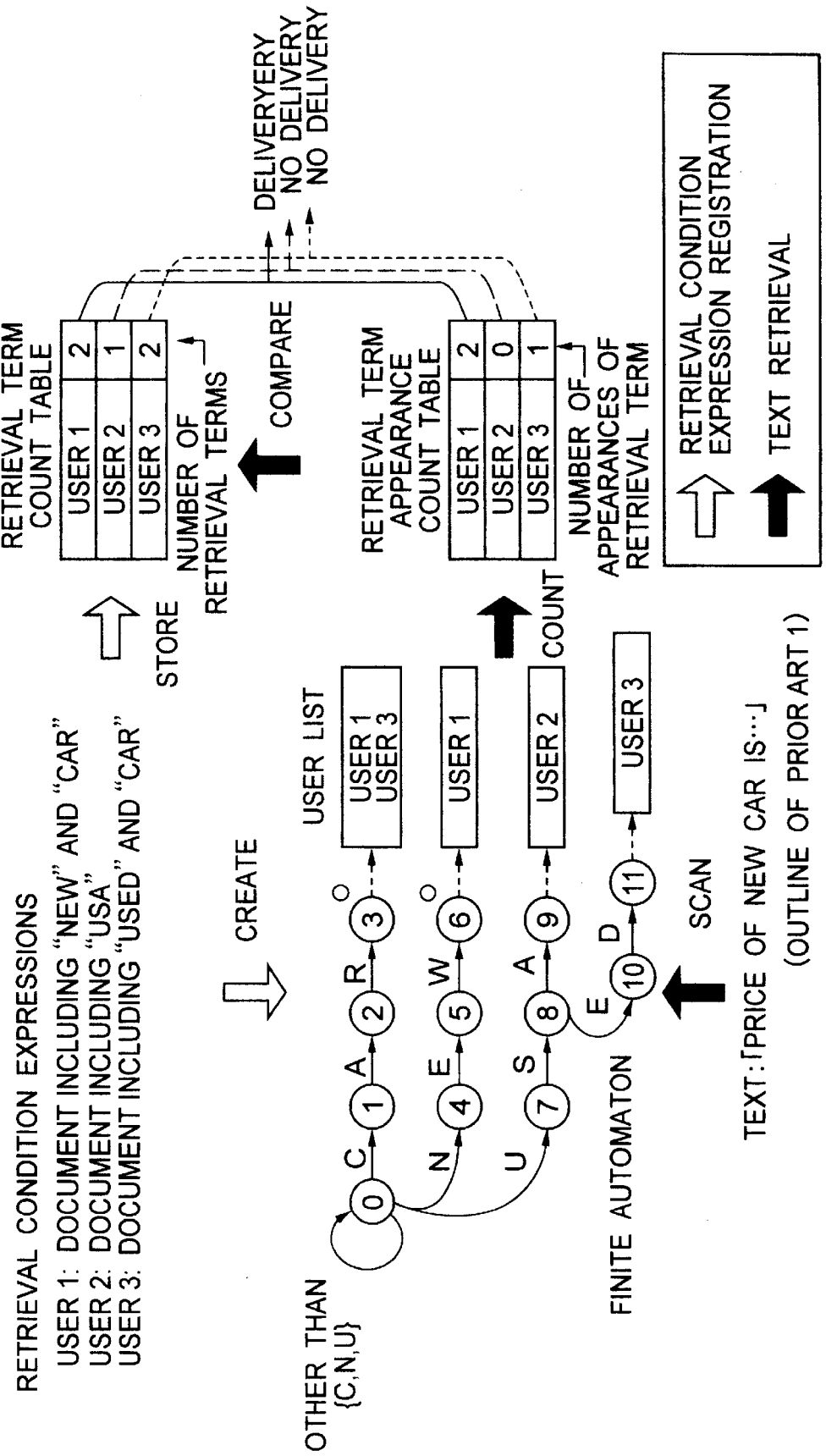
FIG. 2 is a diagram to explain an outline of prior art 1.

Referring now to the drawings, description will be given of a first embodiment in accordance with the present invention.

First, an outline of the first embodiment will be described by referring to FIGS. 8 and 9.

Figure 8:
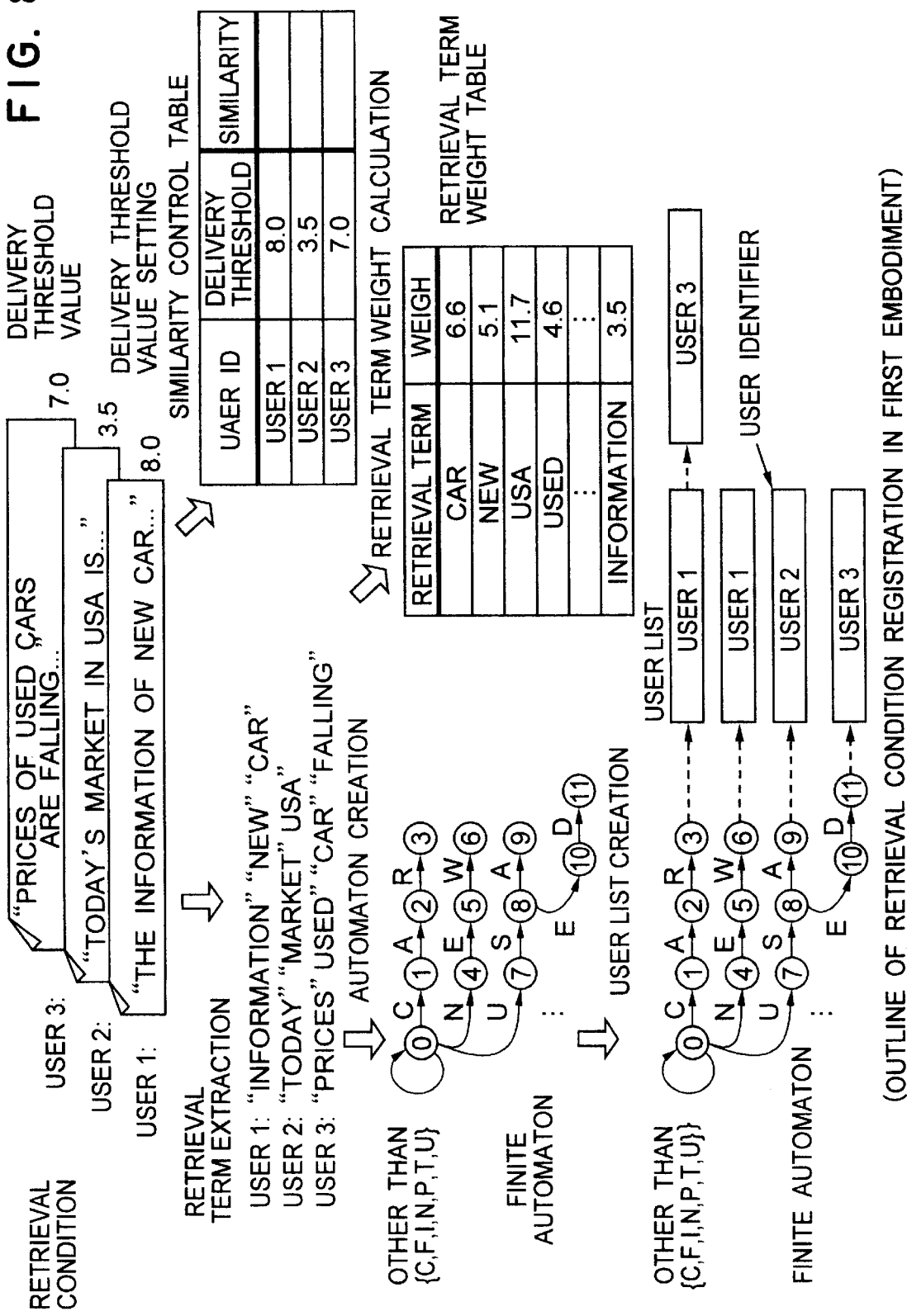
FIG. 8 is a diagram to explain an outline of retrieval condition registration in the first embodiment.

Retrieval condition registration will be first briefly described by referring to FIG. 8. This diagram shows an example in which retrieval conditions of three users are registered, namely, "the information of new car . . . " of user 1, "today's market in USA is . . . " of user 2, and "price of used cars are falling . . . " of user 3.

First, retrieval terms are extracted from the retrieval conditions registered by the users. In this example, three retrieval terms "information", "new", and "car" are extracted from retrieval condition user 1 "the information of new car . . . " registered by user 1. Similarly, three terms "today", "market", and "USA" are extracted from the conditions of user 2 and four terms of "price", "used", "car", and "falling" are extracted from the conditions of user 3.

For all retrieval terms extracted, weights are calculated using a predetermined formula and are stored in a retrieval term weight table.

To calculate these weights, there may be used, for example, an inverted document frequency (IDF) formula (1) described in "Information Retrieval" written by William B. Frakes and Ricardo Baeza-Yates in pages 363 to 391 of "Ranking Algorithm" published from Prentice Hall PTR. in 1992 (to be referred to as prior art 3 herebelow).

$$IDF(i)=1+\log_2 N/n(i) \qquad (1)$$

In expression (1) IDF(i) indicates IDF of retrieval term (i), N denotes the total number of documents in the text database, and n(i) designates the number of texts in which retrieval term (i) appears. Assume that the expression is used for a text database in which about 100 thousand texts are stored. When a retrieval term "car" extracted from the retrieval condition of user 1 appears in 2000 texts, the weight of term "car" is calculated as "6.6" to be stored in the retrieval term weight table.

The total number of documents registered to the text database and the number of texts in which the retrieval term appears may be calculated using the number of texts delivered from each news delivery source and the number n(i) of texts in which retrieval term (i) appears. Alternatively, these items may be calculated by referring to the text database to which texts delivered or other different texts are registered. By such operations, similarity calculating processing in which statistical information is used can be implemented for a document retrieving and delivering system.

Subsequently, the system creates a finite automaton to collate all retrieval terms extracted. In the finite automaton in FIG. 8, a circle indicates a state of the automaton and an arrow denotes a state transition. A character next to the arrow represents an input character which causes the transition of the arrow. A numeral in the circle designates a state number of the automaton state. In this example, there is not shown an arrow to an initial state to be used when a character not indicated in the automaton is inputted (to be called "fail" or "failure" herebelow). Part of finite automatons generated in this example is omitted in FIG. 8.

Identifiers of users who have specified the retrieval conditions from which the respective retrieval terms are extracted are set as user list elements to be respectively linked with retrieval term detection states of the automaton. In FIG. 8, for example, when "new" is collated, a user list element is referred to via the last state "6". Therefore, it is detected user 1 has specified "new".

Delivery threshold values are then extracted from the retrieval conditions registered by the users. A delivery threshold value of 8.0 is extracted from the retrieval condition of user 1. Similarly, 3.5 and 7.0 are obtained as delivery threshold values from the retrieval conditions of users 2 and 3, respectively.

These values are stored in a similarity control table in association with the respective user identifiers.

An outline of the text retrieval will be described by referring now FIG. 9. In this diagram, the scanning is conducted by the automaton of FIG. 8 according to "the car maker announced a new model car . . . " to retrieve a matching retrieval condition.

Figure 9:
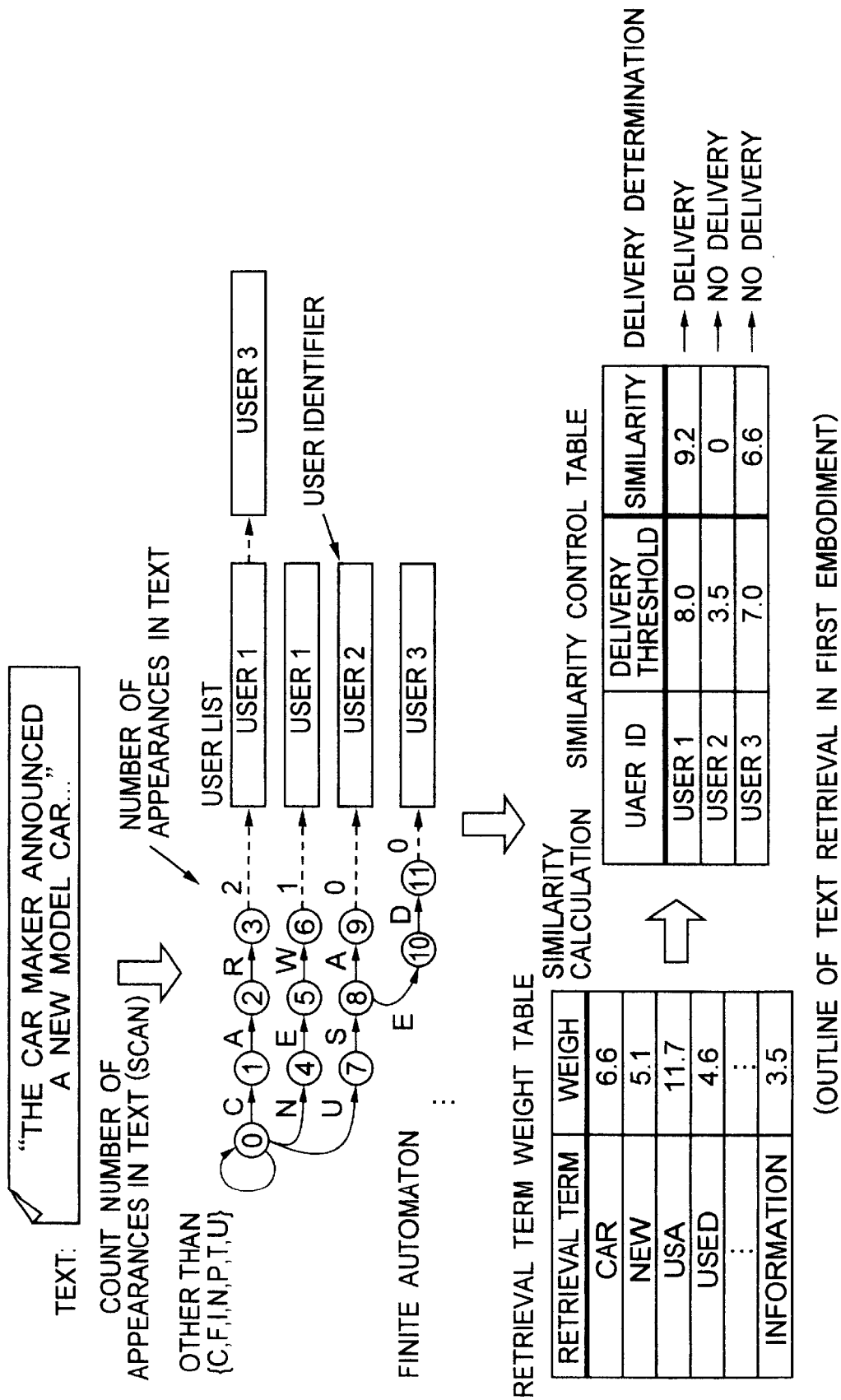
FIG. 9 is a diagram to explain an outline of text retrieval in the first embodiment.

The automaton of FIG. 9 first calculates the number of appearance of each retrieval term in the text. In this automaton, the number of appearances of each term is shown in the vicinity of the last state. Since a partial character string matching retrieval term "car" appears twice, "2" is indicated for the last state "3". A partial character string matching retrieval term "new" appears once and hence "1" is indicated for the last state "6".

For each retrieval term matching a partial character string of the text, a user list element linked with its last state is referred to and similarity of the text is calculated with respect to the retrieval conditions of the users. To calculate the similarity, it is possible to use a similarity calculation formula (2) described in prior art 3.

$$Similarity = \sum_{i}^{Q}\left((C + IDF(i)) \times \left(K + (1-K)\frac{freq(i)}{\max(freq(j))}\right)\right) \qquad (2)$$

In the expression, Q indicates the number of retrieval terms extracted from the retrieval conditions of the users, C and K are constants, IDF(i) denotes IDF of retrieval term (i), freq(i) is the number of appearances of retrieval term (i) in the text, and max(freq(j)) is a maximum value of the number of appearances of retrieval term in the text.

Assume in this example that constants C and K are zero. Similarity of text to the retrieval condition of user 1 is calculated as 9.2(6.6×2/2+5.1×1/2=9.15). Similarly, the values of similarity for users 2 and 3 are obtained as 0 and 6.6, respectively.

When the similarity exceeds a predetermined delivery threshold value, the text is delivered to the user associated with the pertinent retrieval condition. Since the threshold value of user 1 is 8.0 and the text similarity is 9.2, the text is sent to user 1. However, users 2 and 3 have respectively threshold values 3.5 and 7.0 and the text similarity values thereof are respectively 0.0 and 6.6. The threshold values are not exceeded and hence the text is not delivered to users 2 and 3.

In this embodiment above, the text is scanned by a finite automaton to calculate, for each retrieval term, the number of appearances thereof in the text. Similarity of the text to the retrieval conditions of the users is calculated referring to the user list. The text is delivered to any user who has specified a retrieval condition for which the similarity satisfies a delivery condition predetermined for the user.

Resultantly, the similarity of the text with respect to the retrieval conditions of a plurality of users can be calculated through one scanning operation of the text. Since the delivery threshold value is compared with the similarity for each user, even a text having a low similarity value can be delivered to a user who requests a large amount of information. Moreover, a text having a high similarity value can be delivered to a user requesting only important information.

Referring now to FIG. 1, description will be given in detail of a first embodiment in accordance with the present invention.

The first embodiment of a document retrieving and delivering system in accordance with the present invention includes a display 100, a keyboard 101, a central processing unit (CPU) 102, a main memory 104, and a bus 103 connecting these constituent units to each other.

Bus 103 is linked via a communication line 105 such as a local area network (LAN) with a news delivery source 106 to deliver news and a user 107 who accesses the document retrieving and delivering system. News delivery source 106 delivers electronic texts of new data via e-mail and/or "electronic news" to this system or presents texts via the Internet. User 107 registers retrieval conditions via e-mail to this system. The system delivers texts retrieved according to the retrieval condition to the user.

In the description of this embodiment, news source 106 delivers texts via e-mail or the like to the system. However, it is also possible that source 106 presents texts only onto the Internet such that the texts are collected by an information collecting robot. Moreover, user 107 registers texts via e-mail to the system. However, the user may use the Internet for the registration. Additionally, this system delivers the texts retrieved according to the retrieval conditions via an e-mail to the pertinent users. The system may present the texts via the Internet or the like.

Memory 104 is loaded with a system control program 110, a retrieval condition registration control program 111, a text retrieval and delivery control program 112, an e-mail program 113, a finite automaton 114, a user list 115, a retrieval term weight table 116, a similarity control table 117, a work area 118, a retrieval condition acquiring program 120, retrieval term extraction program 121, a retrieval term weight calculation program 122, a retrieval automaton creation program 123, a delivery threshold setting program 124, a text acquiring program 130, a text retrieval program 131, and a text generator program 132.

Retrieval automaton creation program 123 includes a finite automaton creation program 140 and a user list creation program 141.

Although a finite automaton is employed to extract retrieval terms from a text in this embodiment, the term extracting technique is not restricted by this example. Namely, in addition to the finite automaton, there may be used an extended BM method (to be referred to as prior art 3 herebelow) described in pages 175 to 189 of "Nikkei Byte" published in August 1987. When the extended BM method is used, the expression of "retrieval automaton creation program" and "finite automaton creation program" are not appropriate. Using a more general expression, these program will be designated, for example, "retrieval character string collation table creation program" and "multiple character string collation table creation program".

Text retrieval program 131 includes a text scan program 150, a similarity calculation program 151, and a text delivery determination program 152.

These programs may be stored on a recording media such as a hard disk (not shown) or a floppy disk (not shown) on which data can be written or from which data can be read by a computer.

System control program 110 initiates its operation on receiving an instruction of a manager of the document retrieving and delivering system from a keyboard 101.

The retrieval condition registration control program 111 and text retrieval and delivery program 112 are activated by system control program 110 in response to an indication of registration of a retrieval condition from user 107 or for text delivery from news source 106. The program 111 controls programs 120 to 123, and the program 112 controls programs 130 to 132.

An existing mail program generally employed in a workstation is used as E-mail program 113. Program 113 is initiated by system control program 110 according to a result of processing of text retrieval and delivery control program 112.

Description will next be given of a processing procedure of the embodiment of the document retrieving and delivering system.

Figure 3:
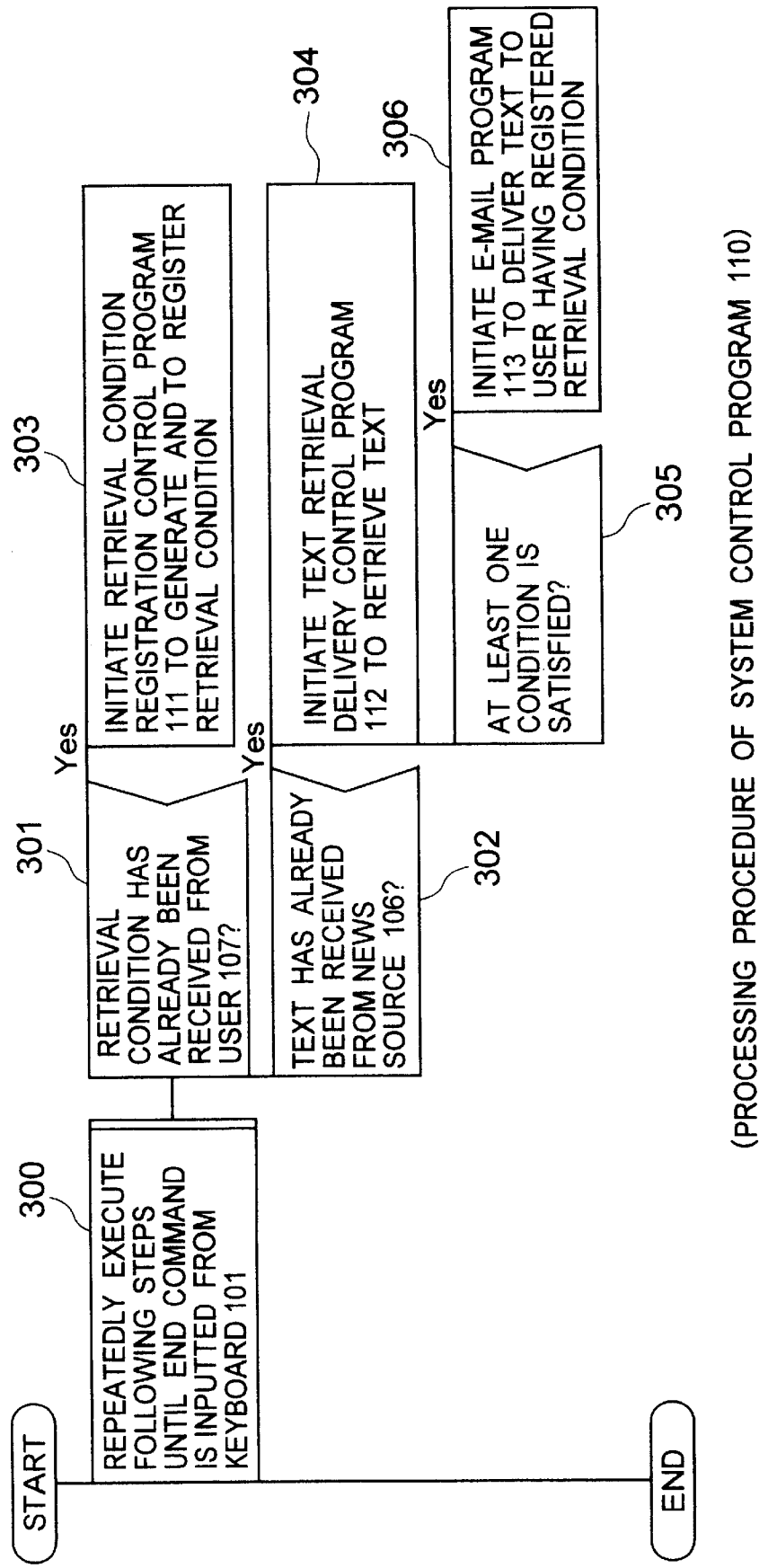
FIG. 3 is a problem analysis diagram (PAD) showing a processing procedure of system control program 110 of the first embodiment.

First, a processing procedure of system control program 110 will be described by referring to a PAD (Problem Analysis Diagram) of FIG. 3.

In step 300, program 110 repeatedly executes subsequent steps until an end command is inputted from keyboard 101.

In this processing, program 110 checks to determine in step 301 whether or not a retrieval condition has been received via e-mail from user 107. If the condition has been received, program 110 initiates program 111 in step 303 to generate and to register a retrieval condition.

In step 302, program 110 makes a check to determine whether or not a text has been received via e-mail from news source 106. If the text has been received, program 110 initiates program 112 in step 304 to retrieve the text.

In step 305, program 110 checks a result of the text retrieval conducted by program 112. If at least one retrieval condition is satisfied, program initiates e-mail program 113 in step 306 to deliver the text via e-mail to the user having specified the pertinent retrieval condition.

The processing procedure of program 110 has been described.

Referring next to a PAD of FIG. 4, description will be given of a processing procedure of program 111 activated in step 303 shown in FIG. 3.

In step 400, program 111 initiates program 120 to acquire a retrieval condition received via e-mail from user 107 to store the condition in work area 118.

In step 401, program 111 activates program 121 to extract retrieval terms from a seed document in the retrieval condition stored in work area 118 and stores the terms in work area 118.

In step 402, program 111 initiates program 122 to calculate weights of the retrieval terms stored in work area 113 and stores the weights in table 116.

In step 403, program 111 activates program 123 to generate finite automaton 114 to collate all retrieval terms contained in the retrieval condition.

In step 404, program 111 initiates program 124 to store in table 117 a delivery threshold value specified in the retrieval condition.

The processing procedure of program 111 has been described.

Figure 6:
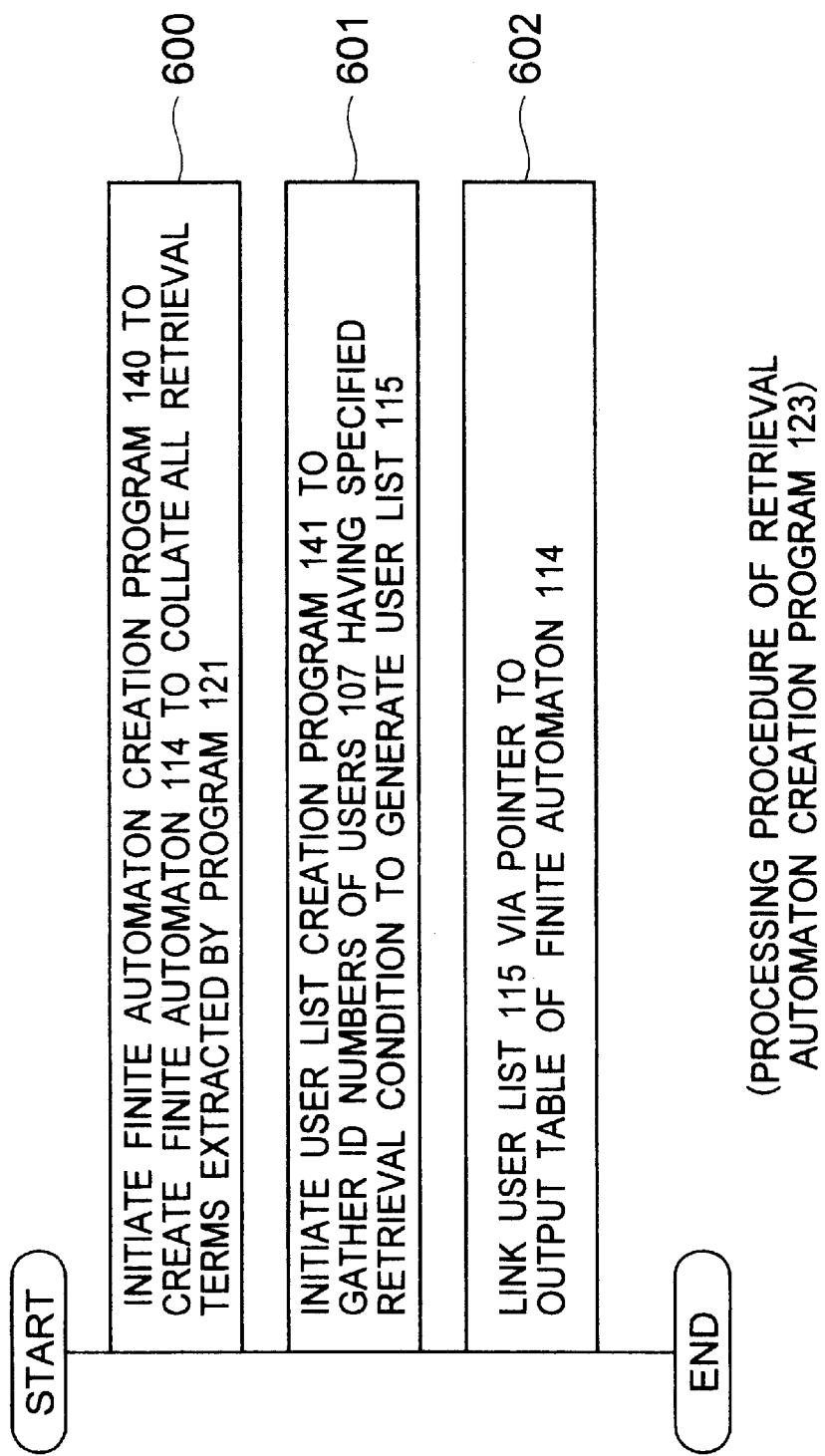
FIG. 6 is a PAD showing a processing procedure of a retrieval automaton generator program 123 of the first embodiment.

Referring now to the PAD of FIG. 6, description will be given of program 123 initiated by program 111 in step 403 of FIG. 4.

In step 600, program 123 initiates program 140 to create finite automaton 114 to collate all retrieval terms which are extracted and stored in work area 118 by program 121.

In step 601, program 123 initiates program 141 to gather identification numbers of users 107 having specified the retrieval condition to generate a user list 115.

In step 602, program 123 links user list 115 via a pointer to an associated output table of finite automaton 114.

The processing procedure of retrieval automaton creation program 123 has been described.

Figure 10:
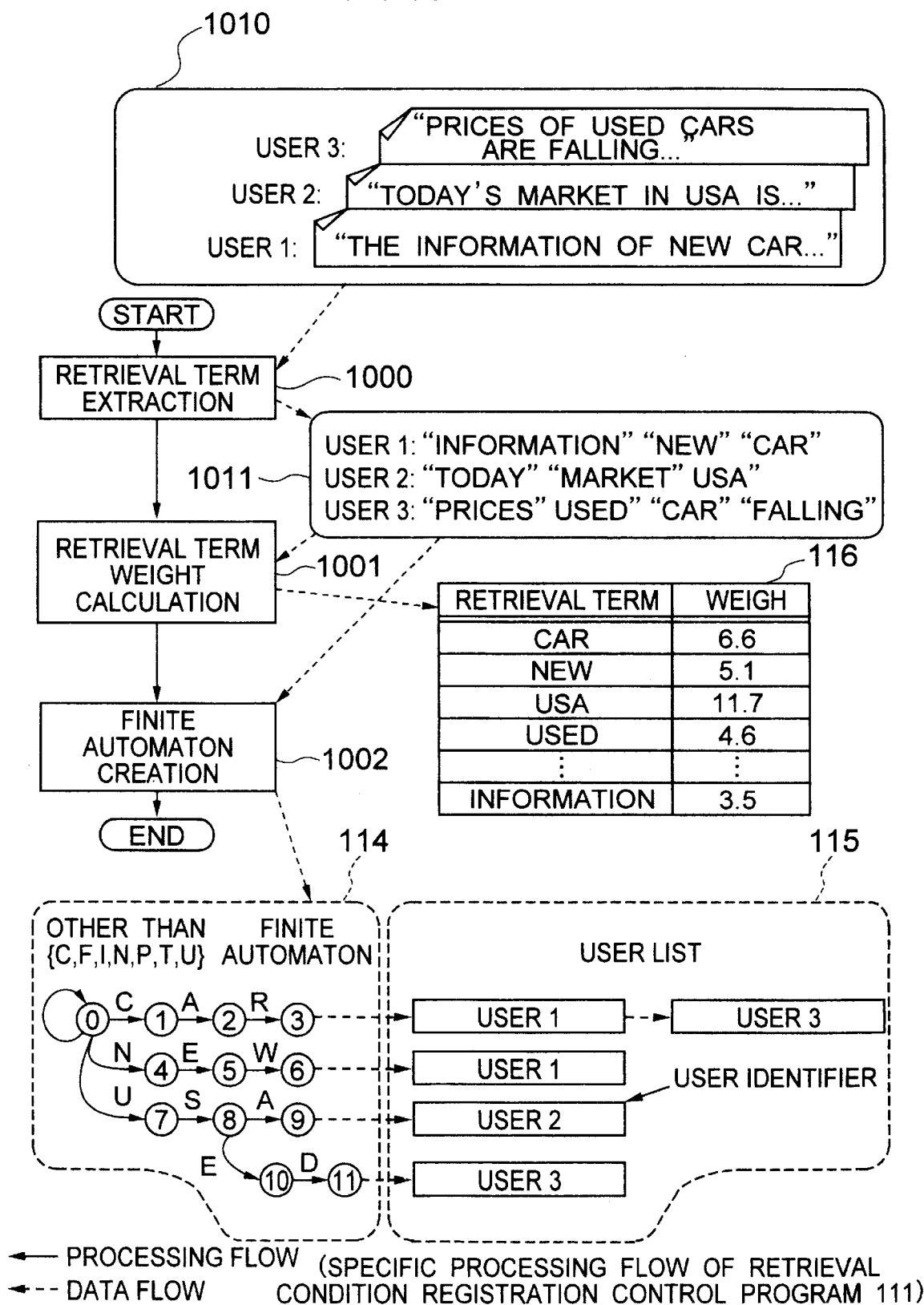
FIG. 10 is a flowchart showing a concrete processing flow of retrieval condition registration control program 111 of the first embodiment.

Referring now to FIG. 10, description will be given of a processing flow of retrieval condition registration control program 111 shown in FIG. 4.

In step 1000, program 111 extracts retrieval terms 1011 from retrieval conditions 1010 sent via e-mail from users 107. In this example, three retrieval terms "information", "new", and "car" are extracted from retrieval condition user 1 "the information of new car . . . " registered by user 1. In a similar way, three terms "today" and "market" are extracted from the condition of user 2 and four terms "price", "used", "car", and "falling" are extracted from the condition of user 3.

In the retrieval term extracting technique in a language including a space to separate words from each other as above, words other than those frequently used such as "or" and "the" are used as retrieval terms to be extracted. However, there may be used other methods.

For example, in a language such as Japanese which does not use a separation code between words, there may be used a method described in JP-A-8-335222 in which words included in a seed document are extracted as retrieval terms by referring to a word dictionary through morphological analysis. However, the words not contained in the word dictionary cannot be extracted. Consequently, it is favorable, as described in prior art 2 to use statistic information in the text database to extract all words written in the document as retrieval terms without using the word dictionary. Although prior art 2 employs probability of appearance of each n-gram in the text database, it may be possible in a document retrieving and delivering system to use probability of appearance of each n-gram in all texts delivered, in a text database to which the texts delivered are registered, or in a text database to which documents other than the texts delivered are registered.

In step 1001, program 111 calculates, according to a predetermined calculation formula, importance for all retrieval terms 1011 extracted from retrieval conditions 1010 and stores the values of importance in weight table 116. The IDF formula, i.e., expression (1) described above may be used for this purpose. Using expression (1), when retrieval term "car" appears in 2000 texts in a text database including, for example, 100 thousand texts, 6.6 is obtained as importance of "car". The total number of documents in the database and the number of documents in which the retrieval term appears may respectively be the number of texts delivered from news source 106 and the number of texts in which the term appears. Alternatively, these values may be obtained by referring to a text database to which texts other than the texts delivered are registered.

In step 1002, program 111 creates finite automaton 114 to collate all retrieval terms 1011 extracted from conditions 1010. The retrieval terms can be registered to the finite automaton in a method of prior art 1.

Figure 4:
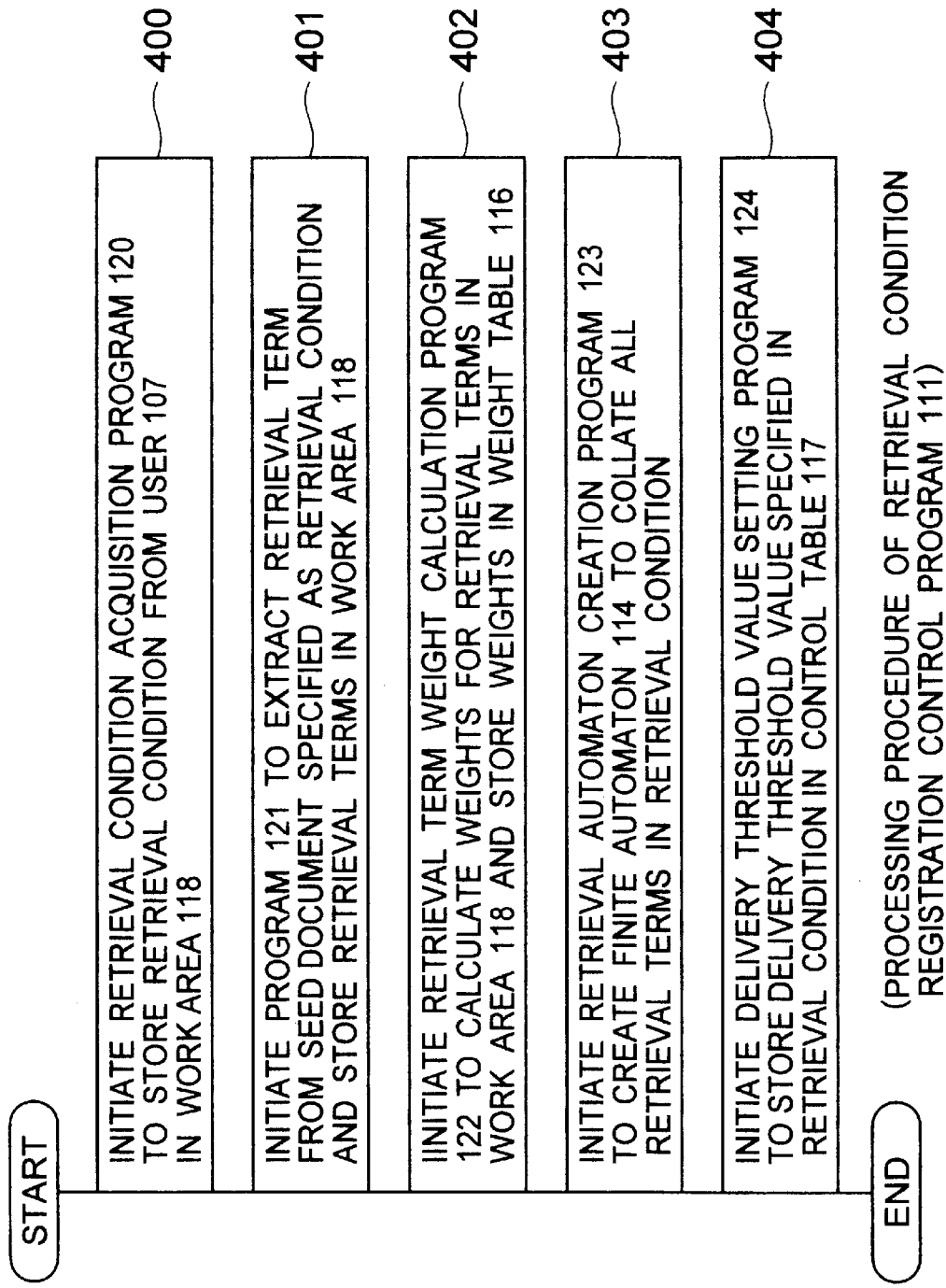
FIG. 4 is a PAD showing a processing procedure of a retrieval condition registration control program 111 of the first embodiment.

Description has been given of a specific processing procedure of retrieval condition registration control program 111 of FIG. 4.

Figure 5:
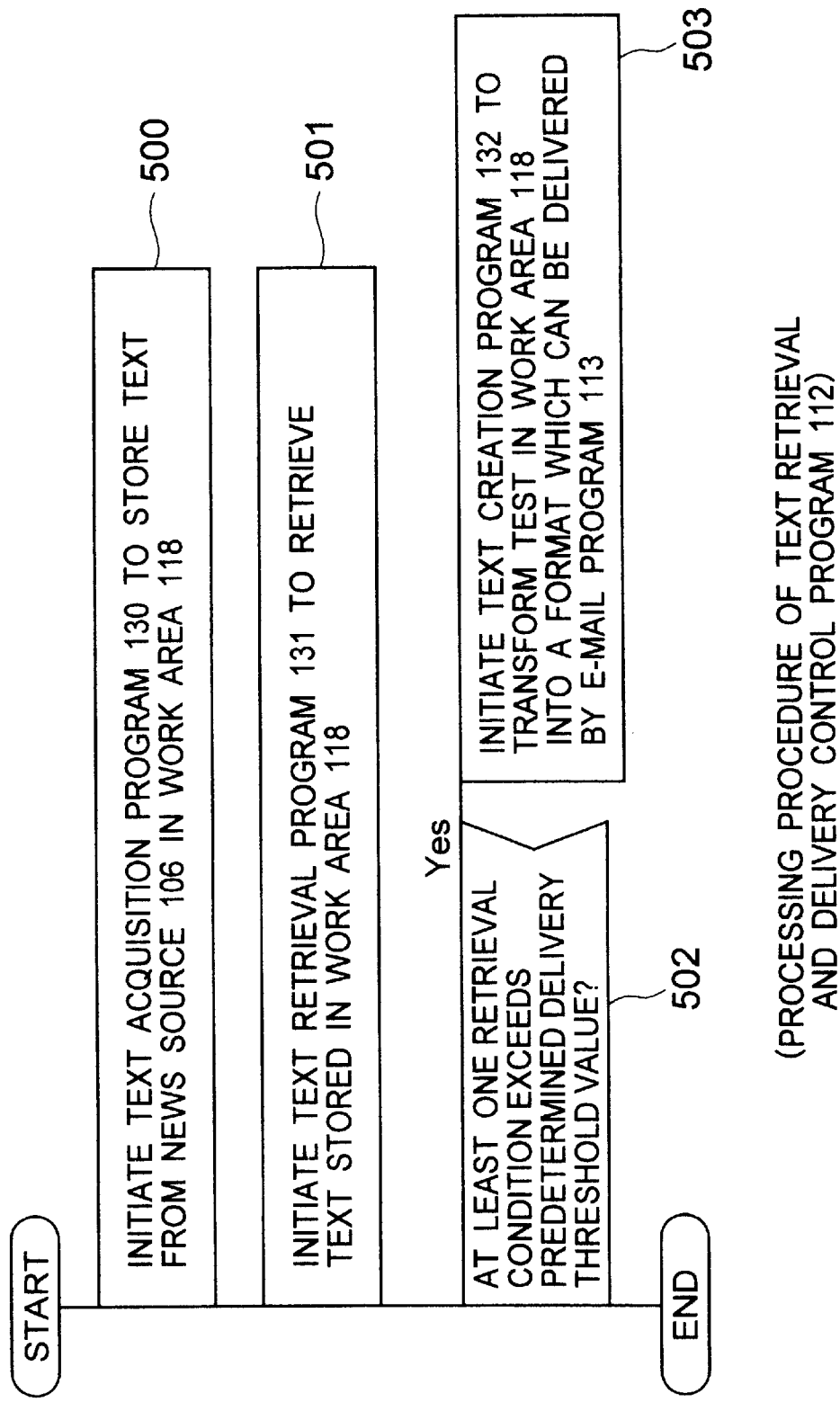
FIG. 5 is a PAD showing a processing procedure of a text retrieval and delivery control program 112 of the first embodiment.

Referring now to the PAD of FIG. 5, description will be given of text retrieval and delivery control program 112 initiated by system program 110 in step 304 of FIG. 3.

In step 500, program 112 initiates program 130 to store a text sent via e-mail or the like from news source 106 in work area 118.

In step 501, program 112 initiates program 131 to retrieve the text stored in work area 118.

In step 502, program 112 checks to determine whether or not at least one retrieval condition exceeds a predetermined delivery threshold value. If such a condition is present, program 112 executes step 503.

In step 503, program 112 initiates program 132 to transform the text in work area 118 into a format which can be delivered by e-mail program 113.

The processing procedure of 112 has been described.

Referring now to the PAD of FIG. 7, description will be given of a processing procedure of text retrieval program 131 initiated in step 501 of FIG. 5.

In step 700, program 131 resets to zero a retrieval term appearance count storage area in an output table of finite automaton 114.

In step 701, program 131 initiates program 150 to scan by finite automaton 114 the text stored in work area 118 by program 130 to count the number of appearances of a retrieval term in partial character strings of the text.

In step 702, program 131 initiates program 151 to calculate similarity of the text to each retrieval condition registered by users 107 according to a predetermined similarity calculating formula using the number of appearances of the retrieval term in the text obtained by program 150 and a weight of the retrieval term stored in table 116 by program 122. Program 131 stores the similarity in table 117.

In step 703, program 131 initiates program 152 to output to program 112 an identifier of each user having specified a retrieval condition for which the similarity of the text exceeds the delivery threshold value stored in table 117.

The processing procedure of text retrieval program 131 has been described.

Figure 11:
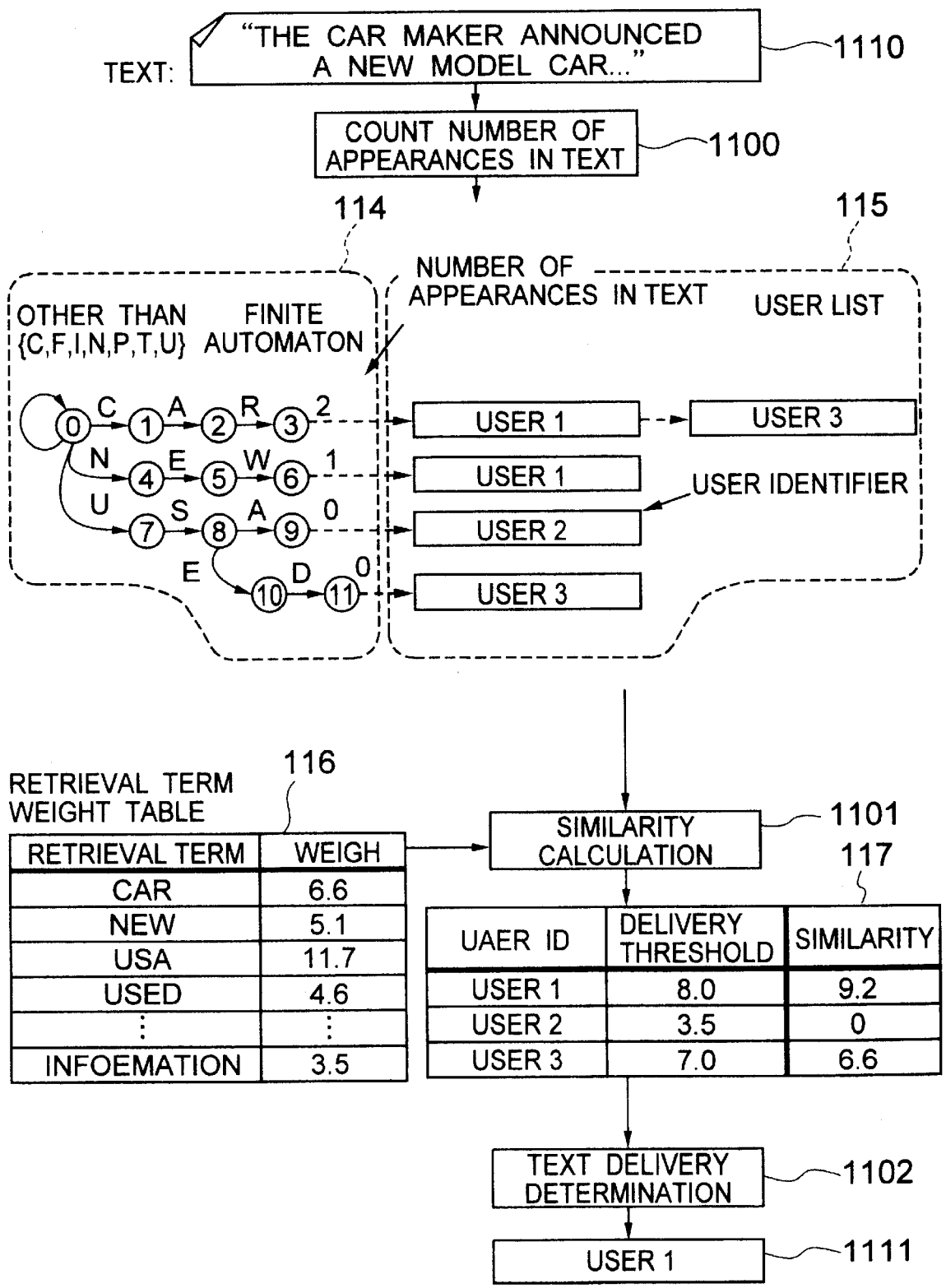
FIG. 11 is a flowchart showing a concrete processing flow of text retrieval program 131 of the first embodiment.

Referring now to FIG. 11, description will be given in detail of a processing flow of program 131 shown in FIG. 7.

In step 1100, program 131 collates by finite automaton 114 the retrieval terms extracted from the retrieval conditions registered by users 107 with a text 1100 stored in work area 118 by program 130 to count the number of appearance of each retrieval term in the text.

In this example, a text "the car maker announced a new model car . . . " is scanned by finite automaton 114 of FIG. 10 to retrieve a matching retrieval condition. In automaton of FIG. 11, the number of appearance of each retrieval term in the text is shown in the vicinity of the last state. A partial character string matching retrieval term "car" appears twice and hence "2" is indicated for the last state "3". A partial character string matching retrieval term "new" appears once and therefore "1" is indicated for the last state In step 1101, for the retrieval terms matching any partial character strings of the text, program 131 calculates similarity of the text to the retrieval conditions of the users by referring to user list elements respectively connected to the end states. Although this embodiment uses similarity calculating expression (2) to calculate the similarity, there may be employed other methods. According to expression (2), the similarity of text "the car maker announced a new model car . . . " to the retrieval conditions of the users is attained as follows.

User 1: 9.2
User 2: 0
User 3: 6.6

In step 1102, program 131 determines whether or not the similarity exceeds an associated delivery threshold value in table 117. When the condition is satisfied, the pertinent user identifier is outputted to program 112. This embodiment sets the delivery threshold values of users 1 to 3 as 8.0, 3.5, and 7.0, respectively. However, the other values may be set as conditions.

The similarity of the text to the retrieval conditions of the users is checked according to the text delivery conditions. Since the similarity of the retrieval condition registered by user 1, i.e., "the information of new car . . . " exceeds the delivery threshold value "8.0" of user 1. Accordingly, user identifier 1111, i.e., "user 1" is outputted to program 112.

In this embodiment as described above, the similarity of text to the retrieval conditions of a plurality of users can be calculated through only one scanning operation of the text. For each user, the delivery threshold value is compared with the similarity. Consequently, even a text having a low similarity value can be delivered to a user who requests a large amount of information. Furthermore, a text having a high similarity value can be delivered to a user requesting only essential information.

In the description of the embodiment, the delivery threshold value can be set for each user. However, there may be used common delivery threshold values in the system. This minimizes the storage capacity necessary for similarity control table 117.

To calculate similarity of the users, similarity calculation program 151 of the first embodiment sequentially processes user list 115 connected to the output table of finite automaton 114. When the number of users increases, this leads to a problem that a period of time to completely calculate similarity for all users becomes quite long. For example, even if processing for one user identifier connected to its user list takes only 0.01 second, 100 seconds are required for 10,000 user identifiers. Namely, a period of one minute 40 seconds lapse from when the similarity calculation is started to when the calculation is completed.

To solve the problem, the second embodiment of a document retrieving and delivering system in accordance with the present invention assigns priority of delivery to each user identifier to conduct the similarity calculation beginning at a user having highest priority. The delivery is more quickly achieved for users having higher priority.

The second embodiment is almost the same in constitution with the first embodiment of FIG. 1. These embodiments differ from each other in the processing procedure of text retrieval program 131a and connection between finite automaton 114 and user list 115. As shown in PAD of FIG. 13, step 1300 is added to program 131a in the second embodiment. As can be seen from FIG. 12, a user list 115 is connected via a priority identifier 1200 to finite automaton 114.

Figure 13:
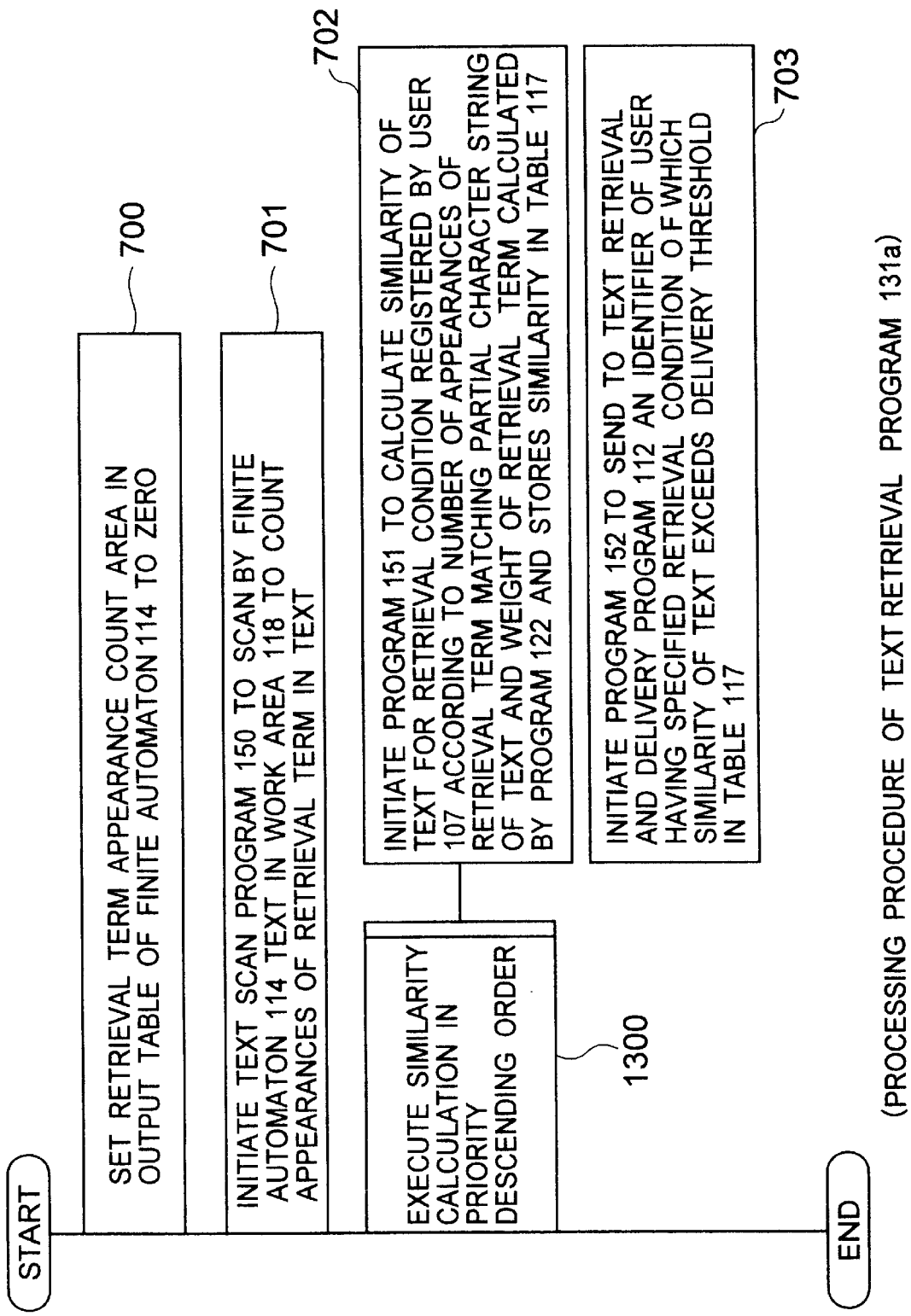
FIG. 13 is a PAD showing a processing procedure of a text retrieval program 131a of the second embodiment.

Referring now to the PAD of FIG. 13, description will be given of text retrieval program 131a of the second embodiment.

In step 700, program 131a resets a retrieval term appearance count storage area in an output table of finite automaton 114 to zero.

In step 701, program 131a initiates program 150 to scan by finite automaton 114 the text stored in work area 118 by program 130 to count the number of appearances of a retrieval term in partial character strings of the text.

In step 1300, program 131a repeatedly executes steps 702 and 703 in a descending order of priority indicated by priority identifier 1200 connected to finite automaton 114.

In step 702, program 131a initiates program 151 to calculate similarity of the text to each retrieval condition registered by users 107 according to a predetermined similarity calculating formula using the number of appearances of the retrieval term in the text obtained by program 150 and a weight of each retrieval term stored in table 116 by program 122. Program 131a then stores the similarity in table 117.

In step 703, program 131a initiates program 152 to output to program 112 an identifier of each user having specified a retrieval condition for which the similarity of the text exceeds the delivery threshold value stored in table 117.

The processing procedure of text retrieval program 131a has been described.

Figure 14:
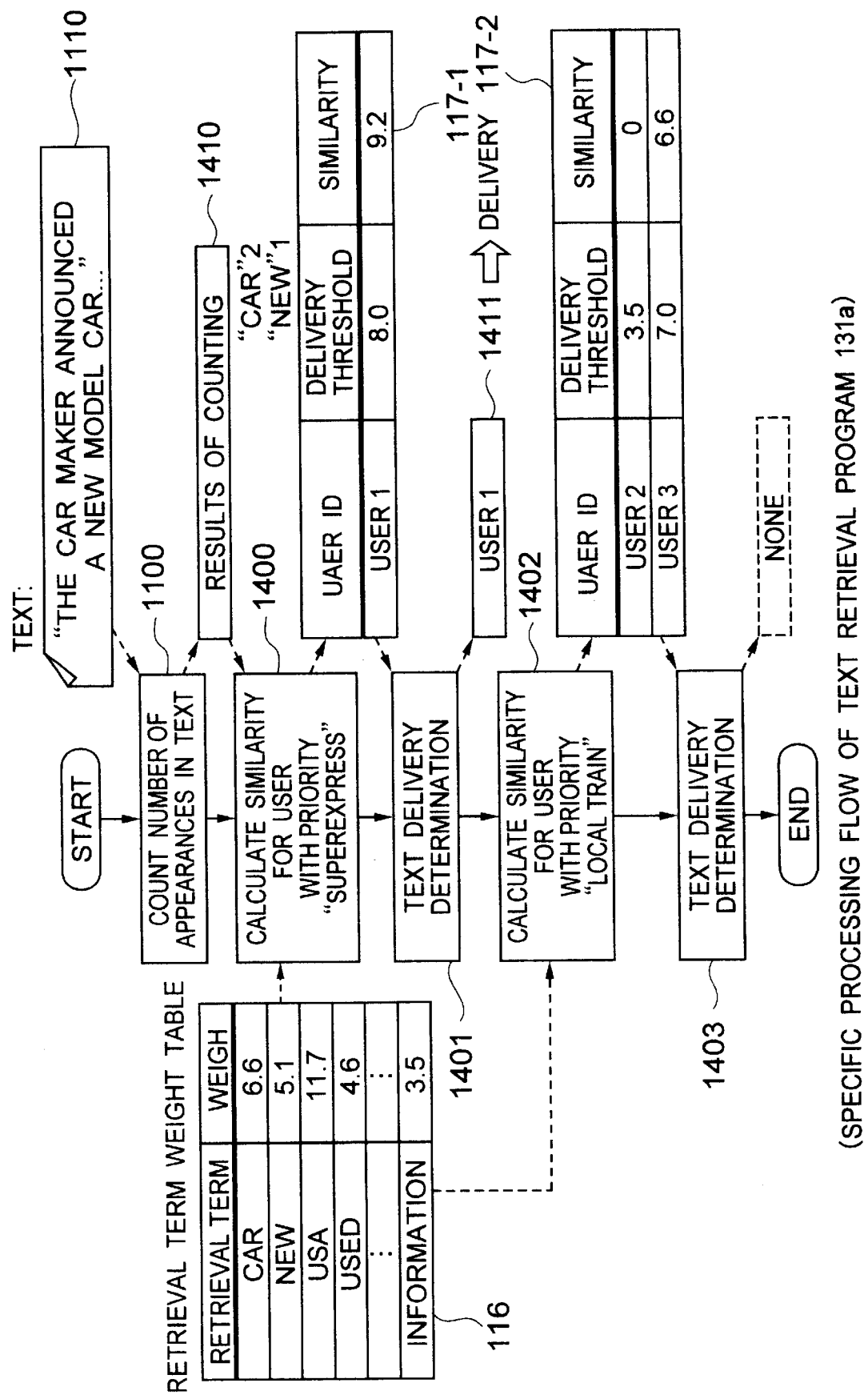
FIG. 14 is a flowchart to explain a concrete processing procedure of text retrieval program 131a of the second embodiment.

Referring to a specific example shown in FIG. 14, description will now be given of a concrete processing procedure of text retrieval program 131a.

In step 1100, program 131a counts the number of appearances of each retrieval term in text 1110 stored in work area 118 by program 130. In this example, there is obtained a result 1410 indicating that retrieval terms "car" and "new" respectively appear twice and once in text 1110 "the car maker announced a new model car . . . "

Figure 12:
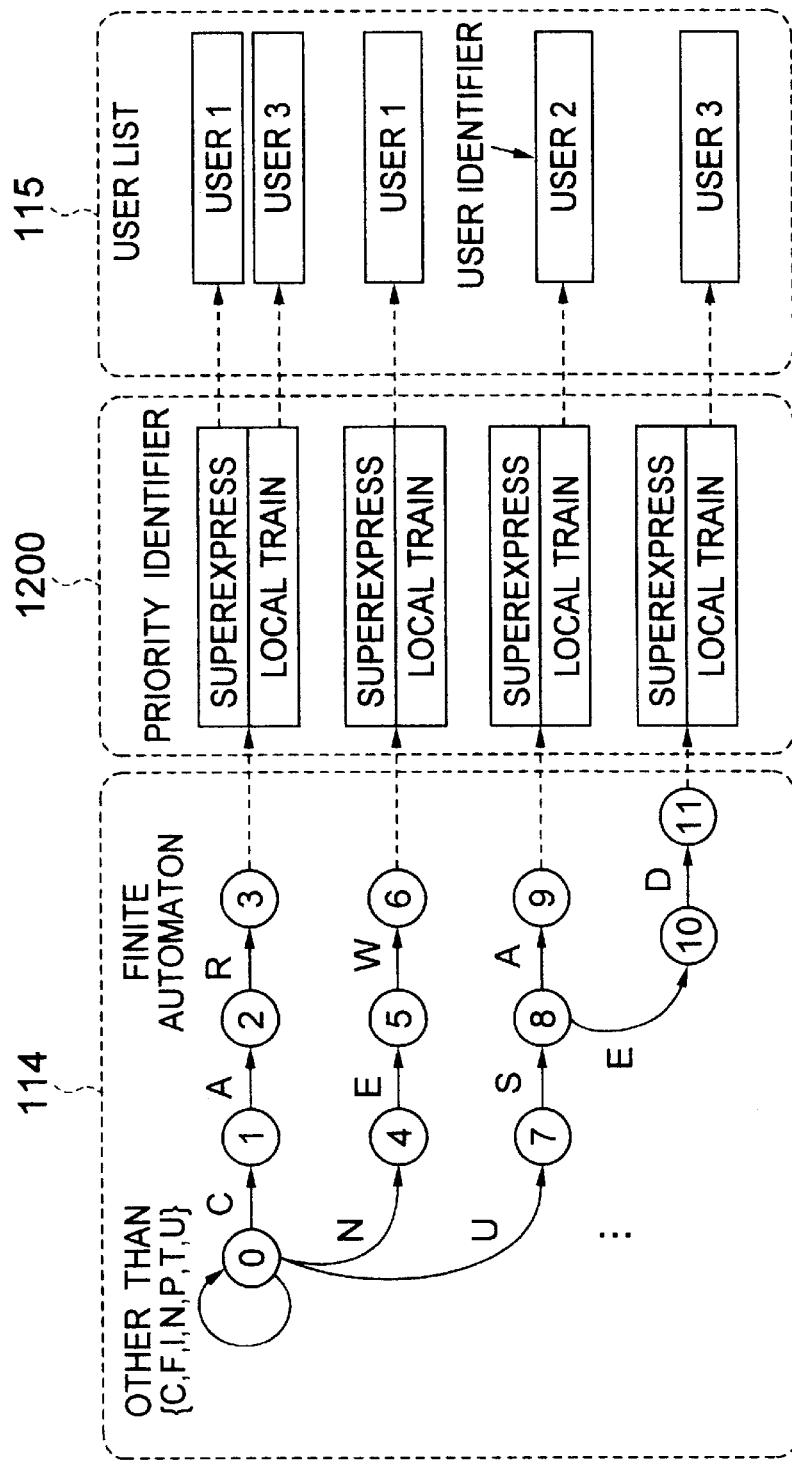
FIG. 12 is a diagram to explain a method of connecting a finite automaton 114 to a user list 115 in a second embodiment in accordance with the present invention.

In step 1400, program 131a calculates similarity of text 1110 by referring to a user list connected to "superexpress" priority identifier 1200 shown in FIG. 12. In the example of FIG. 14, similarity of text 1110 with respect to the retrieval condition of user 1 is obtained as 9.2.

In step 1401, program 131a checks to determine whether or not the similarity exceeds the delivery threshold value stored in the similarity control table. If the condition is satisfied, the user identifier is outputted to program 112. In this example, the delivery threshold value is 8.0 for user 1. However, any other text delivery condition may be employed. Since similarity "9.2" exceeds threshold value "8.0", "user 1" is outputted as the user identifier.

In step 1402, program 131a calculates similarity of text 1110 by referring to a user list connected to "local train" priority identifier 1200 shown in FIG. 12. In the example of FIG. 14, similarity of text 1110 to the retrieval conditions of users 2 and 3 are attained as 0 and 6.6, respectively.

In step 1403, program 131a checks to determine whether or not each similarity exceeds the delivery threshold value stored in the similarity control table. If the condition is satisfied, the user identifier is output to program 112. As a result, since the similarity values are less than the respective delivery threshold values, the identifiers of these users are not outputted.

In this embodiment described above, the text retrieval can be preferentially conducted for users having higher priority. It is therefore possible to provide a document retrieving and delivering system in which even when the number of users becomes greater, texts can be immediately delivered to users having higher priority.

In the description of the embodiment, priority identifier 1200 includes "superexpress" and "local train" assigned with respective priority levels set by the user. However, the identifier may include delivery priority according to, for example, posts in a firm such as "division manager" and "section manager" or according to a contract charging rate such as a rate for "user" and a rate for "trial user".

Figure 15:
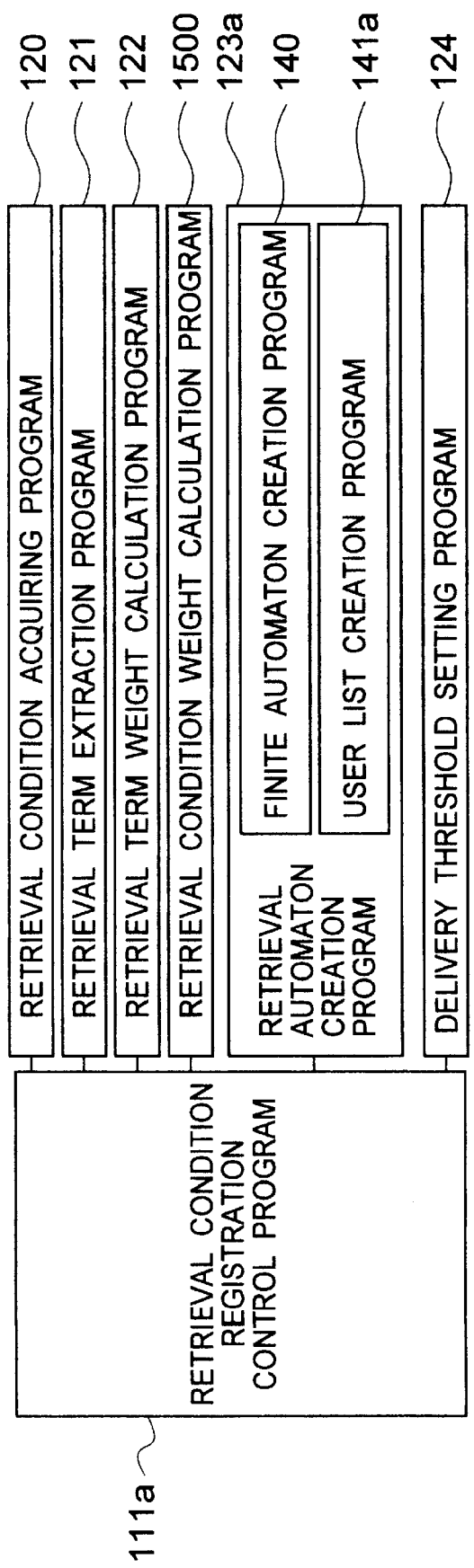
FIG. 15 is a diagram showing a layout of a retrieval condition registration control program 111a in a third embodiment.

Referring now to FIG. 15, description will be given of a third embodiment in accordance with the present invention.

In the first and second embodiments, the similarity is calculated assuming that the retrieval terms extracted from the seed document have the same importance regardless of a type of the seed document. However, this leads to a problem that even if the subject of the seed document changes, the retrieval terms have the same weight, and hence the subject of the seed document cannot be appropriately reflected in the results.

For example, retrieval term "HiRetrieval" extracted from retrieval condition "bunsho kensaku shisutemu toshitewa HiRetrieval ga yoku shirarete (HiRetrieval is well known as a document retrieval system)" is an example of a document retrieving system. For retrieval condition "HiRetrieval", it is possible to conduct logical operations such as AND and OR. For HiRetrieval, it is possible to register structured documents or texts described in the standard generalized markup language (SGML), the extensible markup language (XML), or the like. Furthermore, in HiRetrieval, retrieval term "HiRetrieval" extracted is a word representing the theme of the document and is quite important.

In the third embodiment of the document retrieving and delivering system of the present invention, the problem above is removed by adding a retrieval term weight to the user list with respect to each retrieval condition.

The third embodiment is almost the same in constitution as the first embodiment of FIG. 1, but includes a different retrieval condition registration control program 111 and an additional program, i.e., retrieval condition weight calculation program 1500 as shown in FIG. 15. The format of user list 115 created by user list creation program 141a and the processing procedure of similarity calculation program 151 are different from those of the first embodiment.

Figure 16:
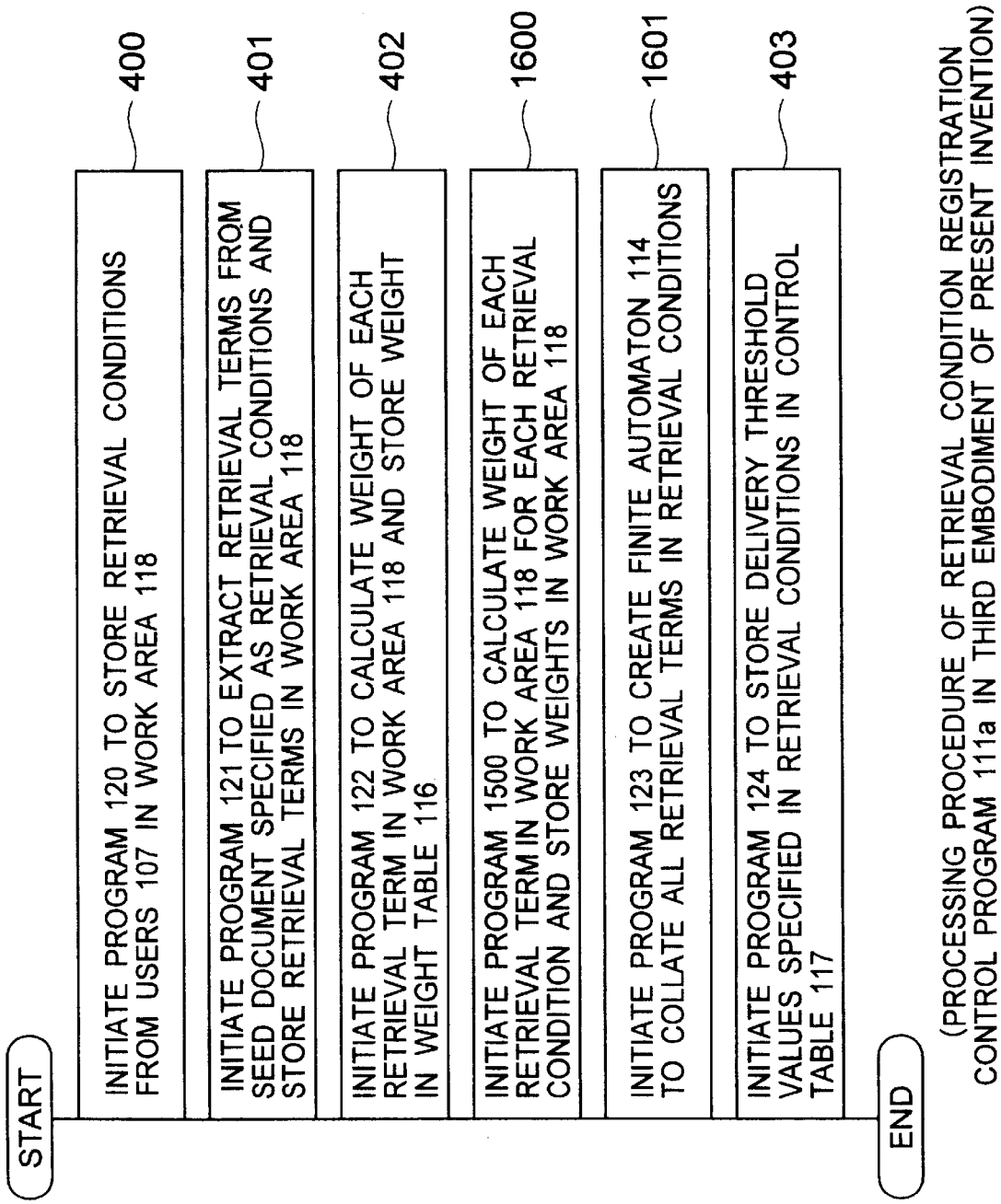
FIG. 16 is a diagram to explain a concrete processing procedure of retrieval condition registration control program 111a in the third embodiment.

Referring now to FIG. 16, description will be given of a processing procedure of retrieval condition registration control program 111a which is different from program 111 of the first embodiment.

In step 400, program 111a initiates program 120, which acquires retrieval conditions sent via e-mail from users 107 and which stores the conditions in work area 118.

In step 401, program 111a initiates program 121 to extract the retrieval terms from a seed document in the retrieval conditions in work area 118 and to store the terms in work area 118.

In step 402, program 111a initiates program 122, which calculates weights of retrieval terms in work area 118 and which stores the weights in retrieval term weight table 116.

In step 1600, program 111a initiates program 1500, which calculates weights of the retrieval terms in work area 118 for each retrieval condition and which stores the weights in work area 118.

In step 1601, program 111a initiates a retrieval automaton creation program 123a to create finite automaton 114 to collate all retrieval terms in the retrieval conditions.

In step 404, program 111a initiates program 124 to store in table 117 the delivery threshold values specified in the retrieval conditions.

The processing procedure of retrieval condition registration control program 111a has been described.

Figure 17:
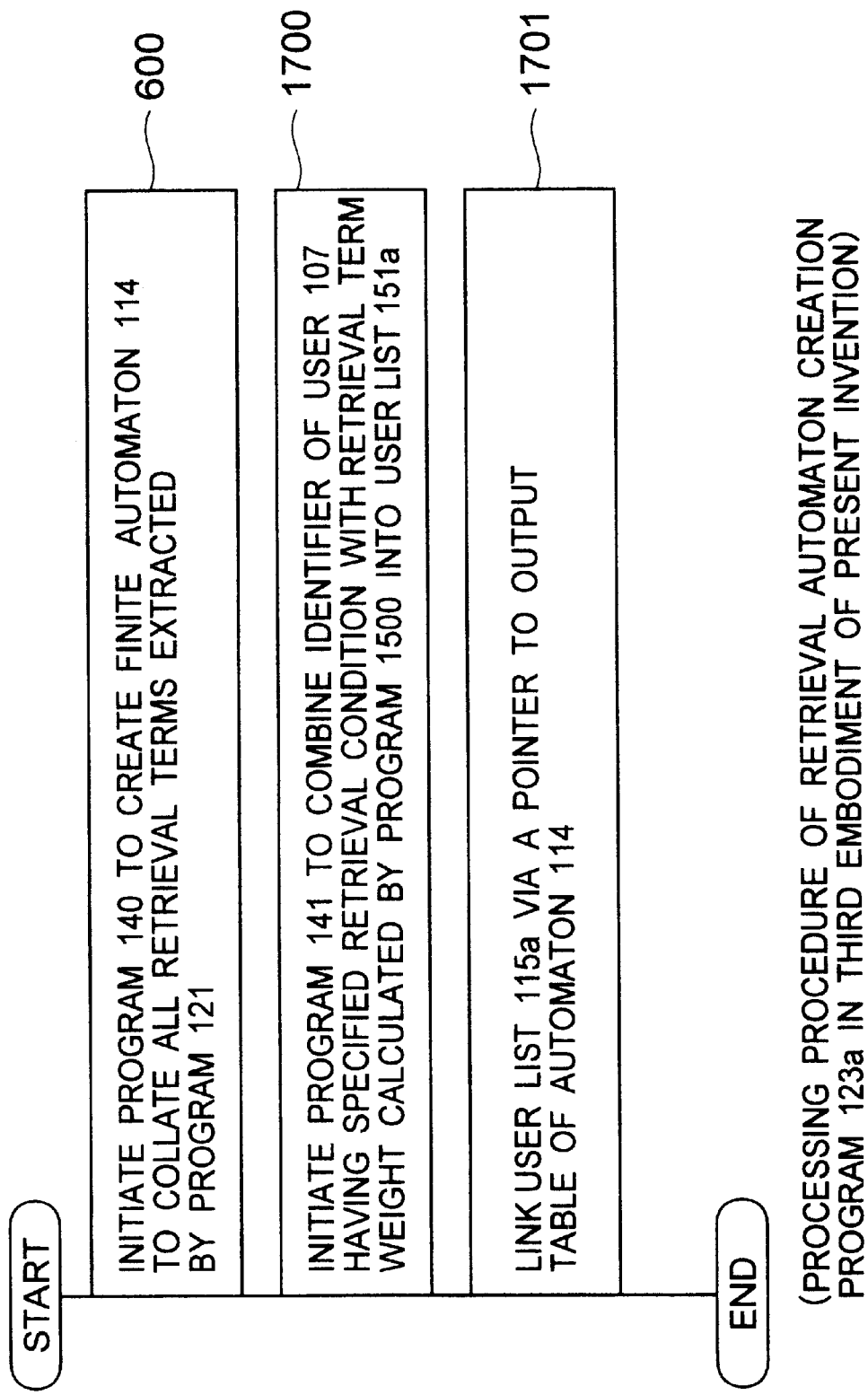
FIG. 17 is a PAD showing a processing procedure of a retrieval automaton generator program 123a of the third embodiment.

Referring next to the PAD of FIG. 17, description will be given of a processing procedure of program 123a initiated in step 1601 by program 111a.

In step 600, program 123a initiates program 140 to generate finite automaton 114 to collate all retrieval terms which are extracted and stored in work area 118 by program 121.

In step 1700, program 123a initiates program 141a which couples an identifier number of user 107 having specified the retrieval condition with a weight of the retrieval term for the retrieval condition, the weight being stored in work area 118 by program 1500. Program 141a resultantly creates a user list 115a.

In step 1701, program 123a connects user list 115a via a pointer to an output table of finite automaton 114.

The processing procedure of retrieval automaton creation program 123a has been described.

Figure 18:
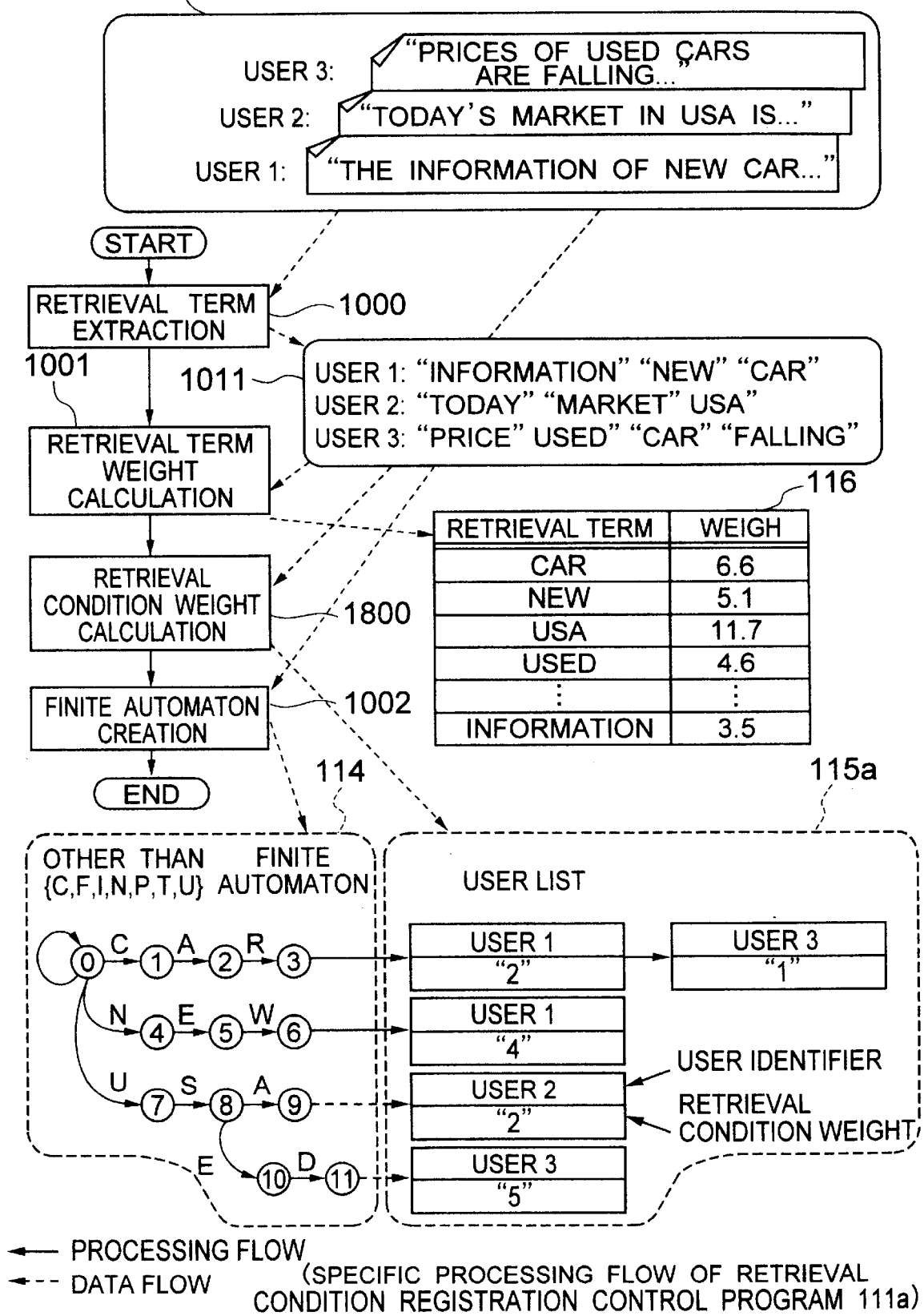
FIG. 18 is a diagram to explain a concrete processing procedure of retrieval condition registration control program 111a of the third embodiment.

Referring now to FIG. 18, description will be given of a processing flow of a retrieval condition registration control program in the third embodiment shown in FIG. 15.

In step 1000, program 111a extracts retrieval terms 1011 from retrieval conditions 1010 sent via e-mail from users 107. In this example, three retrieval terms "information", "new", and "car" are extracted from retrieval condition user 1 "the information of new car . . . " registered by user 1. In a similar fashion, three terms "today", "market", and "USA" are extracted from the condition of user 2 and four terms "price", "used", "car", and "falling" are extracted from the condition of user 3.

In the technique to extract retrieval terms in a language including a space to separate words from each other as above, words other than whose frequently used such as "or" and "the" are used as retrieval terms to be extracted. However, there may be used other methods.

For example, in a language such as Japanese which does not use a separation code between words, there may be used a method described in JP-A-8-335222 in which words contained in the seed document are extracted as retrieval terms by referring to a word dictionary through morphological analysis. However, the words not contained in the word dictionary cannot be extracted. Consequently, it is favorable, as described in prior art 2 to use statistic information in the text database to extract all words written in the document as retrieval terms without using the word dictionary. Although prior art 2 employs probability of appearance of each n-gram (character strings each having n continual characters) in the text database, it may be possible in a document retrieving and delivering system to utilize probability of appearance of each n-gram in all texts delivered, in a text database to which the texts delivered are registered, or in a text database to which documents other than the texts delivered are registered.

In step 1001, program 111a calculates, according to a predetermined calculation formula, importance for all retrieval terms 1011 extracted from retrieval conditions 1010 and stores the values of importance in weight table 116. IDF formula (1) described above may be used to calculate the weight for each retrieval term. Using expression (1), when retrieval term "car" appears in 2000 texts in a text database including, for example, 100 thousand texts, 6.6 is obtained as importance of "car". The total number of documents in the database and the number of documents in which the retrieval term appears may respectively be the number of texts delivered from news source 106 and the number of texts in which the term appears. Alternatively, these values may be obtained by referring to a text database to which texts other than the texts delivered are registered.

In step 1800, program 111a calculates, according to a predetermined calculation formula, retrieval condition importance of each retrieval term 1011 extracted from retrieval conditions 1010 with respect to each retrieval condition and then stores the importance in work area 118. The importance may be the number of appearances of the term in the retrieval condition.

In step 1002, program 111a creates finite automaton 114 to collate all retrieval terms 1011 extracted from conditions 1010. The retrieval terms can be registered to the automaton in a method of prior art 1.

Description has been given of a specific processing procedure of retrieval condition registration control program 111a of FIG. 15.

Figure 19:
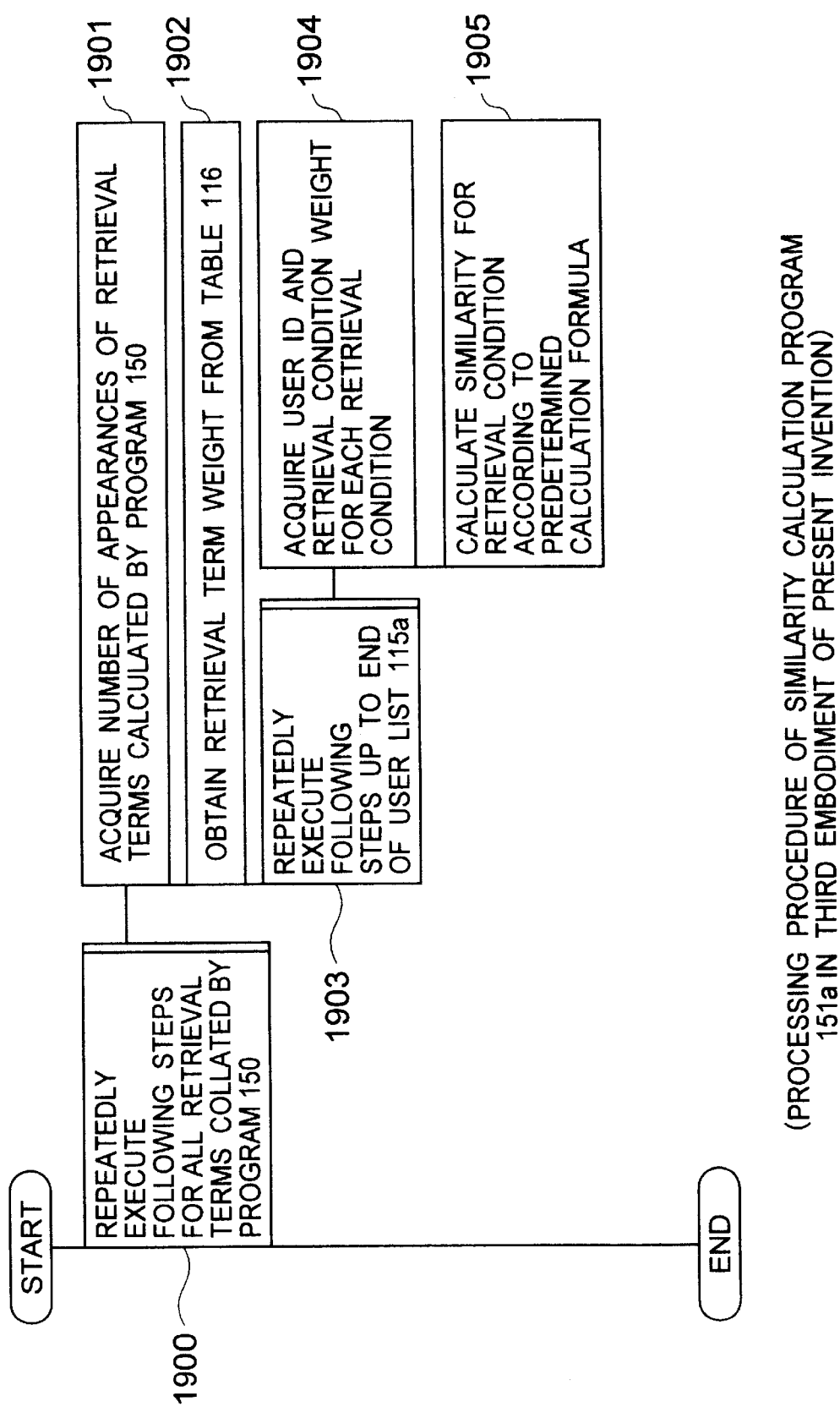
FIG. 19 is a PAD showing a processing procedure of a text retrieval program 151a of the third embodiment.
Figure 20:
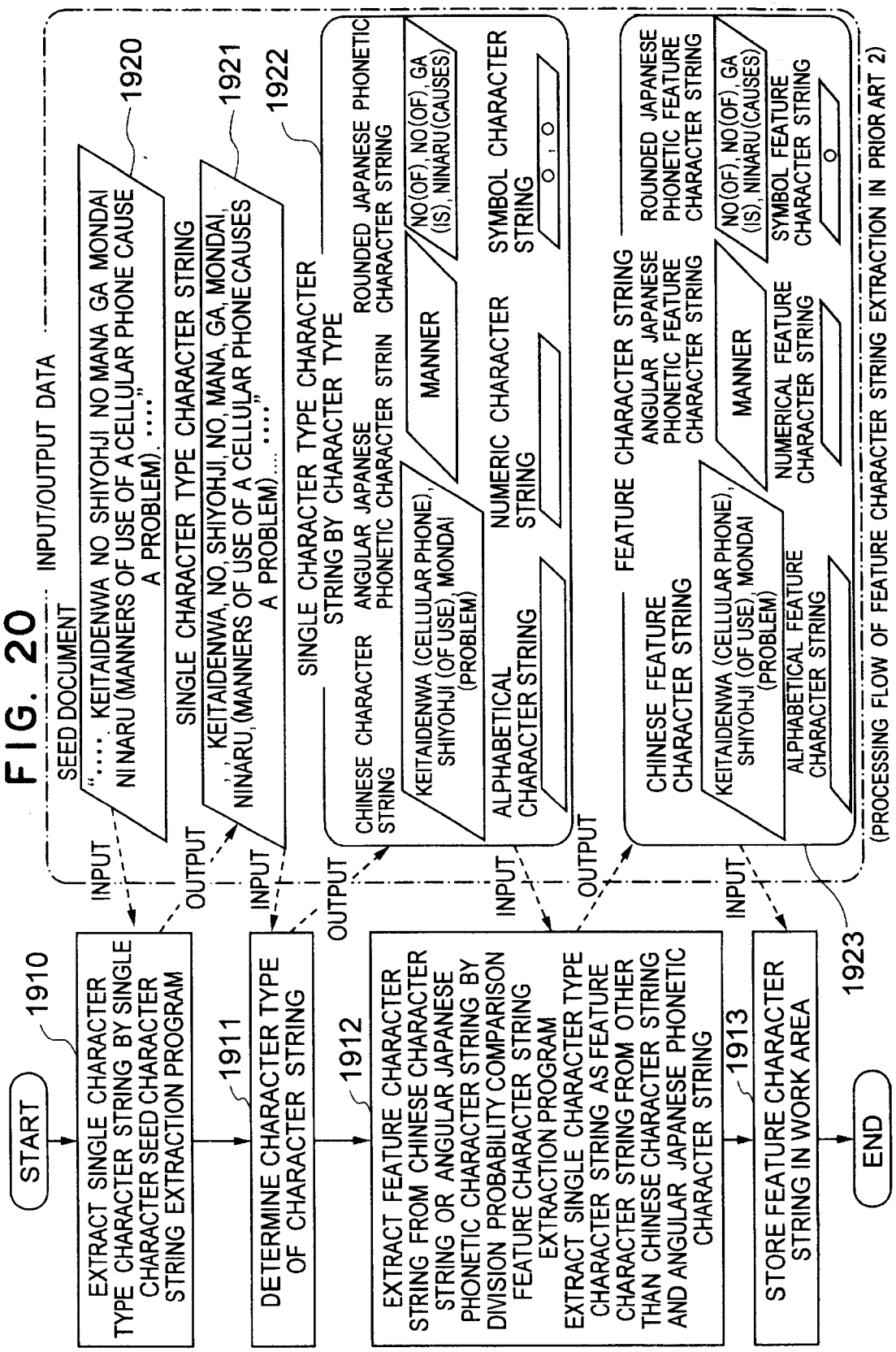
FIG. 20 is a flowchart showing a flow of feature character string extraction in prior art 2.

Referring now to the PAD of FIG. 19, description will be given of a processing procedure of a similarity calculation program 151a of third embodiment which is different from those of the first and second embodiments above in accordance with the present invention.

In step 1900, program 151a repeatedly executes steps 1901 to 1905 for all retrieval terms collated by program 150.

In step 1901, program 151a obtains by program 150 the number of appearances of the retrieval term. In step 1902, program 151a acquires a weight of the retrieval from weight table 116.

Program 151a then repeatedly executes steps 1904 and 1905 for the user identifiers of user list 115a. In step 1904, program 151a acquires a user identifier and a retrieval condition weight of the pertinent retrieval condition. In step 1905, program 151a calculates similarity for each retrieval condition according to a predetermined calculation formula.

The processing procedure of similarity calculation program 151a has been described.

In accordance with the third embodiment described above, a high weight can be added to retrieval terms representing subjects of the retrieval conditions registered by the respective users. Consequently, it is possible to provide a document retrieving and delivering system having high precision.

Description will now be given of a fourth embodiment in accordance with the present invention.

In the first to third embodiments above, a text having similarity equal to or more than a predetermined value (to be referred to as a delivery threshold value herebelow) is delivered in step 1102 of FIG. 11. However, this is attended with a problem that a delivery threshold value cannot be appropriately assigned for the retrieval conditions set by the users as follows.

For example, when a too great value is set as the threshold value, desired texts cannot be delivered to some users. Conversely, when a too small value is specified, some users receive a large amount of texts not requested. It is therefore necessary to modify the delivery threshold value initialized. This leads to a problem, i.e., how to modify the threshold value for the user to acquire all desired texts without noise.

To solve the problem, in the fourth embodiment of a document retrieving and delivering system of the present invention, information (to be referred to as delivery threshold setting information) useful for the user to set an appropriate delivery threshold value is presented to the user. Moreover, the system displays texts in the past of which similarity calculated exceeds the delivery threshold value set by the user (to be referred to "trial of delivery threshold value setting" herebelow). Using these information items, the user can appropriately set a suitable delivery threshold value.

Figure 21:
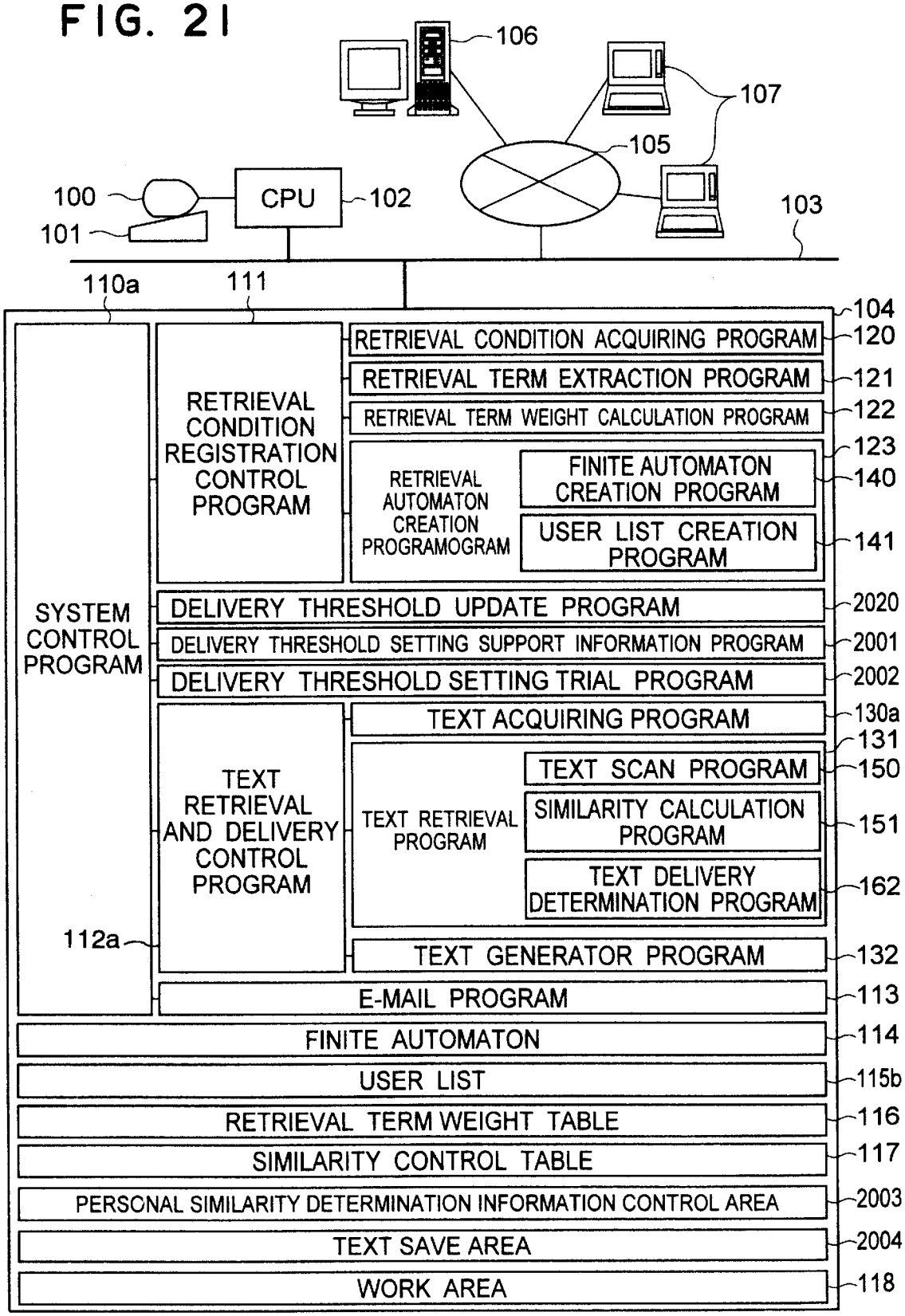
FIG. 21 is a diagram showing a configuration of a fourth embodiment in accordance with the present invention.

FIG. 21 shows a system configuration of a fourth embodiment in accordance with the present invention.

The fourth embodiment is almost the same in constitution as the first embodiment shown in FIG. 1. As can be seen from FIG. 21, the configuration of the fourth embodiment additionally includes a delivery threshold update program 2000, a delivery threshold setting information program 2001, and a delivery threshold setting trial program 2002. The system further includes a personal similarity determination information control area 2003 and a text save area 2004.

In area 2003, there are stored similarity calculated in the past for texts with respect to retrieval conditions of users and flags indicating whether or not texts are delivered to users. Stored in area 2004 are contents and reception time of texts received in the past.

In the fourth embodiment, according to information stored in areas 2003 and 2004, program 2001 presents delivery threshold setting information to users. Using information in areas 2003 and 2004, program 2002 similarly presents a function to set a delivery threshold value to users. The user can therefore determine an appropriate delivery threshold to register a determined threshold value to the system by program 2000. The value registered is used by text retrieval and delivery control program 112a to determine whether or not a text is delivered to each user.

In the description of the fourth embodiment, a user request for presentation of delivery threshold setting information, a user request for delivery threshold setting operation, and a user request for delivery threshold setting trial are transmitted in the form of e-mail. However, these requests may be sent to the system via other network applications such as Web browser. Moreover, the system sends delivery threshold setting information and results of delivery threshold setting trial via e-mail to the pertinent user. However, other network applications such as Web browser may be used for this purpose.

Description will now be given of a processing procedure of each program in the fourth embodiment.

Figure 22:
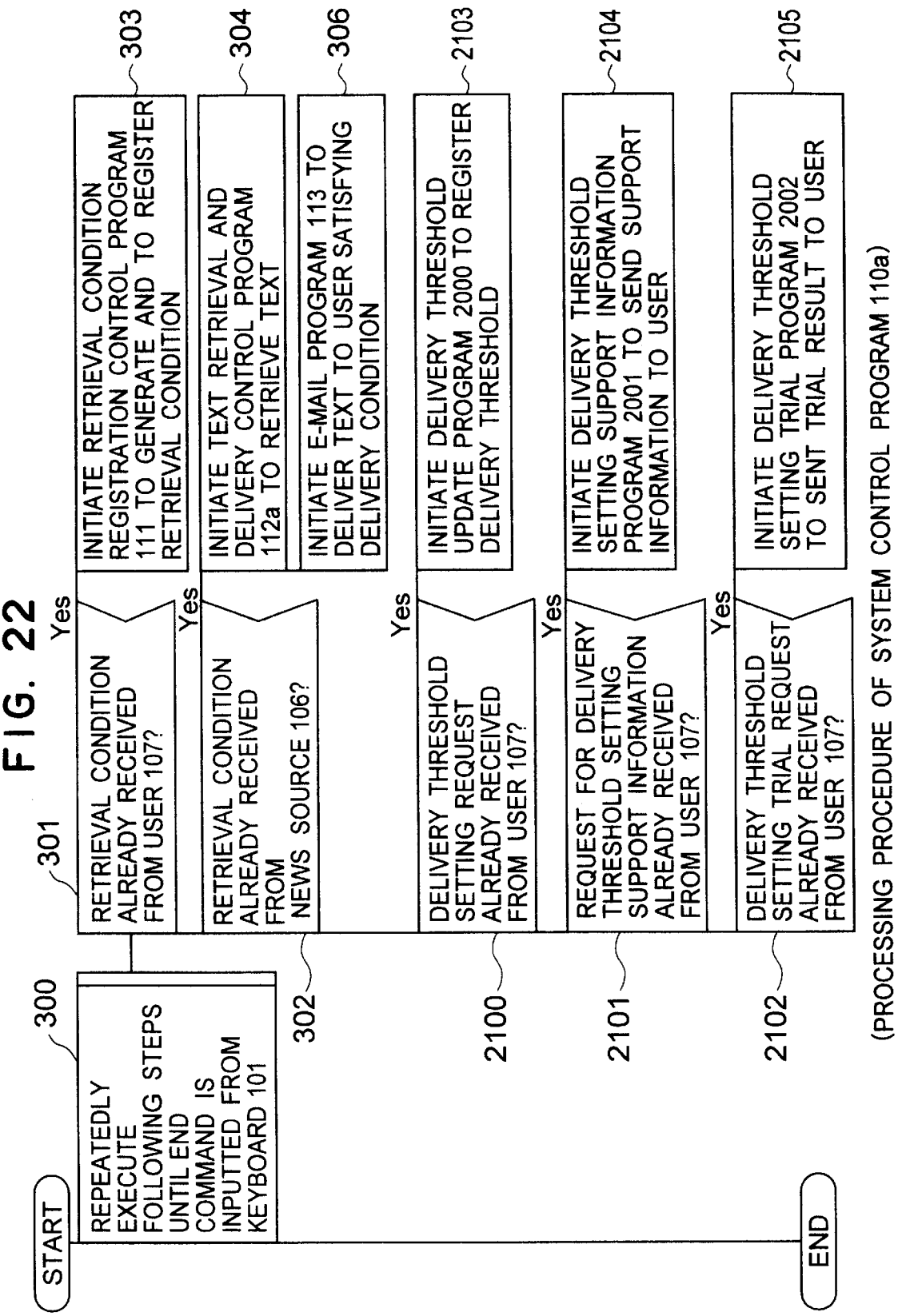
FIG. 22 is a PAD showing a processing flow of a system control program 110a in the fourth embodiment.

Referring now to the PAD of FIG. 22, description will be given of system control program 110a in the fourth embodiment.

The procedure of program 110a of this embodiment is implemented by adding steps 2100 to 2105 to that of system control program 110 of the first embodiment.

In iterative processing step 300, program 110a checks after processing of steps 301 and 302 whether or not a delivery threshold value has been sent from a user. If such a value has been received, program 110a initiates program 2000 in step 2103 to set a delivery threshold value of the user.

In step 2101, program 110a checks to determine whether or not a request for presentation of delivery threshold value setting information has been sent from user 107. If such a request has been received, program 110a initiates program 2001 to send presentation of delivery threshold value setting information to the user.

In step 2102, program 110a checks to determine whether or not a request for delivery threshold setting trial has been sent from user 107. If such a request has been received, program 111a initiates program 2002 to try setting a delivery threshold.

The processing procedure of system control program 110a has been described.

Figure 23:
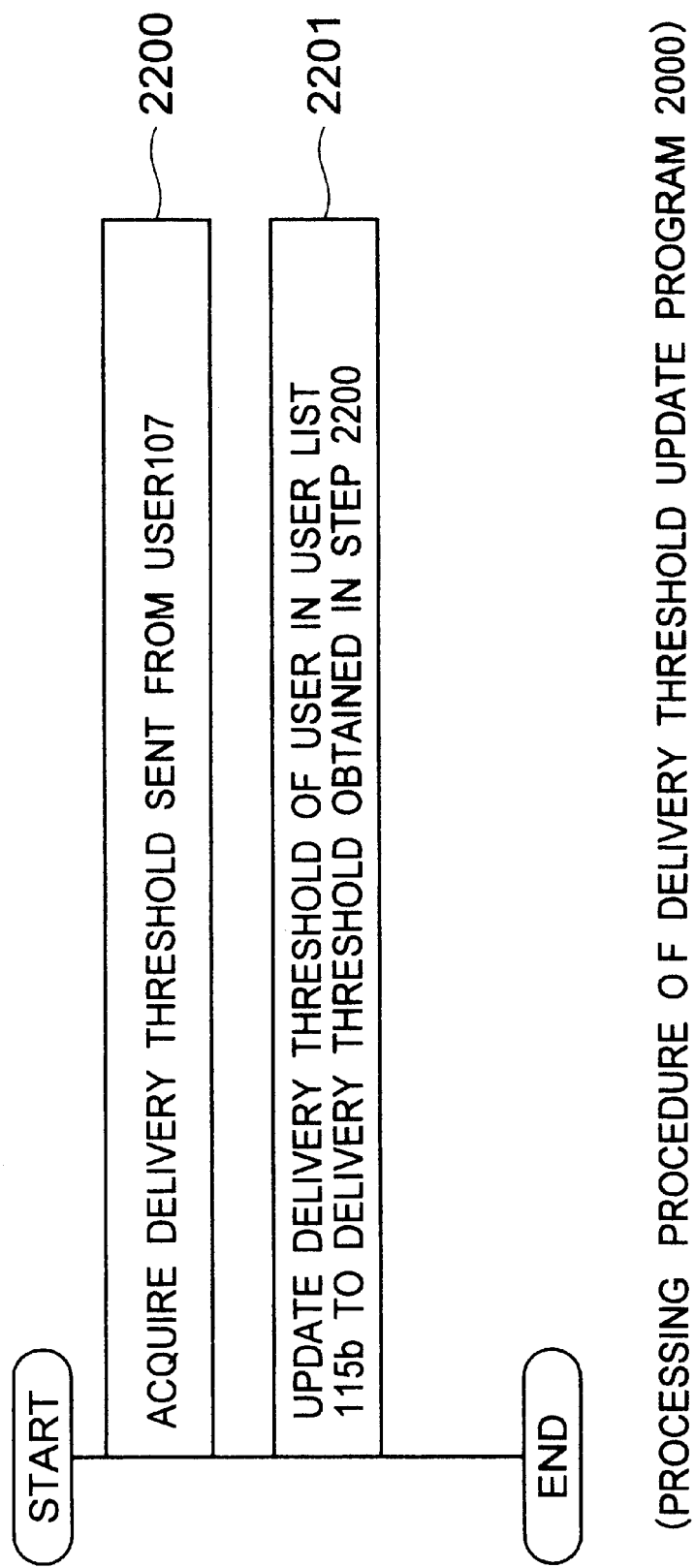
FIG. 23 is a PAD showing a processing flow of a delivery threshold update program 2000 in the fourth embodiment.

Referring now to the PAD of FIG. 23, description will be given of delivery threshold update program 2000 initiated by system program 110a in step 2103 of FIG. 22.

In step 2200, program 2000 acquires a delivery threshold value sent from user 107 via e-mail.

In step 2201, program 2000 updates user list 115b to replace the old delivery threshold value of the user with the value received. In list 115b, each delivery threshold value may be initialized to a value determined by a manager or may be set to a value inputted by user 107 when user 107 registers a retrieval condition.

The processing procedure of delivery threshold update program 2000 has been described.

Figure 24:
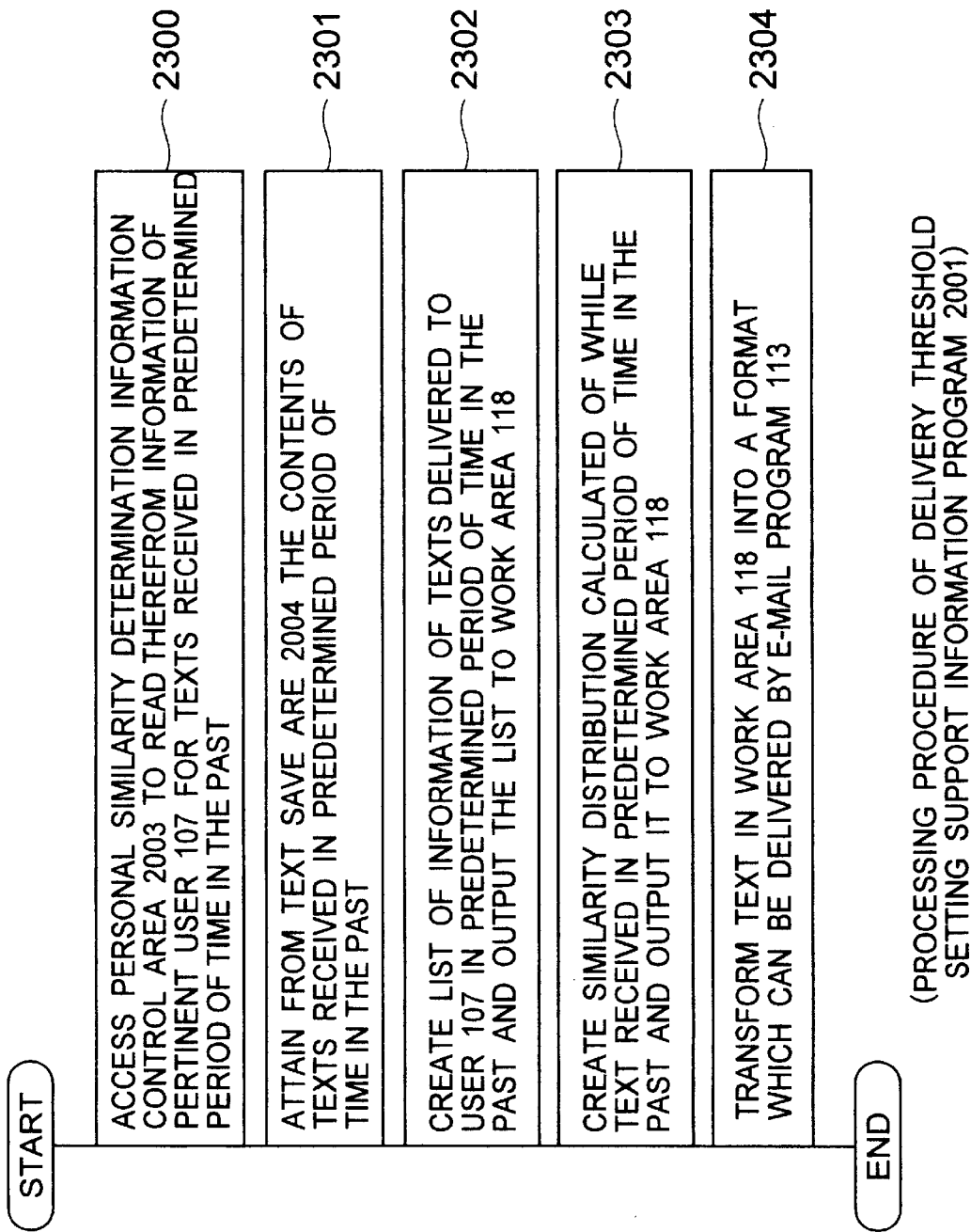
FIG. 24 is a PAD showing a processing flow of a delivery threshold setting support information program 2001 in the fourth embodiment.

Referring next to a PAD shown in FIG. 24, description will be given of delivery threshold setting support information program 2001 initiated by the system program in step 2104 of FIG. 22.

Program 2001 provides, according to history of delivery determination for users in the past, information for users to appropriately set a threshold value.

In step 2300, according to a user identifier of user 107 having requested threshold setting support information, program 2001 accesses personal similarity determination information control area 2003 to read therefrom personal similarity determination information of the user with respect to texts received from news source 106 in a predetermined period of time in the past. The similarity determination information includes data items such as similarity of each user for all texts received from news source 106 and a flag of delivery or non-delivery of each text. A specific example thereof will be described later.

In step 2301, program 2001 obtains from text save area 2004 the contents of texts received from news source 106 within a predetermined period of time in the past.

In step 2302, program 2001 extracts from the information acquired in step 2301 information items concerning the texts delivered to the user and produces a list in work area 118.

In step 2303, program 2001 draws a graph (to be referred to as similarity distribution information herebelow) in work area 118 in which an abscissa represents the number of texts for each similarity calculated for the retrieval condition of each user and the similarity and an ordinate represents time of text reception. The abscissa and the ordinate may represent other information items obtained in steps 2301 and 2302.

In step 2304, program 2001 transforms the information in work area 118 into a format which can be delivered by e-mail program 113.

Information thus stored in work area 118 is delivered by e-mail program 113.

The processing procedure of delivery threshold setting support information program 2001 has been described.

Figure 25:
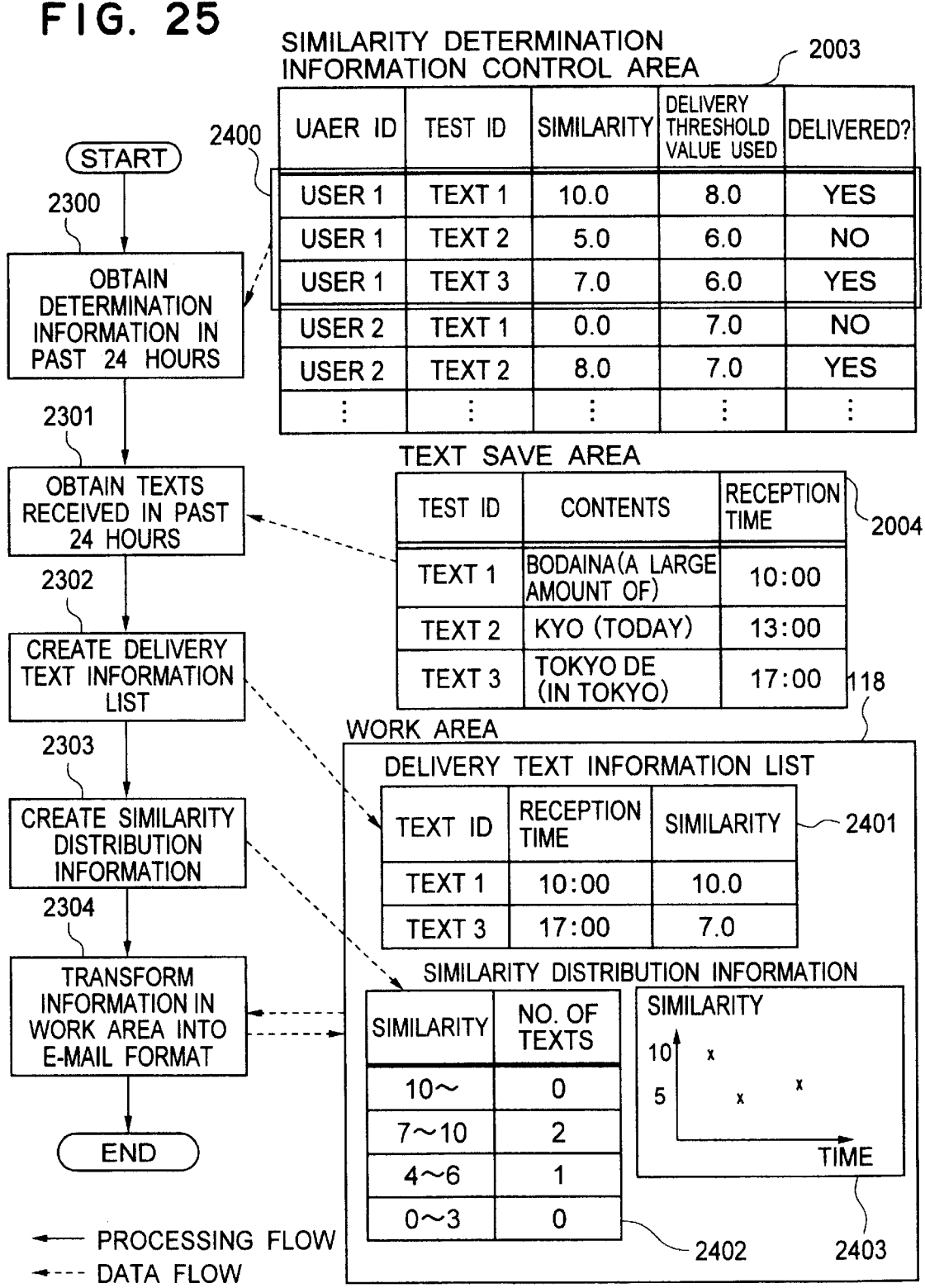
FIG. 25 is a flowchart to explain a specific processing flow of program 2001 in the fourth embodiment.

Referring now to FIG. 25, description will be given in detail of a processing flow of program 2001 shown in FIG. 24.

In step 2300, program 2001 obtains from area 2003 personal similarity determination information 2400 within a predetermined period of time in the past (e.g., in the last 24 hours in this case) corresponding to the user identifier of user 107 having requested the support information. In this example, program 2001 obtains text identifiers respectively of texts 1 to 3 of user 1, similarity values calculated for the texts, flags of delivery or non-delivery thereof, and delivery threshold values of user 107 at delivery determination.

In step 2301, program 2001 attains from area 2004 the contents of texts received from new sources 106 within the last 24 hours. In this example, program 2001 obtains the contents of texts 1 to 3.

Steps 2300 and 2301 of this embodiment process the texts received from new sources 106 within the last 24 hours. However, the period to receive texts may be changed, the entire period may be specified to process all texts stored, or the period may be specified by user 107.

In step 2302, program 2001 collates the information acquired in steps 2300 and 2301 according to the text identifier to extract therefrom information concerning texts delivered to the pertinent user and outputs the information in work area 118. In this example, program 2001 outputs in work area 118 a list 2401 including text identifiers, similarity values, delivery threshold values, and delivery time for texts 1 and 3 delivered to user 1. The information items to be output may include any combination of information obtained in steps 2300 and 2301. The items are outputted in a similarity order in this embodiment. However, the items may be outputted in a text delivery time sequence, or the user may select the similarity order or the delivery time sequence. Alternatively, in place of text identifiers, a first sentence may be extracted from the contents of text to be outputted to work area 118. Moreover, if there is an attribute item such as "title", the item may be outputted to area 118.

In step 2303, program 2001 collates the information attained in steps 2300 and 2301 according to the text identifier to generate similarity distribution information of the texts and further outputs the information to work area 118. In the example of FIG. 25, program 2001 produces the number of texts for each similarity within the past 24 hours and generates a graph 2403 of text distribution in which the ordinate represents time and the abscissa represents similarity.

Figure 26:
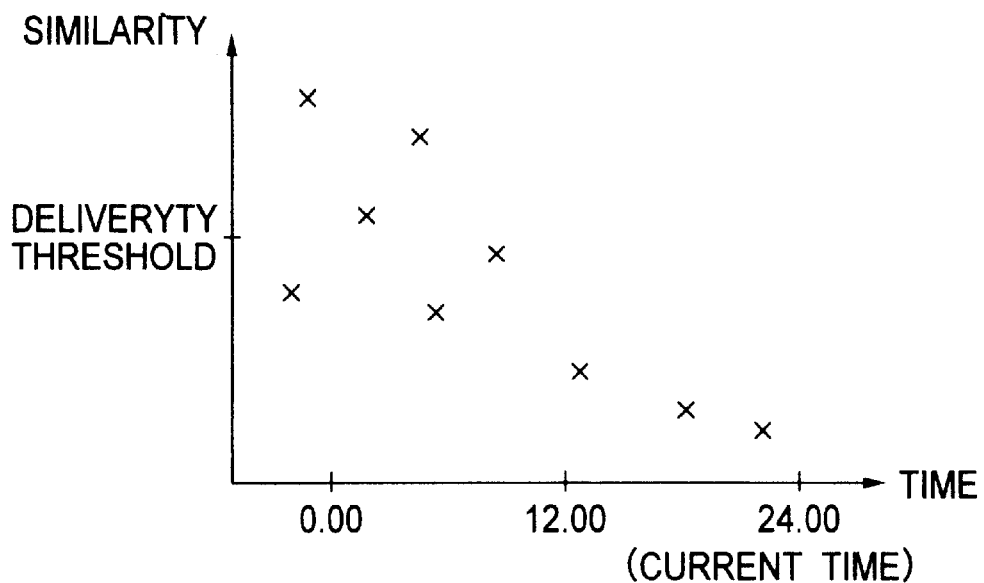
FIG. 26 is a graph showing an example of data outputted from program 2001 of the fourth embodiment.

By referring to the graph, user 107 can visually and easily know the amount of texts to be delivered and the period of time in which the amount of texts are delivered for each value set to the threshold value. User 107 can also recognize change of the text delivery state with respect to time. For example, when the graph of FIG. 26 is produced, user 107 can understand that the amount of desired texts (with high similarity) from the news delivery source becomes gradually decreased. In this situation, user 107 may lower the delivery threshold value.

Figure 27:
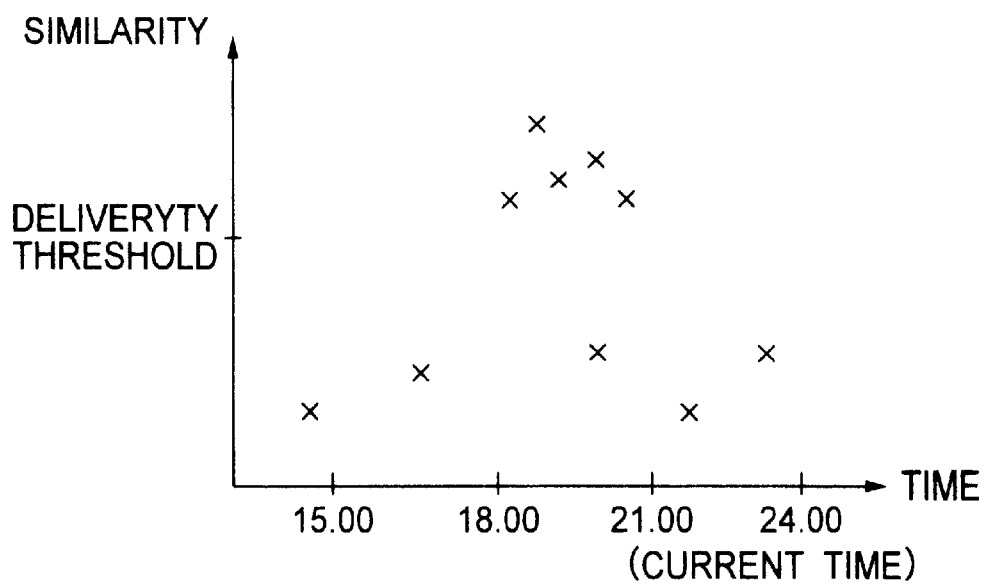
FIG. 27 is a graph showing another example of data outputted from program 2001 of the fourth embodiment.

User 107 cal also recognize a time zone in which texts desired are frequently delivered. For example, according to the graph of FIG. 27, it is known that many texts desired are delivered in a time zone from 18:00 to 21:00. User 107 can therefore avoid an unfavorable event, for example, when a delivery threshold value is set to a time zone in which few texts desired are delivered, there is conducted local optimization, and hence the delivery threshold value is set to a value lower than an appropriate value.

Although step 2303 of the embodiment processes all texts delivered from news source 106 in the last 24 hours, it is also possible to process only texts not delivered to pertinent user 107. The graph may include information to indicate whether or not texts are delivered to pertinent user 107. Change with respect to time of the delivery threshold value set by pertinent user 107 may be presented at the same time. Although similarity is stored in personal control area 2003 in this embodiment, the texts in text save area 2004 may be again scanned and similarity thereof is again calculated with respect to the retrieval condition of the user at the pertinent point of time to use a result of the calculation as similarity.

In step 2304, program 2001 transforms information in work area 118 into a format suitable for e-mail program 113.

The specific processing flow of program 2001 has been described. Although delivery threshold setting support information is presented in response to a request from the user, the information may be presented to all users 107 at a predetermined point of time.

Figure 28:
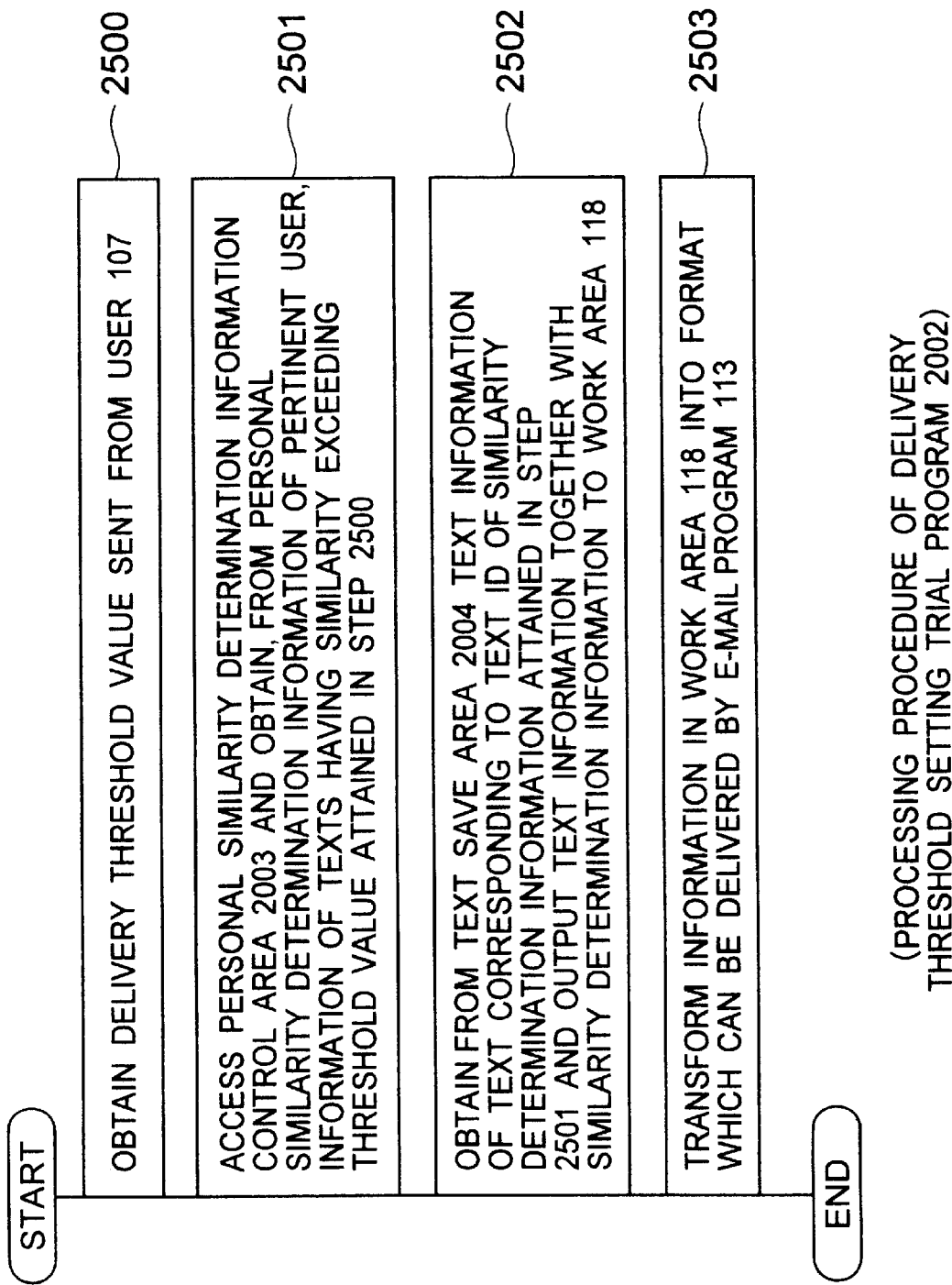
FIG. 28 is a PAD showing a processing procedure of a delivery threshold setting trial program 2002 in the fourth embodiment.

Referring next to the PAD of FIG. 28, description will be given of a processing procedure of delivery threshold setting trial program 2002 initiated by the system control program in step 2105 of FIG. 22.

Program 2002 presents, according to the similarity calculated for texts of each user received in the past, texts in the past of which similarity values exceed a delivery threshold value specified by the user.

In step 2500, program 2002 acquires a delivery threshold value sent from user 107 via e-mail.

In step 2501, program 2002 accesses area 2003 according to a user identifier of the user and reads, from personal similarity determination information of the user, information of texts of which similarity exceeds the threshold value obtained in step 2500.

In step 2502, program 2002 reads from area 2004 the contents and reception time of a text corresponding to the text identifier of similarity determination information attained in step 2501 and outputs the contents, the reception time, and the information to work area 118.

In step 2503, program 2002 transforms the information in work area 118 into a format of e-mail program 113.

Program 113 then delivers the information from work area 118 to the user.

The processing procedure of delivery threshold setting trial program 2002 has been described.

Figure 29:
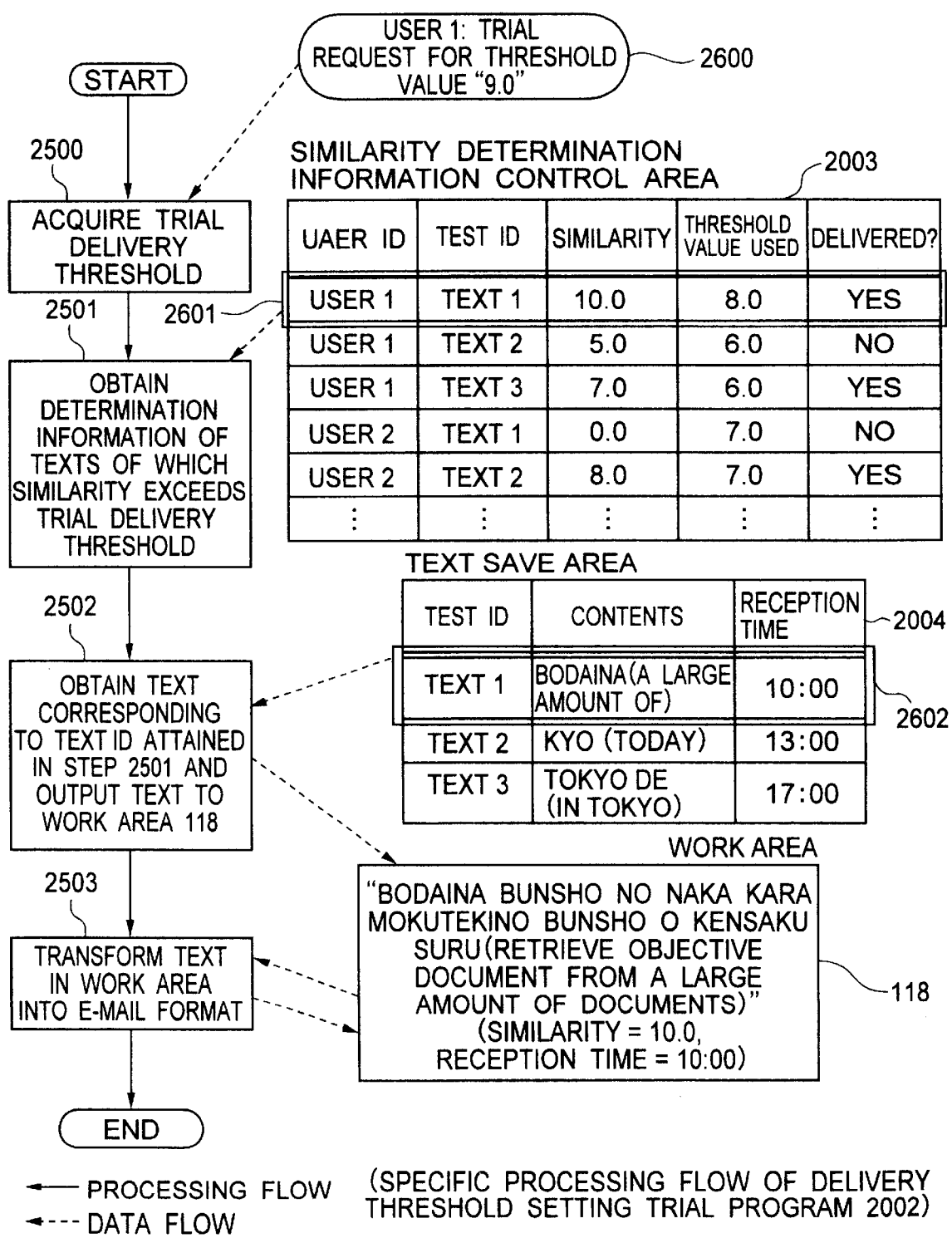
FIG. 29 is a PAD to explain a concrete processing flow of program 2002 in the fourth embodiment.

Referring now to FIG. 29, description will be given in detail of a processing flow of a delivery threshold setting trial program 2002 of FIG. 28.

In step 2500, program 2002 obtains delivery threshold value 2600 sent from user 107.

In step 2501, program 2002 acquires information 2601 of a text of which similarity is greater than threshold value 2500 obtained in step 2500 from area 2003. In the example of FIG. 29, the user of user identifier "user 1" has specified 9.0 for the delivery threshold value and hence the contents and reception time of text 1 of which similarity is 10.0 (more than 9.0) are acquired from area 2003. In this connection, "User of user identifier 'user 1'" indicates a user having a user identifier of "user 1". Although similarity stored in area 2003 is used in this embodiment, it is also possible that the texts in text save area 2004 is again scanned and similarity thereof is again calculated with respect to the retrieval condition of the user at the pertinent point of time to use a result of the calculation as similarity.

In step 2502, program 2002 accesses text information stored in the text save area to obtain text information 2602 corresponding to the text identifier obtained in step 2501 and then outputs text information 2602 and similarity determination information 2601 also corresponding to the text identifier obtained in step 2501 to work area 118. In this example, the similarity, the delivery time, and the contents of text of text 1 attained in step 2501 are outputted to work area 118. It is also possible to output, in place of the contents of text, a first sentence of the contents of text to work area 118. Alternatively, an attribute such as a title is present, such a title may be outputted to work area 118.

In step 2503, program 2002 transforms the information stored in work area 118 into a format which can be delivered by e-mail program 113.

Assume that area 2003 contains information of texts delivered from news source 106 within the last 24 hours, a text title is outputted to area 118 in step 2502, and user 107 desires reception of two texts within the last 24 hours. If user 107 specifies 10.0 as delivery threshold value 2600 for the trial, only one title (text 1) is outputted to area 118. If user specifies 6.0 as value 2600, two text titles "text 1" and "text 2" are outputted to area 118. As a result, if user 107 changes the delivery threshold value to 6.0 by delivery threshold update program 2000, it can be expected that two texts are delivered within the subsequent 24 hours.

Assume the first sentence of the contents of text is outputted together with a title of text in area 118 In step 2502. If threshold value 2600 is fully lowered, titles of texts and the first sentences of texts which have not been delivered because similarity thereof is less than the delivery threshold value are presented. User 107 checks the texts presented, and when user 107 detects a desired text, user 107 lowers the delivery threshold value below the similarity of the text by program 2000. Resultantly, the delivery threshold value can be set such that all of the texts desired are delivered.

Figure 30:
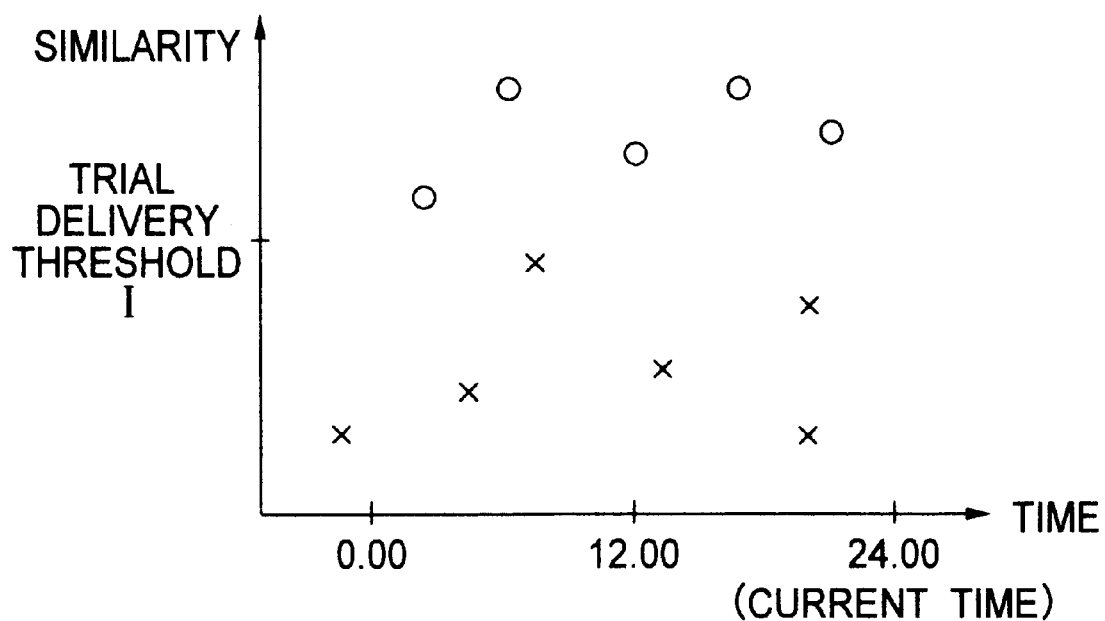
FIG. 30 is a graph showing an example of data outputted from program 2002 of the fourth embodiment.

Using information outputted to area 118 in step 2502, the system generates a graph of text similarity distribution in which the similarity and the text reception time are indicated respectively along the ordinate and the abscissa as described in conjunction with program 2001. For example, as can be seen from FIG. 30, of the texts delivered from news source 106 in the past, those having similarity exceeding trial delivery threshold value 2600 are presented in another color or with another symbol in the distribution graph.

In this example, it is known that if the delivery threshold value is set to the trial value, five texts are delivered within the last 24 hours. Therefore, it can be recognized that if the threshold value is set to the trial value, a similar amount of texts will be delivered within the subsequent 24 hours. As above, user 107 can visually and easily predict results of delivery in response to modification of trial delivery threshold value 2600. It is therefore possible for user 107 to set an appropriate delivery threshold value.

The specific processing flow of delivery threshold setting trial program 2002 has been described.

Figure 31:
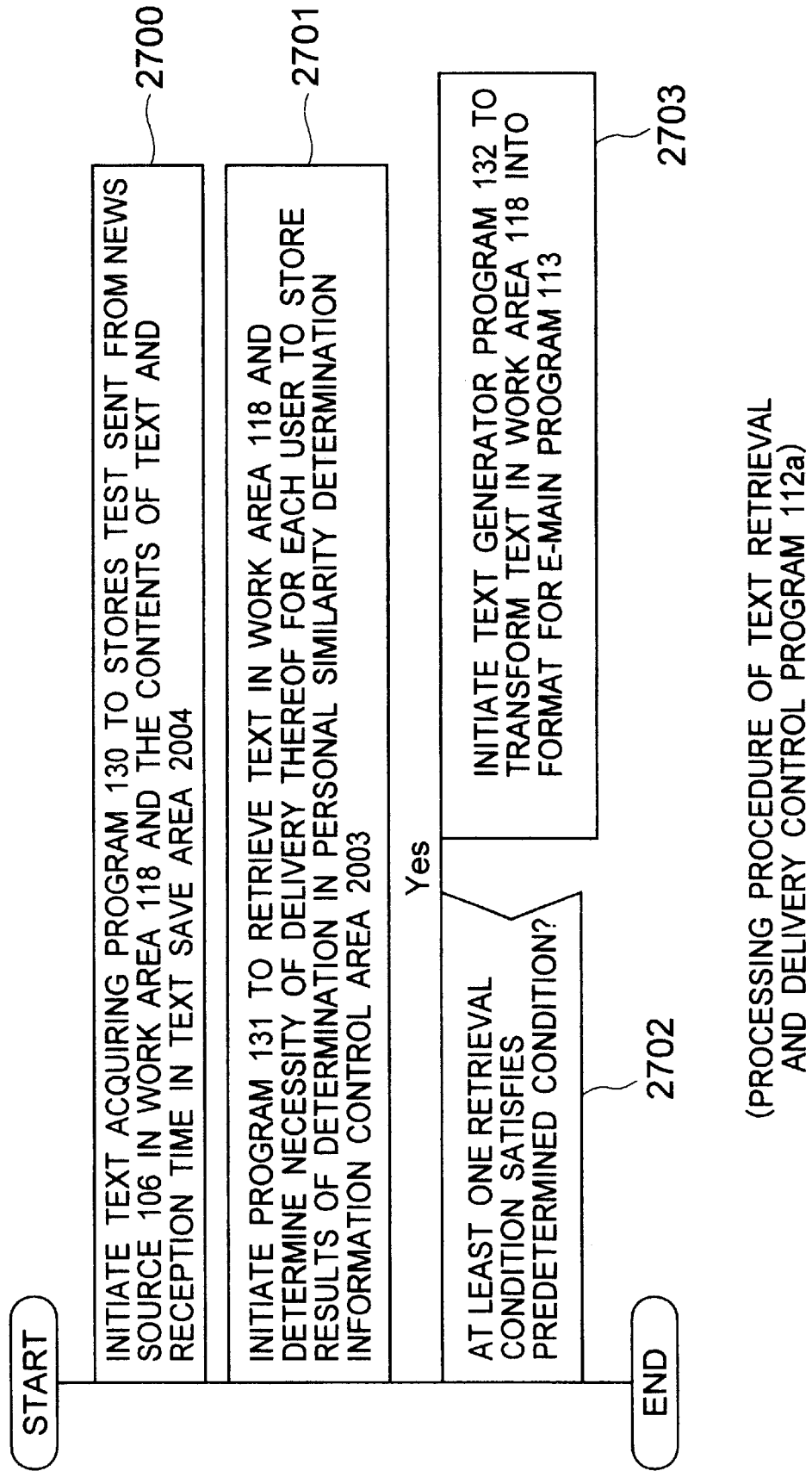
FIG. 31 is a PAD showing a processing procedure of a text retrieval and delivery control program 112a in the fourth embodiment.

Referring now to the PAD of FIG. 31, description will be given of a processing procedure of text retrieval and delivery control program 112a initiated by the system control program in step 304 of FIG. 22.

Program 112a determines for each user similarity of each text from news source 106 with respect to a retrieval condition of each user, determines delivery or non-delivery of the text for each user, and saves the contents of text and history of delivery determination of each user.

In step 2700, program 112a initiates text acquiring program 13a to store a text from news source 106 in work area 118. Program 112a further stores the contents of text and text reception time in text save area 2004.

In step 2701, program 112a initiates text retrieval program 131 to retrieve a text stored in work area 118 to calculate similarity thereof with respect to a retrieval condition set by each user. Program 131 determines delivery or non-delivery of the text for each user and stores results of determination in area 2003.

In step 2702, program 112a checks to determine whether or not at least one retrieval condition satisfying a predetermined condition is present. If such a retrieval condition is present, processing goes to step 2703.

In step 2703, program 112a initiates text generator program 132 to transform the text in area 118 into a format for e-mail program 113.

The processing procedure of program 112a has been described.

Figure 32:
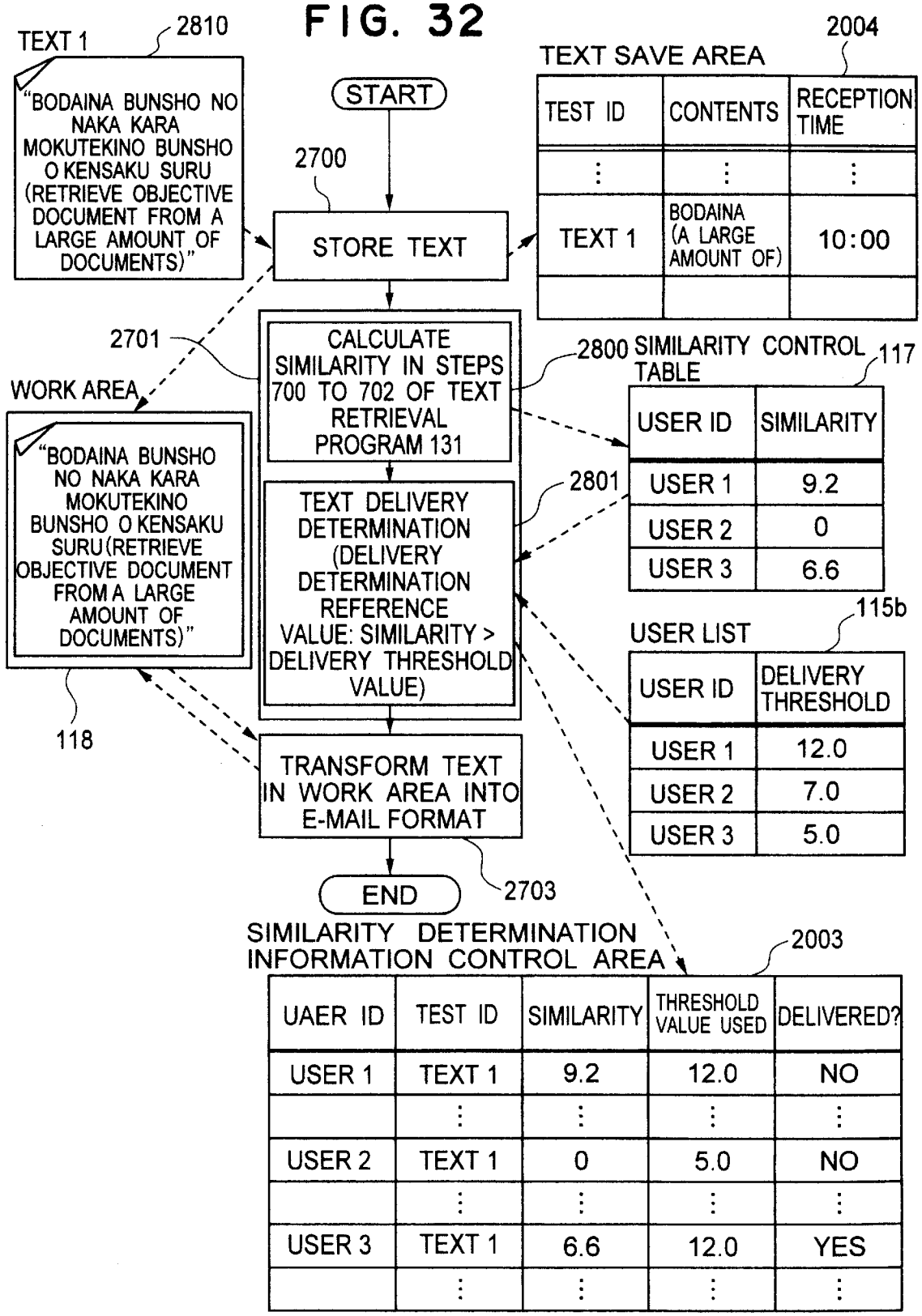
FIG. 32 is a flowchart to explain a concrete processing flow of program 112a in the fourth embodiment.

Referring now to FIG. 32, description will be given in detail of a processing procedure of program 112a in the fourth embodiment of the present invention.

In step 2700, program 112a initiates text acquiring program 130a to store a text 2810 via e-mail or the like from news source 106 in work area 118. Program 130a then assigns a text identifier to the text and stores the contents and reception time of text in text save area 2004.

Figure 7:
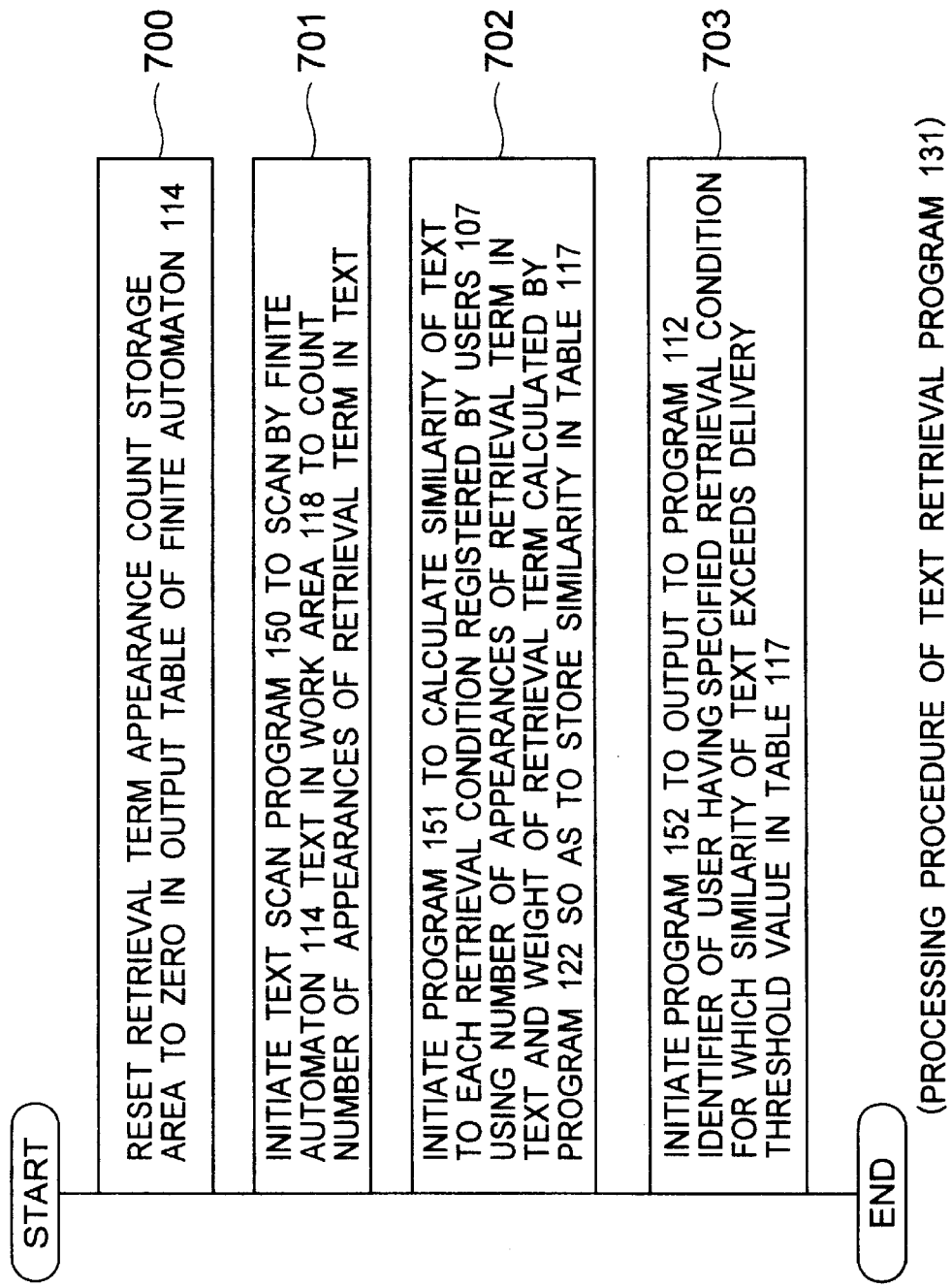
FIG. 7 is a PAD showing a processing procedure of a text retrieval program 131 of the first embodiment.

In step 2800, the system executes steps 700 to 702 in a procedure described in conjunction with FIG. 7 of the first embodiment to store similarity in similarity control table 117.

In step 2801, identifiers of users of which similarity in table 117 exceeds delivery threshold values in user list 115b are passed to program 112a. Text identifiers, similarity calculated, delivery or non-delivery of text, current delivery threshold values are respectively stored in areas 2003 of the respective users. In this example, similarity is obtained as 10.0 for user 1. Since this does not exceed delivery threshold value "12.0" of user 1 in user list 115b, the text is not delivered to user 1. Similarity of "6.6" is calculated for user 3. Since this value exceeds delivery threshold value "5.0" of user 2 in list 115b, the text is delivered to user 3. Furthermore, information items such as text identifier "text 1", Delivery or non-delivery "NO", and current threshold value "12.0" are stored in a field of user 1 in area 2003. Processing is similarly conducted also for users 2 and 3 as shown in FIG. 32. These similarity determination information items are used in programs 2001 and 2002 as already described above.

In step 2703, program 112a transforms the information in work area 118 into a format for e-mail program 113.

The processing procedure of program 112a has been described.

Description has been given of the respective programs of the fourth embodiment.

As above, the texts received from the news delivery source and history of similarity calculation for each user are saved in the embodiment above. When the user sets a delivery threshold value, these information items are presented to the user. Therefore, the user can set an appropriate delivery threshold value by referring to the information. When it is necessary to modify a delivery threshold value initialized, it is possible for the user to set an appropriate delivery threshold value to receive all necessary texts without noise. This resultantly solves the problem of the prior art concerning the retrieval leakage and retrieval noise.

The delivery text selection described in this embodiment is not limited to the retrieval method of the finite automaton or the extended BM method. Namely, the selection method is similarly applicable to a system using other retrieval methods.

The delivery text selection described in this embodiment is not limited to the similarity calculation method for the text with respect to retrieval conditions, but may be similarly used for the similarity calculation method of the first to third embodiments as well as other similarity calculation methods.

Next, description will be given of a fifth embodiment of the present invention.

In the configuration of the fourth embodiment, the program refers to the history of similarity calculation in the past to set an appropriate delivery threshold value. However, this cannot completely cope with the text delivery state which continuously changes with respect to time. For example, even if the delivery threshold value is increased because a large amount of texts are delivered during a period of time, there may occur thereafter a period of time in which the number of texts of which similarity exceeds the delivery threshold value and texts are not delivered to the user as a result. This leads to a problem that the user cannot understand whether or not texts desired are present or whether the delivery threshold value set is too great.

To solve this problem in accordance with the fifth embodiment of a document retrieving and delivering system of the present invention, in addition to texts of which similarity exceeds the delivery threshold value set by the user, the number of texts specified by the user is delivered to the user (to be referred to as additional delivery).

Figure 33:
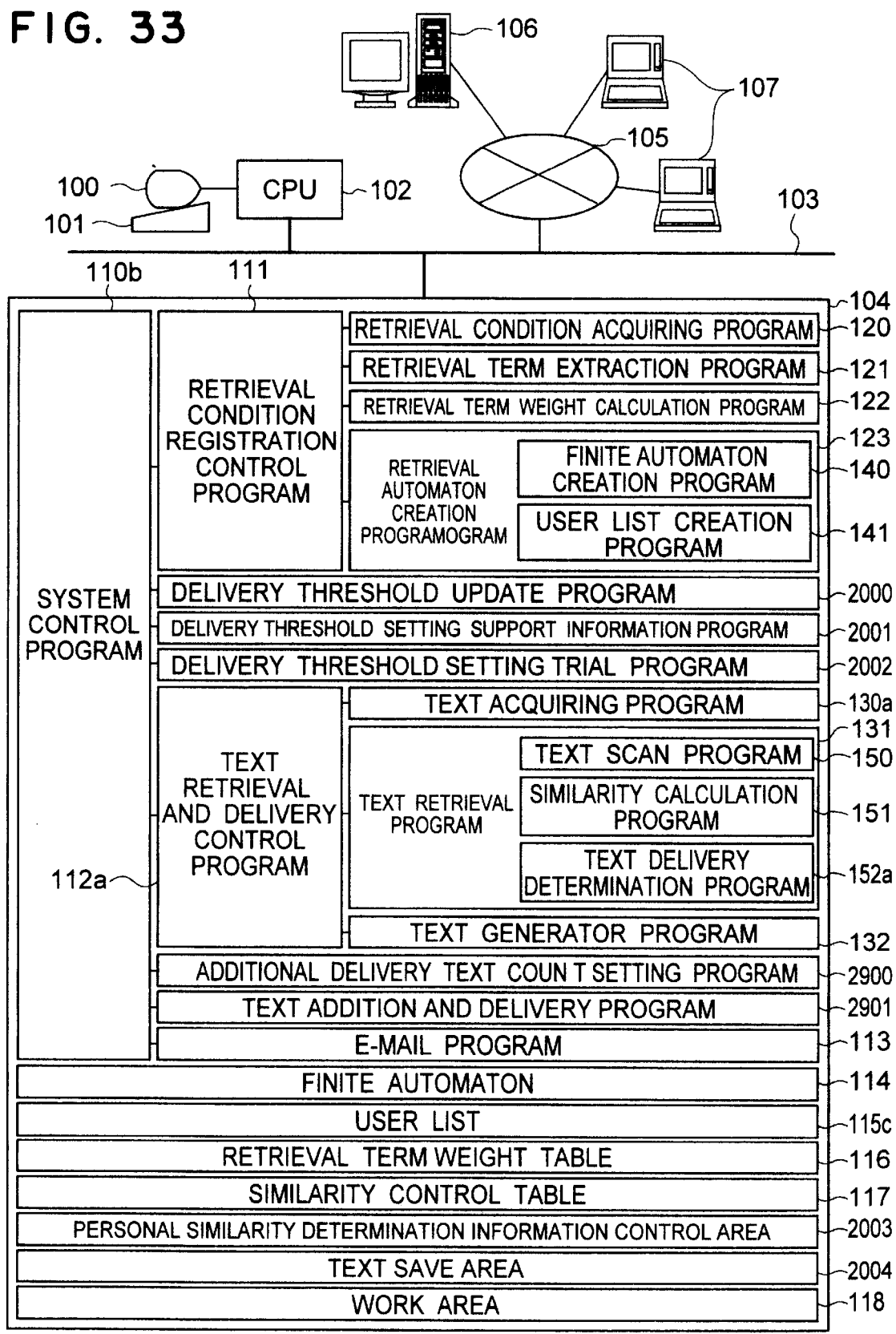
FIG. 33 is diagram showing a configuration of a fifth embodiment in accordance with the present invention.

FIG. 33 shows a system configuration of the fifth embodiment of the present invention.

This embodiment is almost the same in constitution with the fourth embodiment shown in FIG. 21. The fifth embodiment additionally includes an additional delivery text count setting program 2900 and a text additional delivery program 2901.

In the fifth embodiment, program 2901 additionally delivers texts to users by referring to information in areas 2003 and 2004. The number of texts additionally delivered is set by program 2900.

In the description below, it is assumed that the user sends a request to set the number of additional texts via e-mail. However, other network applications such as the Web browser may be used to send the request to this system. Moreover, it is assumed that the additional texts are delivered from the system via e-mail to the user. However, other network applications such as the Web browser may be used for this purpose.

Description will now be given of processing procedures of respective programs of the fifth embodiment.

Figure 34:
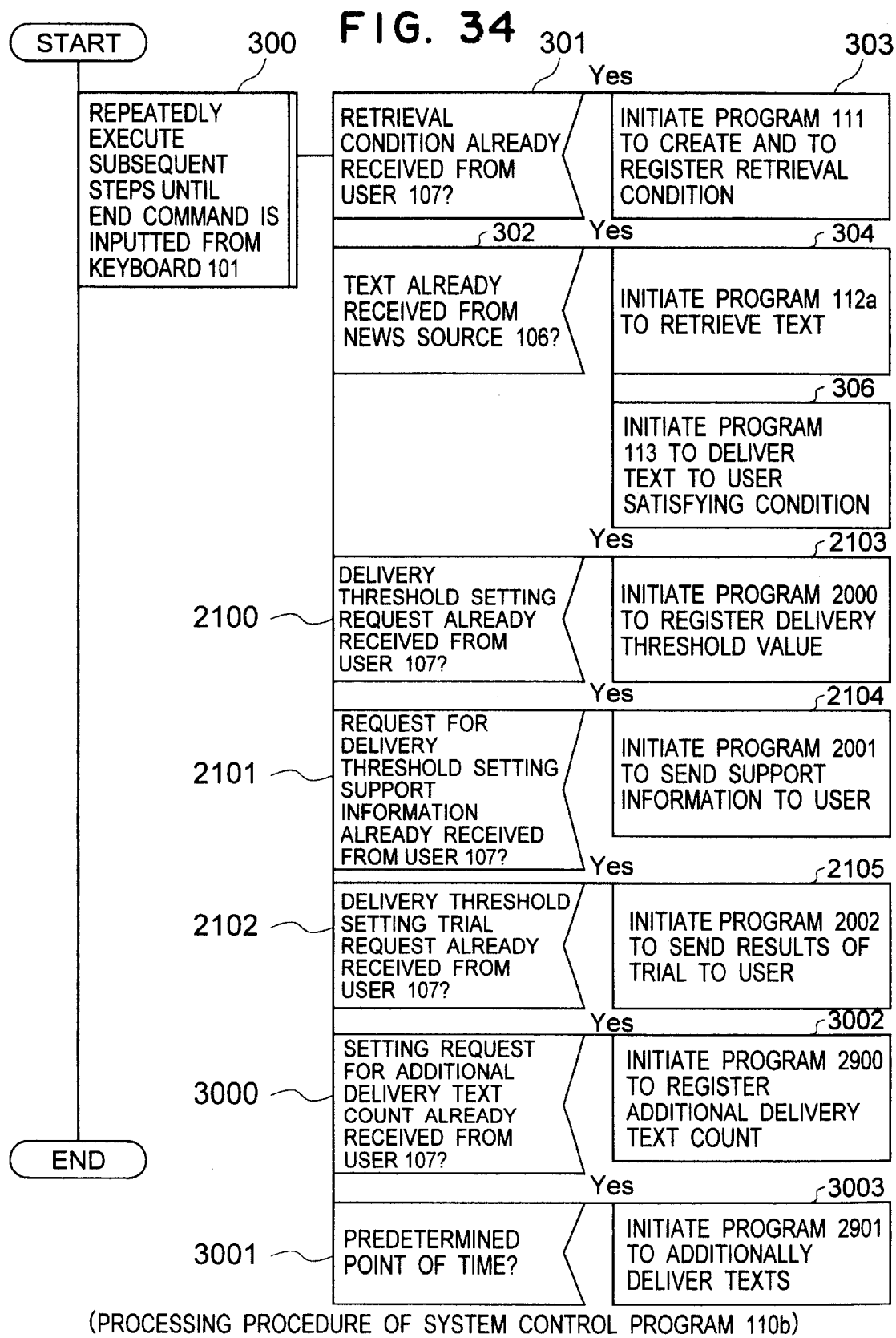
FIG. 34 is a PAD showing a processing flow of a system control program 110b of the fifth embodiment.

Referring to the PAD of FIG. 34, description will be given of system control program 110b of the fifth embodiment.

The processing procedure of program 110b of this embodiment is implemented by adding steps 3000 to 3003 to that of system control program 110a of the fourth embodiment.

In step 3000, program 110b determines whether or not a request to set the number of additional delivery texts has been received from user 107. If such a request is present, program 110b initiates program 2900 in step 3002 to set the number of additional delivery texts for the user.

In step 3001, program 110b determines whether or not the current or present time satisfies a predetermined condition. If the time satisfies the condition, program 110b initiates program 2901 in step 3003. It is possible to initiate program 2901 by setting, for example, a condition "initiate program 2901 at 0:00 every day".

The processing procedure of program 110b has been described.

Figure 35:
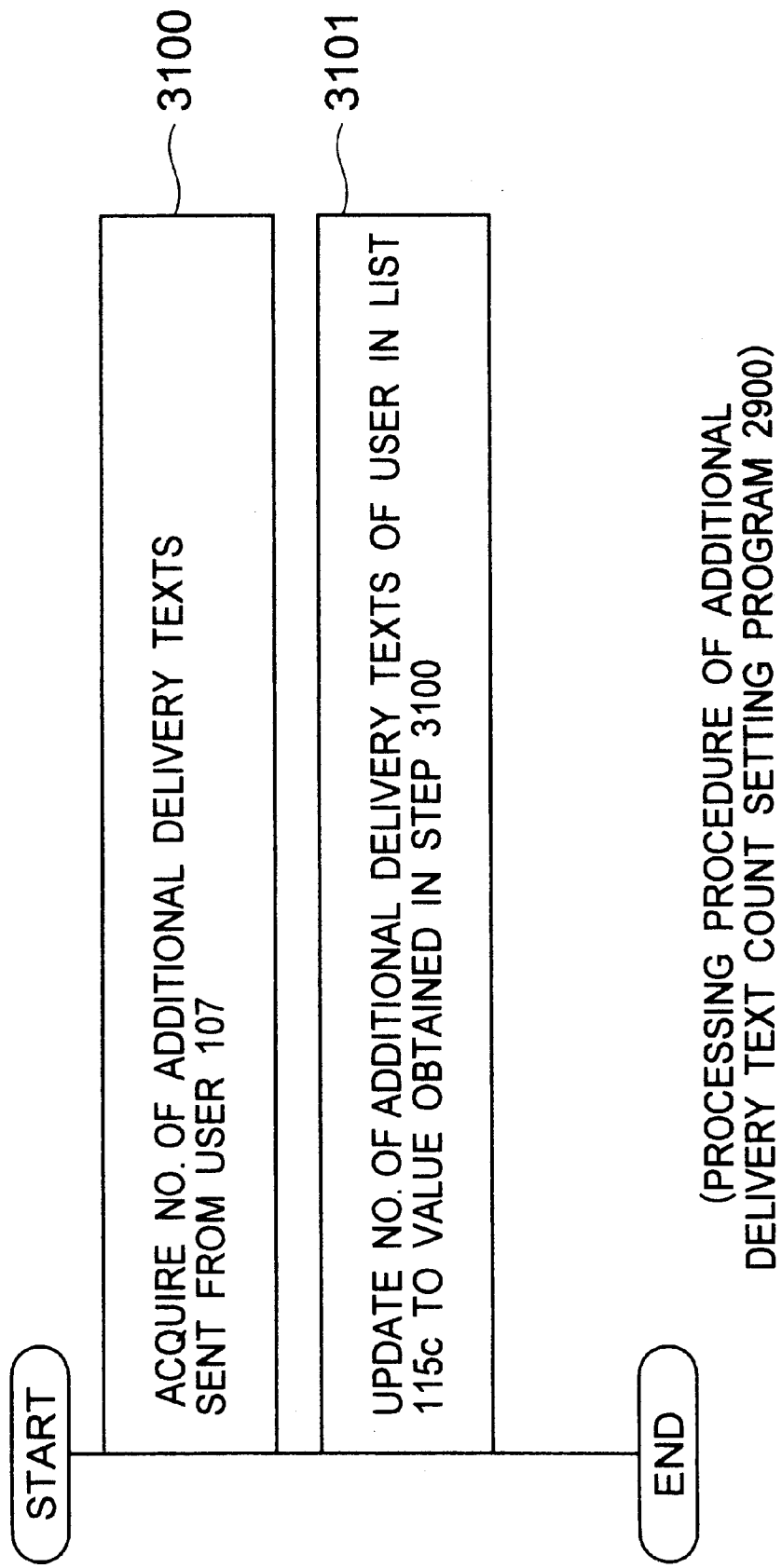
FIG. 35 is a PAD showing a processing flow of an additional delivery text count setting program 2900 of the fifth embodiment.

Referring next to the PAD of FIG. 35, description will be given of a processing procedure of program 2900 initiated by program 110b in step 3002 of FIG. 34.

In step 3100, program 2900 acquires the number of additional delivery texts received via e-mail from user 107.

In step 3101, program 2900 updates the number of additional delivery texts of user list 115c for the user. In user list 115c, the initial value of the number of additional delivery texts may be beforehand determined by the manager or may be inputted when user 107 registers a retrieval condition.

The processing procedure of program 2900 has been described.

Figure 36:
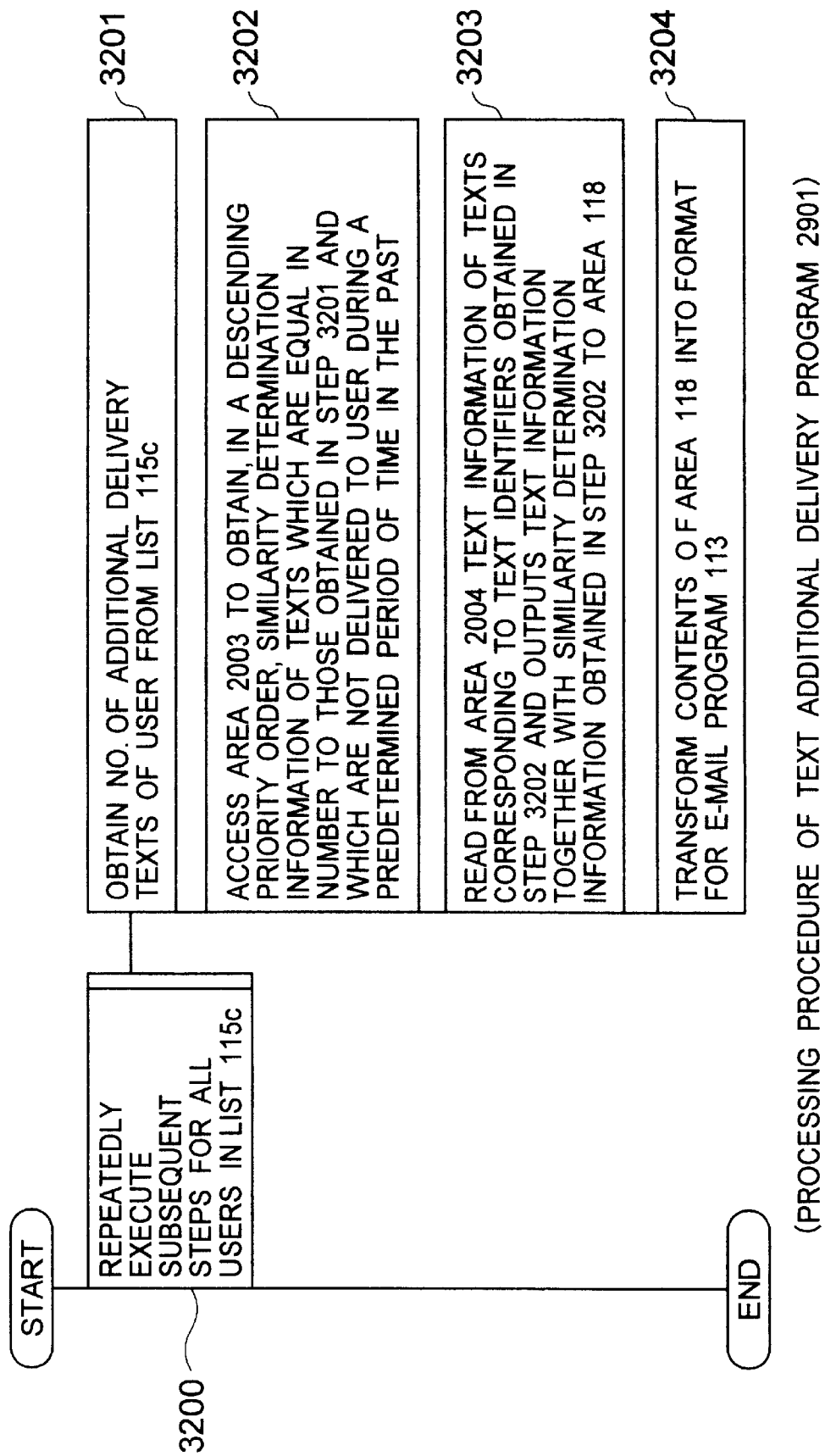
FIG. 36 is a PAD showing a processing flow of a text additional delivery program 2901 of the fifth embodiment.

Referring next to the PAD of FIG. 36, description will be given of a processing procedure of program 2901 initiated by program 110b in step 3003 of FIG. 34.

Program 2901 additionally delivers texts of which similarity does not exceed the delivery threshold value so that the user receives a desired number of texts.

In step 3200, program 2901 repeatedly executes step 3201 to 3204 for all users in user list 115c.

In step 3201, program 2901 reads from list 115c additional delivery texts desired by the user.

In step 3202, program 2901 accesses area 2003 and obtains, in a similarity descending sequence, similarity determination information from the texts not delivered to the user within a predetermined period of time in the past, the number of texts being equal to that of texts read in step 3201.

In step 3203, program 2901 reads from area 2004 the contents of texts corresponding to text identifiers attained in step 3202 and then outputs the contents of texts and the similarity determination information obtained in step 3202 to work area 118.

In step 3204, program 2901 transforms the contents of texts in work area into a format for e-mail program 113.

E-mail program 113 then delivers the information stored in area 118 to the user.

The processing procedure of program 2901 has been described.

Figure 37:
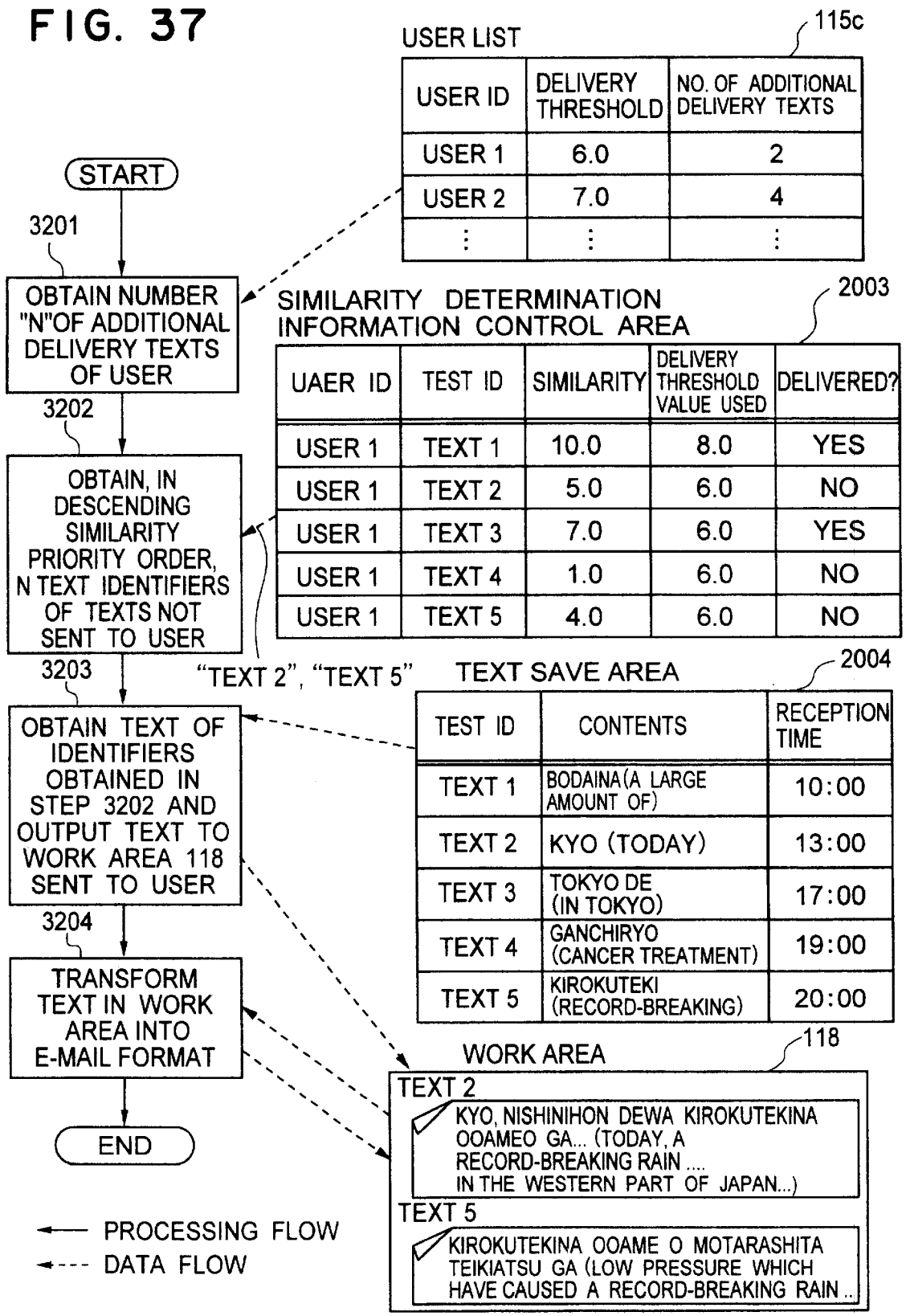
FIG. 37 is a flowchart to explain a concrete processing flow of program 2901 of the fifth embodiment.

Referring now to FIG. 37, description will be given in detail of a processing flow of program 2901 shown in FIG. 36.

In this example, program 110b initiates program 2901 at an interval of 24 hours. However, program 2901 may be initiated at another interval of time or at a predetermined point of time. Moreover, the program initiating time can be set for each user.

In the processing of program 2901, steps 3201 to 3204 are repeatedly executed for all users as follows.

In step 3201, program 2901 acquires the number of additional delivery texts for each predetermined period of time from user list 115c. In this example, user 107 desires that two texts are additionally delivered at an interval of 24 hours.

In step 3202, program 2901 obtains in the similarity descending order from area 2003 the desired number of text identifiers of texts not delivered to the user. In this example, from texts 2, 4, and 5 not delivered to user 107 within the past 24 hours, program 2901 selects texts having two larger similarity values, i.e., texts 2 and 5 to read therefrom text identifiers and similarity of texts 2 and 5. In this regard, it is also possible to add a delivery threshold modification presentation step after step 3202. In the presentation step, program 2901 counts the number of texts delivered to the user. If the count value is less than a predetermined value, program 2901 outputs a predetermined warning message to lower the delivery threshold value to be sent to the user. If the count value is more than a predetermined value, program 2901 outputs a predetermined warning message to increase the delivery threshold value to work area 118 to send the message to the user.

In step 3203, program 2901 reads from area 2004 text information corresponding to the text identifiers obtained in step 3202. Program 2901 outputs the text information and similarity determination information obtained in step 3202 to work area 118. In this example, program 2901 outputs the reception time, the similarity, and the contents respectively of texts 2 and 5 to area 118.

In step 3204, program 2901 transforms the information in area 118 into a format which can be delivered by e-mail program 113.

The specific processing flow of program 2901 has been described.

Description has been given of the processing flows of respective programs of the fifth embodiment.

In accordance with the configuration of the fifth embodiment of the present invention, all texts received from the news delivery source and the history of similarity calculation of each user are saved such that texts of which similarity is equal to or less than the delivery threshold value are additionally delivered in the similarity descending order. Resultantly, even when the number of texts of which similarity exceeds the delivery threshold value set by the user is less than that of texts desired by the user, a predetermined number of texts can be additionally delivered to the user. Therefore, when no text is delivered to the user, the user can understand whether or not desired texts are absent or whether or not the delivery threshold value is too great.

In the fifth embodiment, the number of texts set by the user are additionally delivered in addition to the texts of which similarity exceeds the delivery threshold value set by the user. However, there may be used a method in which the additional text delivery is conducted such that the total of the number of texts of which similarity exceeds the delivery threshold value set by the user and that of texts to be additionally delivered satisfies a condition of a number set by the user.

Description will now be given of the sixth embodiment of the present invention.

In the fourth embodiment, although the delivery threshold value can be changed to a suitable value, it is difficult to appropriately initialize the delivery threshold value. For example, when a retrieval condition is set to a new value, similarity of a text desired by the user with respect to the retrieval condition is unknown to the user.

In the fourth and fifth embodiments, the delivery threshold value is set to an appropriate value for the text delivery state changing at every moment. This leads to a problem that the user must quite frequently modify the delivery threshold value.

To solve the problem above in accordance with the sixth embodiment of a document retrieving and delivering system of the present invention, the user sets a desired number of delivery texts and the system appropriately modifies the delivery threshold value according to the number of delivery texts set by the user.

Figure 38:
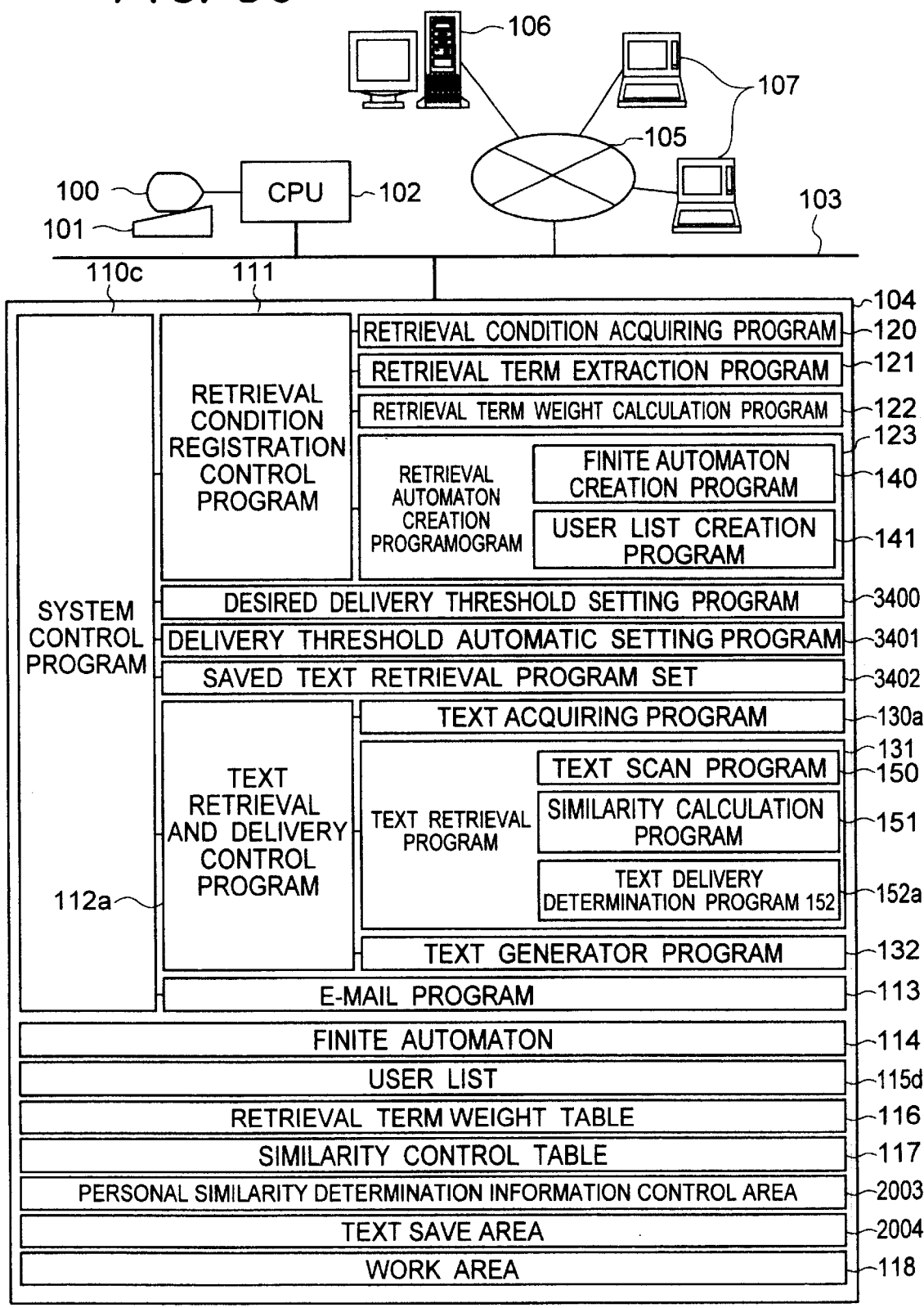
FIG. 38 is diagram showing a configuration of a sixth embodiment in accordance with the present invention.

FIG. 38 shows a system configuration of the sixth embodiment in accordance with the present invention.

This embodiment is substantially equal in constitution to the first embodiment of FIG. 1. As can be seen from FIG. 38, the sixth embodiment additionally includes a desired delivery count setting program 3400, a delivery threshold automatic setting program 3401, and a saved text retrieval program 3402.

Moreover, the embodiment includes areas 2003 and 2004 employed in the fourth embodiment.

Text delivery determination program 152a under text retrieval program 131 is that used in the fourth embodiment.

In the sixth embodiment, program 3401 sets an appropriate delivery threshold value for each user according to information in areas 2003 and 2004 and the desired delivery count set by program 3400 in response to a request from the user. Program 112a refers to the delivery threshold value to determine whether or not a text received is to be sent to the pertinent user.

For the user of which personal similarity determination information has not been saved, for example, because a new retrieval condition is registered, program 3402 calculates similarity of a text saved in area 2004 and stores the similarity in area 2003.

Description will be given of processing procedures of respective programs of the sixth embodiment.

Figure 39:
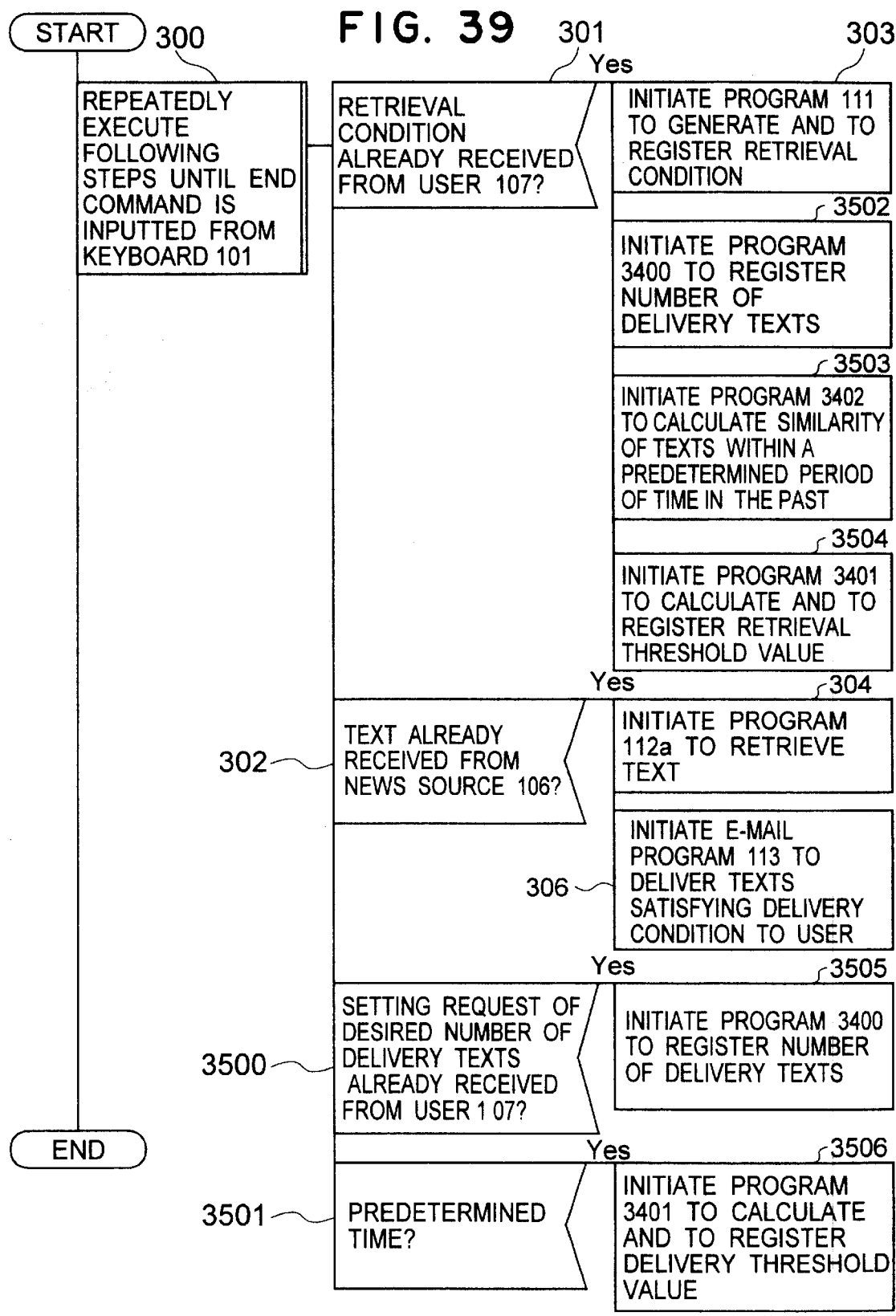
FIG. 39 is a PAD showing a processing flow of a system control program 110c of the fifth embodiment.

Referring to the PAD of FIG. 39, description will be given of a processing procedure of program 110c in the sixth embodiment.

The processing procedure of program 110c of the sixth embodiment is almost the same as that of system control program 110 of the first embodiment. However, the sixth embodiment includes additional steps 3500 to 3504.

After step 303, program 110c initiates desired delivery count setting program 3400 in step 3502.

In step 3503, program 110c initiates saved text retrieval program 3402.

In step 3503, program 110c initiates saved text retrieval program 3402.

In step 3504, program 110c initiates delivery threshold automatic setting program 3401.

During the iterative processing in step 300, after steps 301 and 302, program 110c checks in step 3500 to determine whether or not a setting request for count of delivery texts within a predetermined period of time has been received from user 107. If such a request has been received, program 110c initiates program 3400 in step 3505.

In step 3501, program 110c determines whether or not the current time is a point of time satisfying a predetermined condition. If the current time satisfies the condition, program 110c initiates program 3401 in step 3506. For example, "initiate program 3401 at 0:00 every day" may be set to initiate program 3401.

The processing procedure of program 110c has been described.

Figure 40:
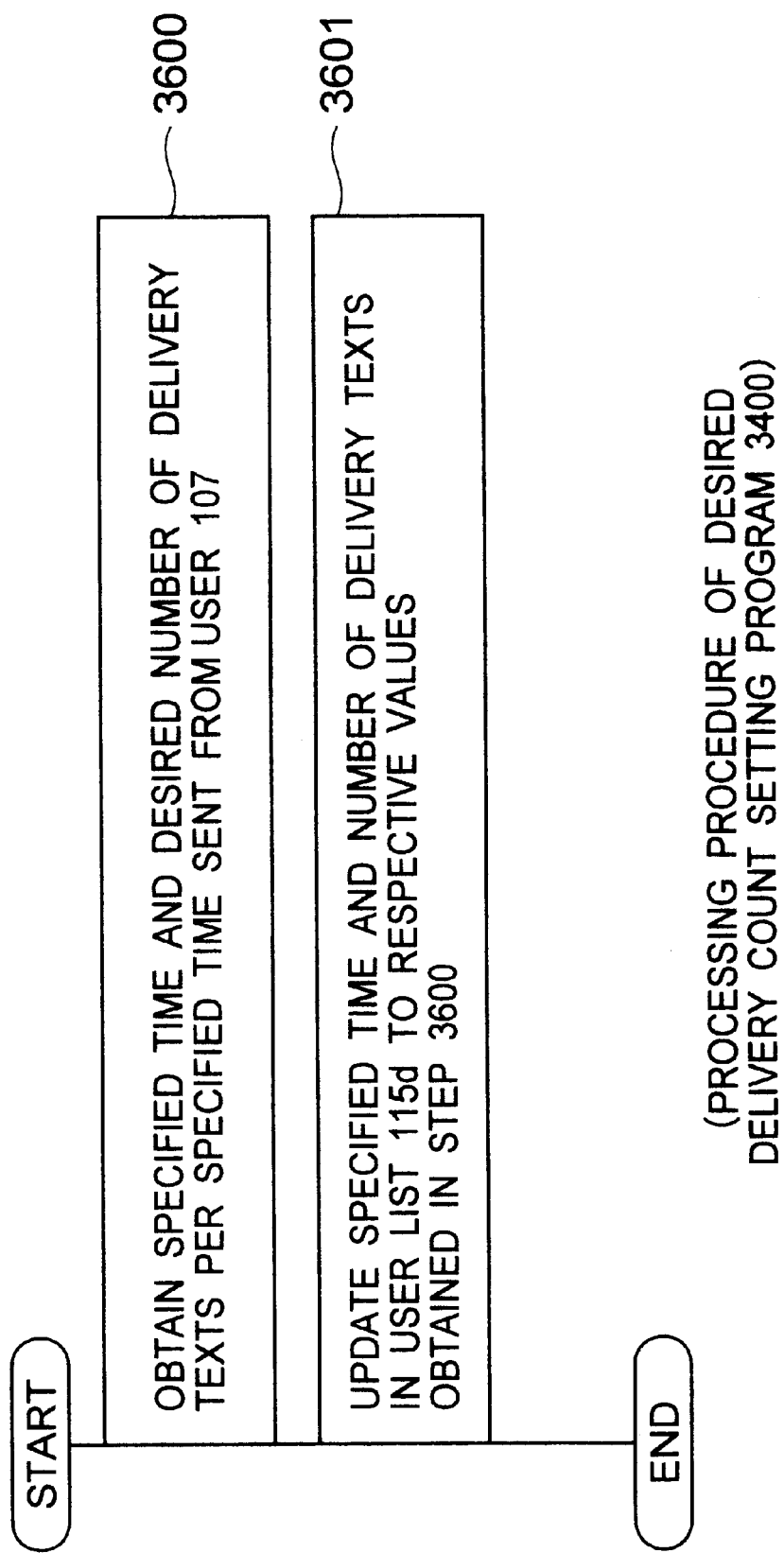
FIG. 40 is a PAD showing a processing flow of a desired delivery count setting program 3400 of the sixth embodiment.

Referring now to the PAD of FIG. 40, description will be given of program 3400 initiated by program 110c in step 3502 or 3505 of FIG. 39.

In step 3600, program 3400 acquires from user 107 a specified period of time and a desired number of texts to be delivered for each specified period of time.

In step 3601, program 3400 updates, according to a user identifier of the user, the specified period of time and the desired number of delivery texts in user list 115 according to the values obtained in step 3600. The specified period of time and the desired number of delivery texts in user list 115 may be specified by the manager or may be set when user 107 registers a retrieval condition.

The processing procedure of program 3400 has been described.

Figure 41:
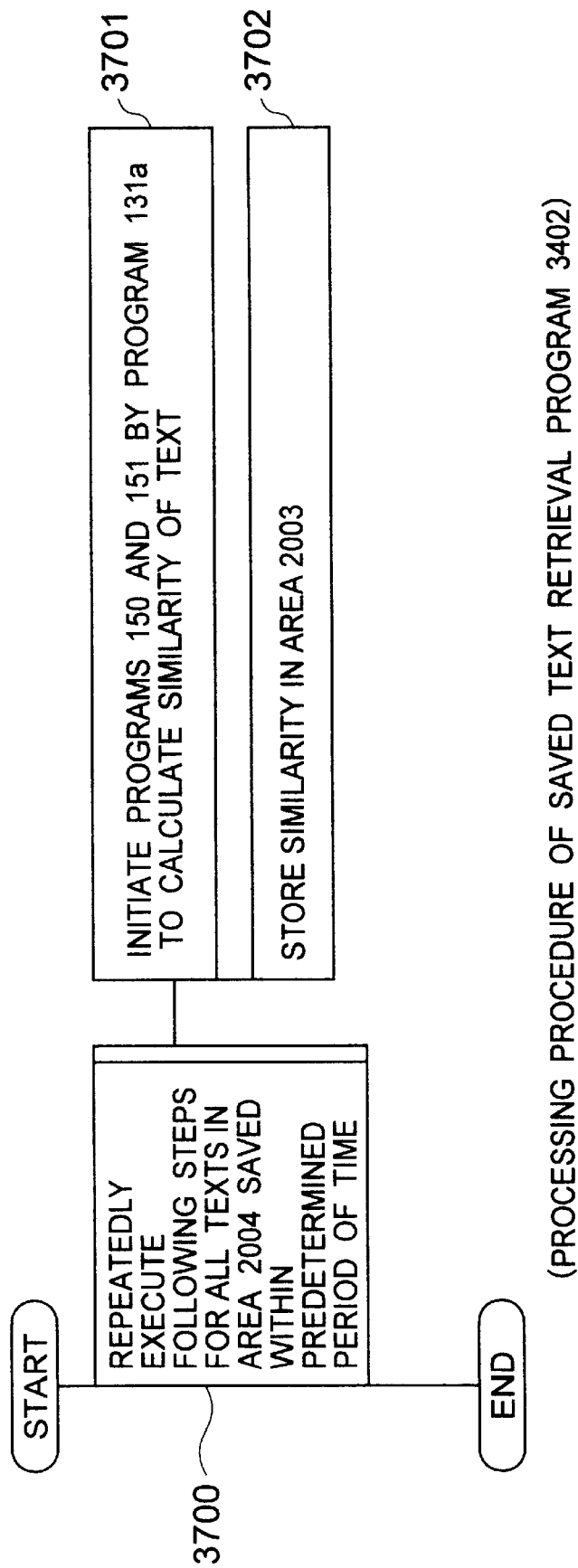
FIG. 41 is a PAD showing a processing flow of a saved text retrieval program 3402 of the sixth embodiment.

Referring now to the PAD of FIG. 41, description will be given of program 3402 initiated by program 110c in step 3503 of FIG. 39.

Program 3402 calculates similarity of a text saved when the history of similarity calculation is absent, for example, immediately after a new retrieval condition is registered.

In step 3700, program 3402 repeatedly executes steps 3701 and 3702 for all texts saved in area 2004.

In step 3701, program 3402 initiates programs 150 and 151 to calculate similarity of a text for a retrieval condition registered by program 111.

In step 3702, program 3402 stores the similarity calculated in step 3701 in area 2003.

The processing procedure of program 3402 has been described.

Figure 42:
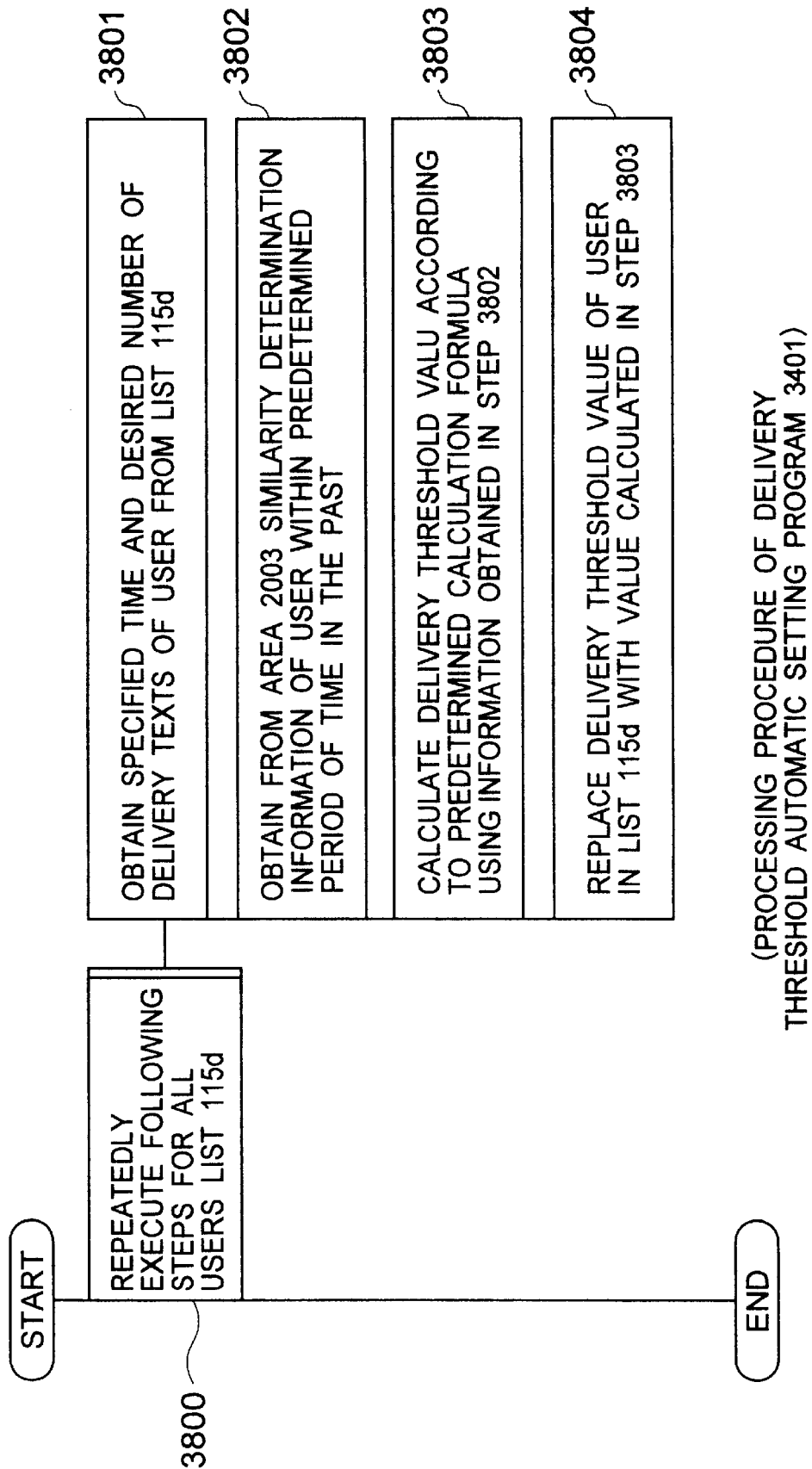
FIG. 42 is a PAD showing a processing flow of a delivery threshold automatic setting program 3401 of the sixth embodiment.

Referring now to the PAD of FIG. 42, description will be given of program 3401 initiated by program 110c in step 3504 or 3506 of FIG. 39.

Program 3401 sets an appropriate delivery threshold value for each user according to a distribution of similarity calculated for texts received in the past.

In step 3800, program 3401 repeatedly executes steps 3801 and 3804 for all users in user list 151d.

In step 3801, program 3401 acquires for a user a specified period of time and a number of delivery texts per specified period of time associated with the user from user list 115d.

In step 3802, program 3401 accesses area 2003 to read therefrom, according to a user identifier of the user, personal similarity determination information of the user for a text received from news source 106 within a predetermined period of time in the past.

In step 3803, program 3401 calculates a new delivery threshold value according to a predetermined calculation formula using the information obtained in step 3802.

In step 3804, program 3401 sets the threshold value calculated in step 3803 to a delivery value field of the user in user list 115d.

The processing procedure of program 3401 has been described.

Figure 43:
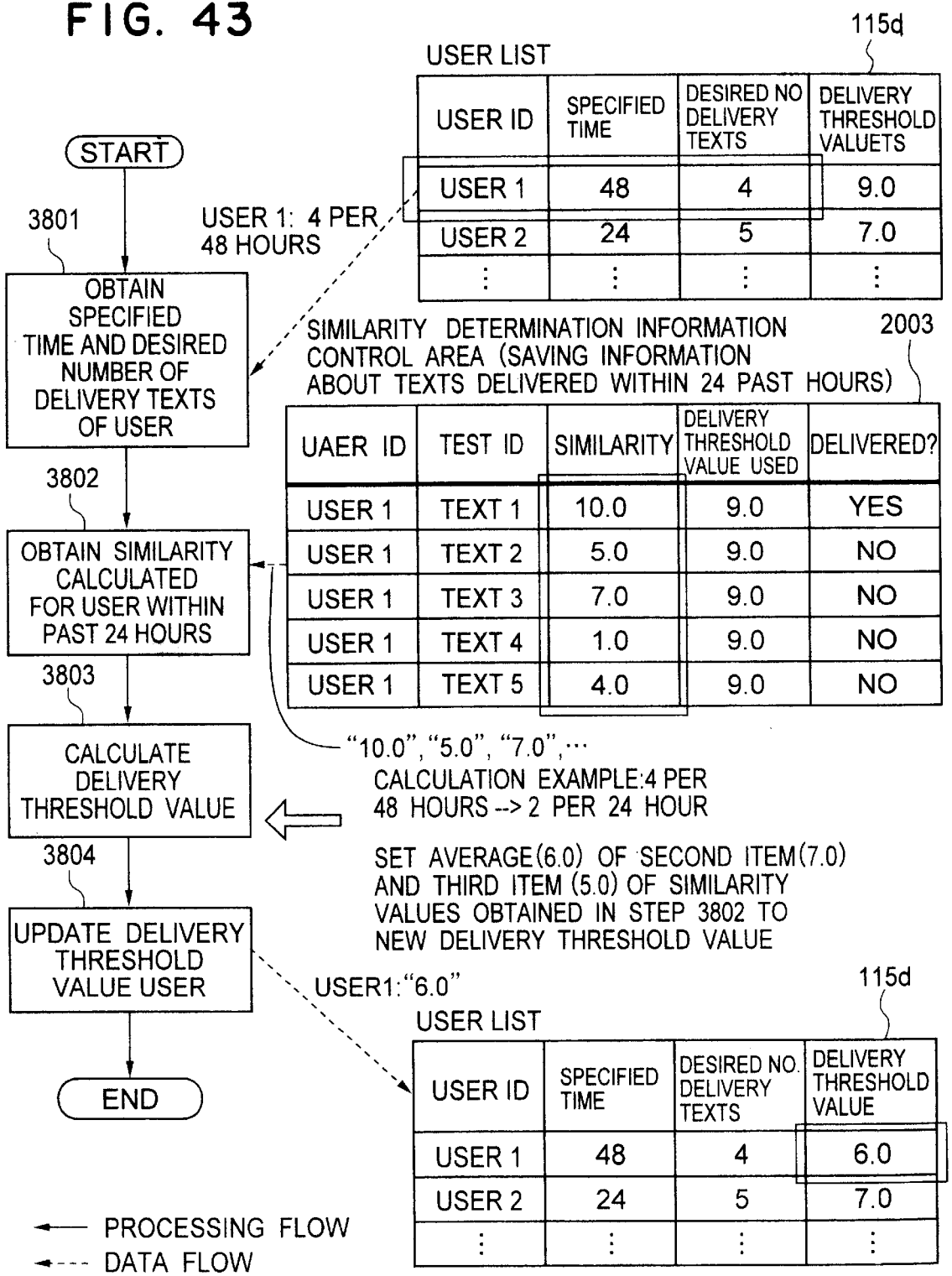
FIG. 43 is a flowchart showing a specific processing flow of program 3401 of the sixth embodiment.

Referring to FIG. 43, description will be given in detail of a processing flow of program 3401 shown in FIG. 42.

In this example, program 3401 is initiated at an interval of 24 hours by program 110c. However, the interval of time may be changed or the program 3401 may be initiated at a predetermined point of time. Moreover, the initiating time may be set for each user.

In processing of program 3401, steps 3801 to 3804 are repeatedly executed for all users.

In step 3801, program 3401 acquires for a user a specified period of time and a desired number of delivery texts from user list 115d. In this example, user 1 requests that four texts are delivered per 48 hours, and hence program 3401 acquires information of "48 hours" as the specified period of time and "four" as the desired number of delivery texts.

In step 3802, program 3401 accesses area 2003 to read similarity for user 107 from personal similarity determination information within a specified period of time in the past. In this example, program 3401 obtains similarity values "10.0", "5.0", and "7.0" respectively for texts 1 to 3 delivered within 24 hours in the past.

In step 3803, program 3401 calculates a new delivery threshold value according to a predetermined calculation method using the similarity obtained in step 3802. In this example, the condition of "four texts per 48 hours" is transformed into a condition of "two texts per 24 hours". According to the similarity values obtained in step 3802, an average, i.e., "6.0" of two high-order similarity "7.0" and the subsequent similarity "5.0" is calculated as the new delivery threshold value. Other calculation methods may be used to attain the delivery threshold value in step 3803.

In step 3804, program 3401 stores the value attained in step 3803 as a delivery threshold value of the user in list 115d.

The specific processing flow of program 3401 has been described.

Description has been given of processing procedures of respective program in the sixth embodiment.

In accordance with the sixth embodiment above, the history of similarity calculation conducted for user in the past is saved such that the system automatically correct delivery threshold values using the historical information saved. The delivery threshold value can be set to a suitable value for each user, which consequently relieves the users from the troublesome operation to frequently modify the delivery threshold value. This solves the problem that the user frequently modifies the delivery threshold value to set an appropriate delivery threshold value due to change in the text delivery state.

Also when a new retrieval condition is set, the texts in the past are scanned to calculate an appropriate similarity value for the retrieval condition. Therefore, an appropriate delivery threshold value can be calculated and is set in the system. This accordingly removes the problem in which the user cannot predict similarity of a particular text with respect to the new retrieval condition.

It is also possible to install programs 2000 to 2002 of the fourth and fifth embodiments and programs 3400 to 3402 of the sixth embodiment in one system. In such a configuration, by additionally installing a delivery condition setting mode selection program in which a user or a system manager selects and registers either one of the systems associated with the embodiments above for subsequent operation, the system user can appropriately select the setting of the delivery threshold value or the setting of the number of delivery texts.

The selection of delivery texts described in the embodiments is not limited to the text retrieval method using the finite automaton or the extended BM method, but is also applicable to any system using other retrieval methods.

The selection of delivery texts in the embodiments above is not limited to the text similarity calculation for a retrieval condition, but can be also used in the similarity calculation described in conjunction with the first to third embodiments and in other similarity calculation.

In the first to sixth embodiments, the document retrieving and delivering system including display 100, keyboard 101, CPU 102, memory 104, and bus 103 connecting these constituent components to each other may be arranged at any position on the network, namely, at a position between news source 106 and communication line 105, communication line 105 and user 107, or the like in FIGS. 1, 21, 33, and 38.

In accordance with the present invention, similarity of a text is calculated for retrieval conditions of a plurality of users and is compared with a delivery threshold value for each user, and hence a text having high similarity can be delivered to a user requesting more important information.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A document retrieving and delivering method comprising the steps of:

registering retrieval conditions inputted from a plurality of users; and retrieving, from texts of document information inputted, texts satisfying the retrieval conditions and delivering the texts to the users associated therewith, wherein the retrieval and delivery step includes the steps of:

calculating similarity of the text for the retrieval condition;

determining according to the similarity whether or not the retrieval condition is satisfied; and delivering, when the retrieval condition is satisfied, the text to the user corresponding to the retrieval condition;

the retrieval condition registration step comprises the steps of:
  reading a seed document from the retrieval conditions registered by the users, wherein the seed document includes one of a word, a sentence, and a document;
  analyzing seed documents read in the step of reading a seed document, and extracting retrieval terms therefrom for retrieval;
  registering, for each retrieval term extracted in the retrieval term extraction step, a user identifier of a user having specified a seed document read in the seed document read step; and
  registering a delivery condition written by each user in the retrieval condition; and
the text retrieval and delivery step comprises the following steps of:
  retrieving, for each text, a retrieval term extracted by the retrieval term extraction step;
  obtaining the user identifier registered for the retrieval term retrieved in the retrieval term retrieval step;
  calculating similarity of the text for each retrieval condition according to a predetermined calculation formula using information of appearances of the retrieval term retrieved in the retrieval term retrieval step and the user identifier obtained in the user identifier obtaining step; and
  delivering a text of which the similarity calculated in the similarity calculation step satisfies the delivery condition registered in the delivery condition registration step to a user of the delivery condition.

2. A document retrieving and delivering method in accordance with claim 1, wherein the text retrieval and delivery step includes
  a step of controlling an order of calculating similarity of the text for the retrieval conditions.

3. A document retrieving and delivering method in accordance with claim 2, wherein the similarity calculation order control step includes
  a step of determining the similarity calculation order according to one of a predetermined delivery priority, a delivery priority specified by the user, and a delivery priority according to a contract charging rate of a delivery service.

4. A document retrieving and delivering method in accordance with claim 1, wherein the text retrieval and delivery step further includes
  a step of saving all texts obtained and similarity of each of the text for the retrieval condition of each of the users.

5. A document retrieving and delivering method in accordance with claim 4, further including
  a delivery threshold setting support information presenting step, of presenting, to the user, contents saved by the text retrieval and delivery step.

6. A document retrieving and delivering method in accordance with claim 5, wherein the delivery threshold setting support information presenting step presents the contents in the form of a list, the contents including similarity, delivery time, and a delivery threshold value at delivery of the text delivered to the user.

7. A document retrieving and delivering method in accordance with claim 5, wherein the delivery threshold setting support information presenting step presents the contents including a number of texts for each similarity calculated in the past to the user.

8. A document retrieving and delivering method in accordance with claim 5, wherein the delivery threshold setting support information presenting step presents the contents in the form of a graph of similarity of texts obtained in the past versus text reception time.

9. A document retrieving and delivering method comprising the steps of:
  registering retrieval conditions inputted from a plurality of users; and
  retrieving, from texts of document information inputted, texts satisfying the retrieval conditions and delivering the texts to the users associated therewith, wherein
    the retrieval and delivery step includes the steps of:
      calculating similarity of the text for the retrieval condition;
      determining according to the similarity whether or not the retrieval condition is satisfied; and
      delivering, when the retrieval condition is satisfied, the text to the user corresponding to the retrieval condition;
    the retrieval condition registration step comprises the steps of:
      reading a seed document from the retrieval conditions registered by the users, wherein the seed document includes one of a word, a sentence, and a document;
      analyzing seed documents read in the step of reading a seed document, and extracting retrieval terms therefrom for retrieval;
      calculating a weight for the retrieval term extracted in the retrieval term extraction step;
      registering, for each retrieval term extracted in the retrieval term extraction step, a user identifier of a user having specified a seed document read in the seed document read step; and
      registering a delivery condition written by each user in the retrieval condition; and
    the text retrieval and delivery step further comprises the steps of:
      counting a number of appearances in the text of the retrieval term extracted in the retrieval term extraction step;
      obtaining the user identifier registered for the extracted retrieval term;
      calculating similarity of the text to each retrieval condition using the weight of the retrieval term calculated in the retrieval term calculation step and the number of appearances of the retrieval term counted in the appearance counting step; and
      delivering a text of which the similarity calculated in the similarity calculation step satisfies the delivery condition registered in the delivery condition registration step to a user of the delivery condition.

10. A document retrieving and delivering method in accordance with claim 9, wherein the retrieval term weight calculation step includes the steps of:
  calculating a number of texts in which the retrieval term extracted by the retrieval term extraction step appears; and
  calculating a weight of the retrieval term using the number of texts.

11. A document retrieving and delivering method comprising the steps of:
  registering retrieval conditions inputted from a plurality of users; and
  retrieving, from texts of document information inputted, texts satisfying the retrieval conditions and delivering the texts to the users associated therewith, wherein the retrieval and delivery step includes the steps of:
calculating similarity of the text for the retrieval condition;
determining according to the similarity whether or not the retrieval condition is satisfied;
delivering, when the retrieval condition is satisfied, the text to the user corresponding to the retrieval condition; and
comparing a calculation result of similarity of the text with a predetermined delivery threshold value as a reference value to determine delivery or non-delivery of the text and delivering, when the similarity of the text is greater than the delivery threshold value, the text to the user.

12. A document retrieving and delivering method in accordance with claim 11, further including
a delivery threshold setting step of setting a delivery threshold value for each user.

13. A document retrieving and delivering method in accordance with claim 12, wherein:
the text retrieval and delivery step includes a delivery threshold setting support information presenting step, of presenting, to the user, contents saved by the text retrieval and delivery step; and
the delivery threshold setting step scans the text saved in the text retrieval and delivery step, calculates similarity of the text for the retrieval condition set by each user, and thereby calculates and sets a delivery threshold value for each user.

14. A document retrieving and delivering method in accordance with claim 12, wherein:
the text retrieval and delivery step includes a delivery threshold setting support information presenting step, of presenting, to the user, contents saved by the text retrieval and delivery step; and
the delivery threshold setting trial step of selects, from all texts within a predetermined period of time in the past, texts which exceed a new delivery threshold value that is set; and presents the texts selected to the user.

15. A document retrieving method in accordance with claim 12,
wherein the text retrieval and delivery step include a delivery threshold setting support information presenting step of presenting, to the user, contents saved by the text retrieval and delivery step; and
further including a delivery threshold correction proposal presenting step, of presenting a message to the user to correct the delivery threshold value according to the information saved in the text retrieval and delivery step.

16. A document retrieving and delivering method in accordance with claim 12, further including:
a desired delivery count setting step of; and
a delivery condition setting mode selection step for enabling the user to select for operation either one of the delivery threshold setting step and the desired delivery count setting step.

17. A document retrieving and delivering method in accordance with claim 11,
wherein the text retrieval and delivery step includes a delivery threshold setting support information presenting step, of presenting, to the user, contents saved by the text retrieval and delivery step; and
further including a text additional delivery step of delivering, according to the information saved in the text retrieval and delivery step, the texts having a similarity equal to or less than the delivery threshold value of texts in a descending similarity order, the delivery beginning at a text having highest similarity and continuing until a predetermined number of texts additionally delivered during a predetermined period of time is satisfied or a total of a number of texts having a similarity that exceeds the delivery threshold value set by the user and a number of texts to be additionally delivered is satisfied.

18. A document retrieving and delivering method comprising the steps of:
registering retrieval conditions inputted from a plurality of users; and
retrieving, from texts of document information inputted, texts satisfying the retrieval conditions and delivering the texts to the users associated therewith, wherein
the retrieval and delivery step includes the steps of:
calculating similarity of the text for the retrieval condition;
determining according to the similarity whether or not the retrieval condition is satisfied; and
delivering, when the retrieval condition is satisfied, the text to the user corresponding to the retrieval condition;
a desired delivery count setting step of setting a desired number of delivery texts desired by the user within a predetermined period of time set by the user.

19. A document retrieving and delivering method in accordance with claim 18,
wherein the text retrieval and delivery step includes a delivery threshold setting support information presenting step, of presenting, to the user, contents saved by the text retrieval and delivery step; and
further including a delivery threshold setting step, of setting a delivery threshold for each user for each predetermined period of time according to the number of texts set in the desired delivery count setting step and the information saved in the text retrieval and delivery step.

20. A document retrieving and delivering apparatus comprising:
retrieval condition registering means for registering retrieval conditions inputted from a plurality of users; and
retrieval and delivery means for retrieving, from texts of document information inputted, texts satisfying the retrieval conditions and delivering the texts to the users associated therewith, wherein
the retrieval and delivery means calculates similarity of the text for the retrieval condition, determines according to the similarity whether or not the retrieval condition is satisfied, and delivers, when the retrieval condition is satisfied, the text to the user corresponding to the retrieval condition;
the retrieval condition registration means further being for:
reading a seed document from the retrieval conditions registered by the users, wherein the seed document includes one of a word, a sentence, and a document;
analyzing seed documents read in the step of reading a seed document, and extracting retrieval terms therefrom for retrieval;
registering, for each retrieval term extracted in the retrieval term extraction step, a user identifier of a user having specified a seed document read in the seed document read step; and registering a delivery condition written by each user in the retrieval condition; and the text retrieval and delivery means further being for:

retrieving, for each text, a retrieval term extracted by the retrieval term extraction step;

obtaining the user identifier registered for the retrieval term retrieved in the retrieval term retrieval step;

calculating similarity of the text for each retrieval condition according to a predetermined calculation formula using information of appearances of the retrieval term retrieved in the retrieval term retrieval step and the user identifier obtained in the user identifier obtaining step; and delivering a text of which the similarity calculated in the similarity calculation step satisfies the delivery condition registered in the delivery condition registration step to a user of the delivery condition.

21. A document retrieving and delivering program comprising the steps of:

registering retrieval conditions inputted from a plurality of users; and retrieving, from text data of document information inputted, texts satisfying the retrieval conditions and delivering the texts to the users associated therewith, wherein the retrieval and delivery step includes the steps of:

calculating similarity of the text for the retrieval condition;

determining according to the similarity whether or not the retrieval condition is satisfied; and delivering, when the retrieval condition is satisfied, the text to the user corresponding to the retrieval condition;

the retrieval condition registration step comprises the steps of:

reading a seed document from the retrieval conditions registered by the users, wherein the seed document includes one of a word, a sentence, and a document;

analyzing seed documents read in the step of reading a seed document, and extracting retrieval terms therefrom for retrieval;

registering, for each retrieval term extracted in the retrieval term extraction step, a user identifier of a user having specified a seed document read in the seed document read step; and registering a delivery condition written by each user in the retrieval condition; and the text retrieval and delivery step comprises the following steps of:

retrieving, for each text, a retrieval term extracted by the retrieval term extraction step;

obtaining the user identifier registered for the retrieval term retrieved in the retrieval term retrieval step;

calculating similarity of the text for each retrieval condition according to a predetermined calculation formula using information of appearances of the retrieval term retrieved in the retrieval term retrieval step and the user identifier obtained in the user identifier obtaining step; and delivering a text of which the similarity calculated in the similarity calculation step satisfies the delivery condition registered in the delivery condition registration step to a user of the delivery condition.

22. A computer-readable recording media storing therein a document retrieving and delivering program comprising the steps of:

registering retrieval conditions inputted from a plurality of users; and retrieving, from text data of document information inputted, texts satisfying the retrieval conditions and delivering the texts to the users associated therewith, wherein the retrieval and delivery step includes the steps of:

calculating similarity of the text for the retrieval condition;

determining according to the similarity whether or not the retrieval condition is satisfied; and delivering, when the retrieval condition is satisfied, the text to the user corresponding to the retrieval condition;

the retrieval condition registration step comprises the steps of:

reading a seed document from the retrieval conditions registered by the users, wherein the seed document includes one of a word, a sentence, and a document;

analyzing seed documents read in the step of reading a seed document, and extracting retrieval terms therefrom for retrieval;

registering, for each retrieval term extracted in the retrieval term extraction step, a user identifier of a user having specified a seed document read in the seed document read step; and registering a delivery condition written by each user in the retrieval condition; and the text retrieval and delivery step comprises the following steps of:

retrieving, for each text, a retrieval term extracted by the retrieval term extraction step;

obtaining the user identifier registered for the retrieval term retrieved in the retrieval term retrieval step;

calculating similarity of the text for each retrieval condition according to a predetermined calculation formula using information of appearances of the retrieval term retrieved in the retrieval term retrieval step and the user identifier obtained in the user identifier obtaining step; and delivering a text of which the similarity calculated in the similarity calculation step satisfies the delivery condition registered in the delivery condition registration step to a user of the delivery condition.

* * * * *